(12) United States Patent
Niioka et al.

(10) Patent No.: US 8,884,946 B2
(45) Date of Patent: Nov. 11, 2014

(54) IMAGE DISPLAY DEVICE, DISPLAY PANEL, AND TERMINAL DEVICE

(75) Inventors: Shinya Niioka, Tokyo (JP); Koji Shigemura, Tokyo (JP)

(73) Assignee: NLT Technologies, Ltd., Kanagawa (JP)

(*) Notice: Subject to any disclaimer, the term of this patent is extended or adjusted under 35 U.S.C. 154(b) by 294 days.

(21) Appl. No.: 13/448,818

(22) Filed: Apr. 17, 2012

(65) Prior Publication Data
US 2012/0268481 A1 Oct. 25, 2012

(30) Foreign Application Priority Data

Apr. 20, 2011 (JP) ................................. 2011-094541

(51) Int. Cl.
| G06T 1/00 | (2006.01) |
| G02B 27/22 | (2006.01) |
| H04N 13/04 | (2006.01) |
| G02B 1/06 | (2006.01) |

(52) U.S. Cl.
CPC ........ *H04N 13/0415* (2013.01); *G02B 27/2214* (2013.01); *G02B 1/06* (2013.01); *H04N 13/0404* (2013.01)
USPC ...................................................... 345/418

(58) Field of Classification Search
CPC ..................................................... G02B 27/22
USPC .................................. 345/418, 619; 359/466
See application file for complete search history.

(56) References Cited

U.S. PATENT DOCUMENTS

| 6,118,584 A | 9/2000 | Van Berkel et al. |
| 2006/0050385 A1* | 3/2006 | Uehara et al. ................. 359/465 |
| 2008/0252977 A1* | 10/2008 | Iwamoto et al. .............. 359/559 |
| 2009/0096943 A1* | 4/2009 | Uehara et al. ................... 349/37 |
| 2011/0304716 A1* | 12/2011 | Sato et al. ........................ 348/54 |

FOREIGN PATENT DOCUMENTS

| JP | 10-186294 | 7/1998 |
| JP | 2005-208567 | 8/2005 |

OTHER PUBLICATIONS

Extended European Search Report dated Jul. 27, 2012, with English translation; Application No. 12164413.2.
Nikkei Electronics, No. 838, Nikkei Publishing, Jan. 6, 2003, pp. 26-27.

* cited by examiner

*Primary Examiner* — Maurice L McDowell, Jr.
(74) *Attorney, Agent, or Firm* — Young & Thompson

(57) ABSTRACT

A subpixel 4S has a parallelogram aperture, which is equivalent upon rotation by 180 degrees in a XY plane and asymmetric about a line R-R' or L-L' parallel to the Y-axis and passing through the center Or or Ol of the subpixel. The subpixels 4S adjacent to each other in the X-axis direction in a unit of display 4U are point-symmetric about the center Ou of the unit of display 4U. The apertures of a right-eye pixel 4R and left eye pixel 4L have the centers Or and Ol around the intersections of the diagonals of their respective parallelograms, respectively. The centers Or and Ol are shifted from a line E-E' to be away from each other in the Y-axis direction.

12 Claims, 37 Drawing Sheets

FIG. 12

|     | G1 | G2 | G3 | G4 | G5 | G6 | G7 |
|-----|----|----|----|----|----|----|----|
| D1  | +  | −  | +  | −  | +  | −  | +  |
| D2  | −  | +  | −  | +  | −  | +  | −  |
| D3  | +  | −  | +  | −  | +  | −  | +  |
| D4  | −  | +  | −  | +  | −  | +  | −  |
| D5  | +  | −  | +  | −  | +  | −  | +  |
| D6  | −  | +  | −  | +  | −  | +  | −  |
| D7  | +  | −  | +  | −  | +  | −  | +  |
| D8  | −  | +  | −  | +  | −  | +  | −  |
| D9  | +  | −  | +  | −  | +  | −  | +  |
| D10 | −  | +  | −  | +  | −  | +  | −  |
| D11 | +  | −  | +  | −  | +  | −  | +  |
| D12 | −  | +  | −  | +  | −  | +  | −  |
| D13 | +  | −  | +  | −  | +  | −  | +  |

FIG. 22

|     | G1 | G2 | G3 | G4 | G5 | G6 | G7 |
|-----|----|----|----|----|----|----|----|
| D1  | +  | −  | +  | −  | +  | −  | +  |
| D2  | −  | +  | −  | +  | −  | +  | −  |
| D3  | +  | −  | +  | −  | +  | −  | +  |
| D4  | −  | +  | −  | +  | −  | +  | −  |
| D5  | +  | −  | +  | −  | +  | −  | +  |
| D6  | −  | +  | −  | +  | −  | +  | −  |
| D7  | +  | −  | +  | −  | +  | −  | +  |
| D8  | −  | +  | −  | +  | −  | +  | −  |
| D9  | +  | −  | +  | −  | +  | −  | +  |
| D10 | −  | +  | −  | +  | −  | +  | −  |
| D11 | +  | −  | +  | −  | +  | −  | +  |
| D12 | −  | +  | −  | +  | −  | +  | −  |
| D13 | +  | −  | +  | −  | +  | −  | +  | ic
IMAGE DISPLAY DEVICE, DISPLAY PANEL, AND TERMINAL DEVICE

INCORPORATION BY REFERENCE

This application is based on Japanese Patent Application No. 2011-094541 filed on Apr. 20, 2011, and including specification, claims, drawings and summary. The disclosure of the above Japanese Patent Application is incorporated herein by reference in its entirety.

TECHNICAL FIELD

The present invention relates to an image display device, display panel, and terminal device, and particularly to a device for displaying different images intended for multiple observing points or a display panel structure for displaying three-dimensional images in high quality.

BACKGROUND ART

As cellular phones and information terminals have been advanced, image display devices become smaller and finer. On the other hand, as new value-added image display devices, attention has been drawn to image display devices allowing an observer to view different images depending on an observing point, namely image display devices with which different images are visible at multiple observing points, and to three-dimensional image display devices displaying different images as parallax images so that the observer can view a three-dimensional image.

A known technique of providing different images to multiple observing points merges and displays image data for different observing points on a display panel, separates the displayed composite image by an optical separating unit such as a lens and a barrier having slits (screen), and provides the images to individual observing points. The images can be separated by an optical unit such as a barrier having slits and a lens so as to limit the pixels to be seen from each observing point. A parallax barrier comprising a barrier having many slits in a stripe pattern or a lenticular lens comprising an array of cylindrical lenses having lens effect in one directional is generally used as the image separating unit.

A three-dimensional image display device employing an optical image separating unit is suitable for installing in terminal devices such as cellular phones because it does not require an observer to wear special glasses and eliminates annoyance of wearing glasses. Cellular phones carrying a three-dimensional display device comprising a liquid crystal panel and a parallax barrier have already been commercialized (for example, see "NIKKEI Electronics, No. 838," Nikkei Publishing, Jan. 6, 2003, pp 26-27).

The above technique, namely a three-dimensional image display device providing different images to multiple observing points using an optical separating unit sometimes causes an observer to see a dark boundary between images as his/her observing point is shifted and the viewed image is switched. This phenomenon occurs when a non-display region between pixels for different observing points (a shielding unit generally called a black matrix in a liquid crystal panel) is viewed. This phenomenon accompanying shift of the observing point of the observer does not occur with a general three-dimensional display device without an optical separating unit. Therefore, the observer experiences discomfort or senses deterioration in the display quality from the above phenomenon occurring with a multiple observing point three-dimensional display device or three-dimensional display device with an optical separating unit.

This is a phenomenon generally called 3D moire. The 3D moire is a periodically appearing uneven luminance (sometimes referred to as uneven color) caused by displaying different images in different angular directions. Furthermore, the 3D moire is luminance angular fluctuation and large luminance angular fluctuation has adverse effect on three-dimensional observation.

In this specification, periodically appearing uneven luminance (sometimes referred to as uneven color) caused by displaying different images in different angular directions, particularly luminance angular fluctuation is defined as "3D moire." Generally, fringes appearing when structures different in periodicity interfere with each other are called "moire fringes." The moire fringes are interference fringes appearing depending on the periodicity or pitch of structures. On the other hand, the 3D moire is uneven luminance caused by the image-forming property of an image separating unit and seen from a specific position. Therefore, the 3D moire is distinguished from the moire fringes in this specification.

In order to ameliorate the above problem caused by an optical separating unit and shielding unit, three-dimensional image display devices in which the shape and geometry of pixel electrodes and shielding unit of the display panel is designed to reduce deterioration in the display quality have been proposed (for example, Unexamined Japanese Patent Application KOKAI Publication No. 2005-208567; Patent Literature 1, hereafter and Unexamined Japanese Patent Application KOKAI Publication No. H10-186294; Patent Literature 2, hereafter).

In the display device disclosed in the Patent Literature 1, as shown in FIG. 33, in a cross-section of the display panel in the vertical direction 1011 perpendicular to the direction of the array of cylindrical lenses 1003a, the ratio between the shielding unit (the wiring 1070 and shielding unit 1076) and aperture is nearly constant at any point in the horizontal direction 1012.

Therefore, even if the observer shifts his/her observing point in the horizontal direction 1012, which is the image separation direction, so as to change the observing direction, the ratio of the shielding unit viewed is nearly constant. In other words, it does not happen to the observer to see only the shielding unit in a specific direction or to see a darker display. Then, deterioration in the display quality caused by the shielding region is prevented.

The three-dimensional display device disclosed in the Patent Literature 2 has the pixel layout as shown in FIG. 34A and pixels as shown in FIG. 34B. In the three-dimensional display device disclosed in the Patent Literature 2, the total aperture width in the Y-axis direction of adjacent pixels is constant throughout an overlapping region 1013 and equal to the aperture width in the Y-axis direction in a rectangular region B. Therefore, the three-dimensional display device disclosed in the Patent Literature 2 can provide substantially uniform luminance continued in the horizontal direction and maintain substantially constant luminance in the X-axis direction.

Therefore, when the same image is output to adjacent columns of pixels, the three-dimensional display device disclosed in the Patent Literature 2 can maintain constant luminance while the observer's line of sight crosses the boundary between windows.

In prior art three-dimensional image display devices, pixel structures in which the aperture width is constant or nearly constant in the image separation direction as described above have been proposed. However, it was found that some production problems with the image separating unit leads to some issues on the three-dimensional display performance when the pixel structures disclosed in the Patent Literature 1 and Patent Literature 2 are used. The details are as follows.

Three-dimensional image display devices conventionally employ the above-mentioned parallax barrier or lenticular lens as a unit for optically separating images. A prior art lenticular lens has a periodically repeated structure in which the convex parts of cylindrical lenses and the concave parts between cylindrical lenses are adjacent to each other. Techniques for producing such a lenticular lens include molding using a die, photolithography, and inkjet.

However, with any technique being applied to production, there will be difference in processing accuracy between the convex part and concave part of a lens. Particularly, with a prior art lenticular lens, it is easier to produce the convex part in a given shape in a stable manner than the concave part. Then, the concave part is subject to deterioration in optical separation performance. For example, in the case of molding a lens using a die, the die is steeper and pointed in shape at the lens concave part than at the lens convex part. Not only the shape stability during molding but also the pressurizing during shaping contributes to the concave part having a lower level of shape stability than the convex part. Furthermore, even when a wet process such as an IJ technique is used to create a lens, the droplet boundary corresponds to the concave part and it is difficult to ensure the shape stability. Additionally, various factors including difficulty of removing unpeeled residues and/or adherent foreign substances from the lens concave part compared with from the lens convex part cause local deterioration in optical separation performance at the concave part.

In the region where the optical separation performance is deteriorated as described above, light emitted from the aperture of a pixel cannot be controlled by the image separating unit. Light emitted from the image separating unit under no control of the image separating unit results in a video image for one observing point being mixed with a video image for another observing point, which adversely affects the three-dimensional display. Particularly, when a mixture ratio between a video image for one observing point and a video image for another observing point exceeds a given value, the observer feels discomfort and has difficulty in three-dimensional observation. Furthermore, as the region of which three-dimensional observation is difficult because of mixture of a video image for one observing point and a video image for another observing point is enlarged, the proper three-dimensional observation range is narrowed; the three-dimensional display performance is lowered. Therefore, in this specification, mixture or leakage of a video image for one observing point and a video image for another observing point is defined as "3D crosstalk." In this specification, the term "crosstalk" is used to refer to deterioration in the image quality due to electric leakage of video image signals and/or scan signals and distinguished from the "3D crosstalk."

Among other optical separating unit, there is a GRIN (gradient index) lens, which is an electro-optic element using liquid crystal. Even with the use of a GRIN lens, the refractive index profile is more uneven at the lens concave part than at the lens convex part because of the relationship between electrode positions and electric field. Therefore, like the above-described lenticular lens, the optical separation performance at the lens concave part deteriorates.

Even with the use of a parallax barrier having slits, if the accuracy of processing the electrode end forming slits largely varies, the shielding performance at the slit end will become more uneven. Consequently, the image separation performance locally deteriorates, lowering the image quality.

Hence, it is difficult not only for a lenticular lens but also for any known image separating unit to achieve uniform optical separation performance. It is costly to obtain an image separating unit having completely uniform optical separation performance with the use of highly accurate processing techniques. When the pixels disclosed in the Patent Literature 1 and Patent Literature 2 in which the aperture width is constant in the image separation direction are used, some profile of optical separation performance of the image separating unit disturbs control over 3D moire and 3D crosstalk, deteriorating the three-dimensional display performance. Light delivered by high optical separation performance regions will easily be subject to 3D moire due to slight variation in the processing accuracy. Light delivered by low optical separation performance regions will be responsible for increased 3D crosstalk, narrowing the three-dimensional observation range. In regard to the above problems caused by the optical separation performance profile of the optical separating unit and the pixel structure, the techniques disclosed in the Patent Literature 1 and Patent Literature 2 encounter difficulty in accomplishing a design controlling both 3D moire and 3D crosstalk, failing to control both 3D moire and 3D and balance them.

The 3D moire may not be a problem at some observation positions. However, large luminance angular fluctuation presumably has some adverse effect on three-dimensional observation. Therefore, it is desirable that the fluctuation in luminance is equal to or lower than a given value. Furthermore, it is desirable that the magnitude of 3D crosstalk is equal to or lower than a given value.

SUMMARY

The present invention is invented in view of the above circumstances and an exemplary object of the present invention is to provide an image display device, display panel, and terminal device having influence of 3D moire minimized, 3D crosstalk reduced, and improving the three-dimensional display quality.

In order to achieve the above object, the image display device according to a first exemplary aspect of the present invention includes:

a display panel in which units of display including at least a pixel displaying a first observing point image and a pixel displaying a second observing point image are arranged in a matrix; and an optical distributer for distributing light emitted from the pixel displaying the first observing point image and pixel displaying the second observing point image in directions different from each other in a first direction, wherein the pixel displaying the first observing point image and pixel displaying the second observing point image are adjacent to each other in the first direction;

the units of display are arranged in rows extending in the first direction and in columns extending in a second direction perpendicular to the first direction;

a shielding unit is provided around an aperture of the pixel displaying the first observing point image and an aperture of the pixel displaying the second observing point image;

the aperture of the pixel displaying the first observing point image and aperture of the pixel displaying the second observing point image include a first region where the apertures overlap with each other in the second direction and a second region that is a remaining region;

a total aperture width in the second direction of the aperture of the pixel displaying the first observing point image and aperture of the pixel displaying the second observing point image in the first region is a first aperture width;

an aperture width in the second direction of the aperture of the pixel displaying the first observing point image and aperture of the pixel displaying the second observing point image in the second region is a second aperture width;

a third region where two of the units of display adjacent to each other in the first direction overlap with each other in the second direction is provided, and a total aperture width in the second direction of the two units of display in the third region is a third aperture width;

the aperture of the pixel displaying the first observing point image and aperture of the pixel displaying the second observing point image each comprises a shape that is at least point-symmetric and not line-symmetric;

centers of the apertures are shifted in the second direction with respect to a line parallel to the first direction and passing through a center of the unit of display, and the aperture of the pixel displaying the first observing point image and aperture of the pixel displaying the second observing point image are point-symmetric about the center of the unit of display; and the third aperture width is different from the first aperture width.

Furthermore, it is possible that the third aperture width is smaller than the first aperture width.

Furthermore, it is possible that the optical distributer comprises an alternate structure at least in the first direction comprising regions of high separation performance and regions of low separation performance in distributing light from the pixel displaying the first observing point image and pixel displaying the second observing point image in directions different from each other; and the regions of high separation performance extend from the aperture of the pixel displaying the first observing point image to the aperture of the pixel displaying the second observing point image.

Furthermore, it is possible that the optical distributer comprises a lenticular lens sheet in which convex parts and concave parts of cylindrical lenses are alternately arranged in the first direction; and the convex parts of cylindrical lenses are provided at positions corresponding to the first region and the concave parts of cylindrical lenses are provided at positions corresponding to the third region.

Furthermore, it is possible that the optical distributer comprises a refractive index distributed lens comprising a pair of substrates with liquid crystal in-between; and a pair of electrodes provided to the substrates is provided at positions corresponding to the third region.

Furthermore, it is possible that the pixel displaying the first observing point image and pixel displaying the second observing point image are subpixels, and the apertures are enclosed by data lines, gate lines and charging capacitor electrodes;

the subpixels of the display panel are arranged in an array of adjoining pixel pairs each comprising two subpixels provided on either side of one of the gate lines and adjacent to each other in the second direction as a basic unit;

a switcher of one of the two subpixels and a switcher of the other of the two subpixels are controlled by the gate line interposed between and shared by the two subpixels and connected to different ones of the data lines;

one electrode of the switchers forms a capacitor together with the charging capacitor electrode; and the charging capacitor electrode is electrically connected to a charging capacitor line provided at least in a boundary region between the subpixels in the unit of display.

Furthermore, it is possible that the pixel displaying the first observing point image and the pixel displaying the second observing point image are subpixels, and the apertures are enclosed by data lines, gate lines and charging capacitor electrodes;

the subpixels of the display panel are arranged in an array of adjoining pixel pairs each comprising two subpixels provided on either side of one of the data lines and adjacent to each other in the second direction as a basic unit;

a switcher of one of the two subpixels and a switcher of the other of the two subpixels are connected to the data line interposed between and shared by the two subpixels and controlled by different ones of the gate lines;

one electrode of the switchers forms a capacitor together with the charging capacitor electrode;

the charging capacitor electrode is provided at least in a boundary region between the subpixels of the adjoining pixel pair; and N charging capacitor lines electrically connected to the charging capacitor electrode each crosses at least one of virtual lines parallel to the second direction and dividing a width of the subpixel into N+1 equal parts in the first direction at the aperture.

Furthermore, it is possible that the display panel comprises a substrate at least provided with a pair of parallel electrodes and a liquid crystal layer interposed between the substrate and an opposite substrate; and the pair of parallel electrodes is arranged in the second direction and liquid crystal molecules of the liquid crystal layer are driven by an electric field created between the pair of parallel electrodes.

Furthermore, it is possible that the pair of parallel electrodes comprises transparent electrodes comprising at least two layers formed with an insulating film in-between; and one layer of the transparent electrodes is provided with a slit electrode.

Furthermore, it is possible that the slit electrode is a transparent electrode on a side to the liquid crystal layer.

In order to achieve the above object, the display panel according to a second exemplary aspect of the present invention is a display panel in which units of display including at least a pixel displaying a first observing point image and a pixel displaying a second observing point image are arranged in a matrix, wherein:

the units of display are arranged in rows extending in a first direction in which the pixel displaying the first observing point image and pixel displaying the second observing point image are adjacent to each other and in columns extending in a second direction perpendicular to the first direction;

a shielding unit is provided around an aperture of the pixel displaying the first observing point image and an aperture of the pixel displaying the second observing point image;

the aperture of the pixel displaying the first observing point image and aperture of the pixel displaying the second observing point image include a first region where the apertures overlap with each other in the second direction and a second region that is a remaining region;

a total aperture width in the second direction of the aperture of the pixel displaying the first observing point image and aperture of the pixel displaying the second observing point image in the first region is a first aperture width;

an aperture width in the second direction of the aperture of the pixel displaying the first observing point image and aperture of the pixel displaying the second observing point image in the second region is a second aperture width;

a third region where two of the units of display adjacent to each other in the first direction overlap with each other in the second direction is provided, and a total aperture width in the second direction of the two units of display in the third region is a third aperture width;

the aperture of the pixel displaying the first observing point image and aperture of the pixel displaying the second observing point image each comprises a shape that is at least point-symmetric and not line-symmetric;

centers of the apertures are shifted in the second direction with respect to a line parallel to the first direction and passing through a center of the unit of display, and the aperture of the pixel displaying the first observing point image and aperture of the pixel displaying the second observing point image are point-symmetric about the center of the unit of display; and the third aperture width is different from the first aperture width.

In order to achieve the above object, the terminal device according to a third exemplary aspect of the present invention has the image display device according to a first exemplary aspect of the present invention installed.

The present invention can minimize influence of 3D moire, reduce 3D crosstalk, and improve the three-dimensional display quality.

BRIEF DESCRIPTION OF THE DRAWINGS

These objects and other objects and advantages of the present invention will become more apparent upon reading of the following detailed description and the accompanying drawings in which:

[FIG. 12] An illustration for explaining the polarities entered in the data lines upon dot inversion drive in the image display device according to Embodiment 1 of the present invention;

[FIG. 22] An illustration for explaining the polarities entered in the data lines upon dot inversion drive in the image display device according to Embodiment 2 of the present invention;

EXEMPLARY EMBODIMENTS

Image display devices according to embodiments of the present invention will be described hereafter with reference to the drawings.

[Embodiment 1]

An image display device according to this Embodiment, display panel to be installed in the image display device, terminal device in which the image display device is installed, and driving method thereof will be described hereafter.

Figure 1:
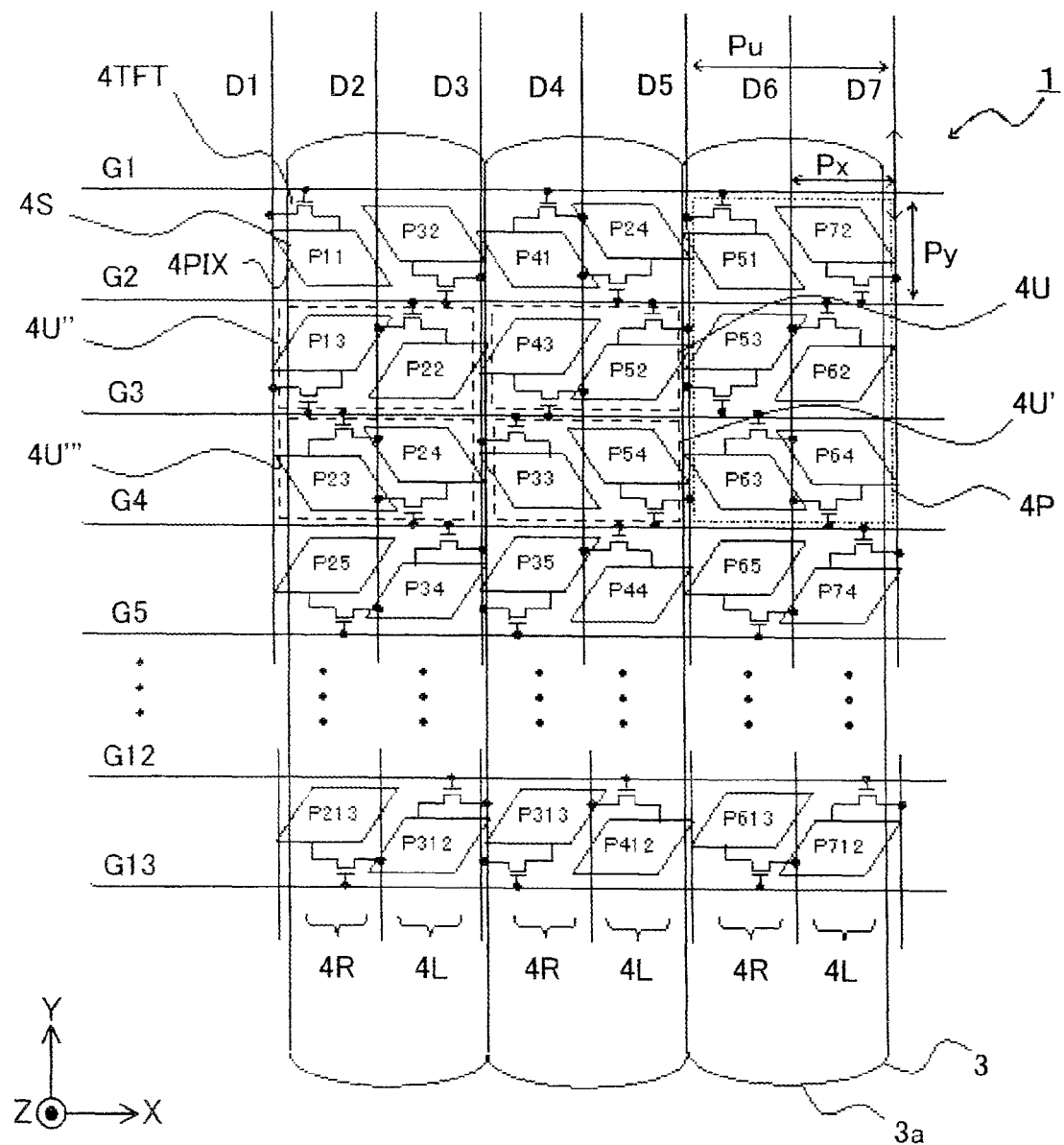
[FIG. 1] A plane view showing subpixels of the display panel according to Embodiment 1 of the present invention.
Figure 2:
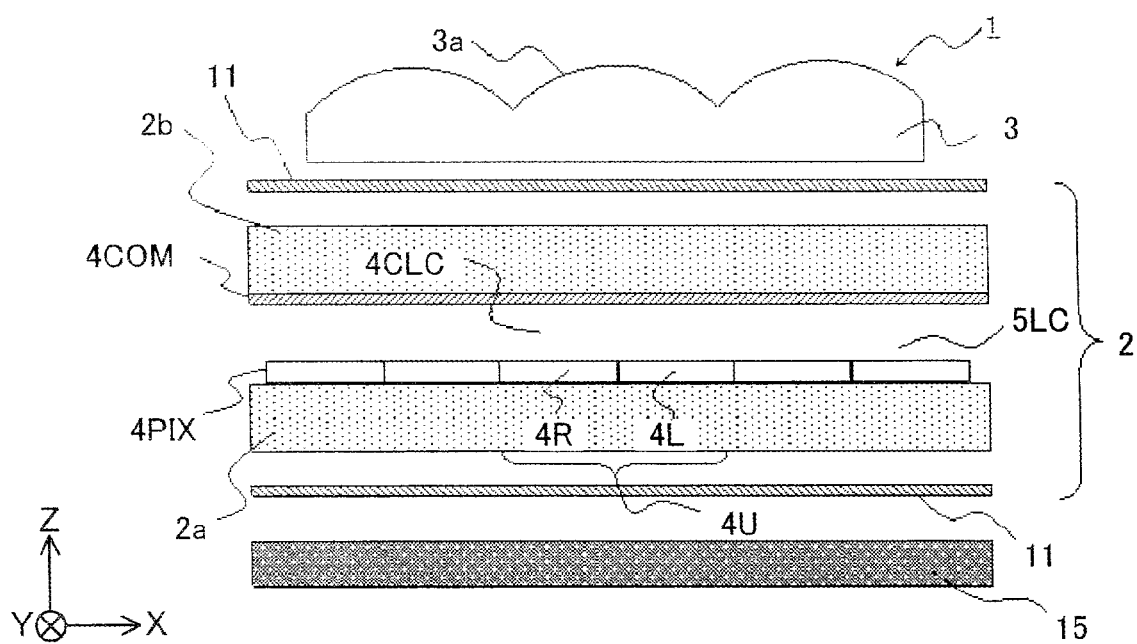
[FIG. 2] A cross-sectional view showing the image display device according to Embodiment 1 of the present invention.

As shown in FIGS. 1 and 2, an image display device 1 according to this Embodiment comprises a display panel 2, a lenticular lens 3, and a backlight 15. The display panel 2 is an electro-optic element using liquid crystal molecules and a display panel having pixels 4P arranged in a matrix. The lenticular lens 3 is placed on the display surface side of the display panel 2, namely the side closer to an user. The backlight 15 is placed on the back of the display panel 2.

As shown in FIG. 1, units of display 4U, 4U', 4U", and 4U''' are arranged in a matrix in the display unit of the display panel 2. The unit of display 4U comprising a first observing point subpixel 4S and a second observing point subpixel 4S and so do the units of display 4U', 4U", and 4U'''. Here, the first observing point pixel corresponds to a right-eye pixel 4R and the second observing point pixel corresponds to a left-eye pixel 4L. In other words, the unit of display 4U is a pixel for three-dimensional display of two observing points. Therefore, the display panel 2 is a liquid crystal display panel comprising subpixels 4S displaying a left-eye image and subpixels 4S displaying a right-eye image for three-dimensional display of two observing points.

The lenticular lens 3 shown in FIGS. 1 and 2 is a lens array comprising a one-dimensional array of many cylindrical lenses 3a. A cylindrical lens 3a is a one-dimensional lens having a convex part in a domed shape. The extending direction or longitudinal direction of a cylindrical lens 3a is perpendicular to the arrangement direction of a cylindrical lens 3a in the display plane. The cylindrical lenses 3a have no lens effect in the extending direction; they have lens effect only in the array direction perpendicular to the extending direction. Hence, the lenticular lens 3 is a one-dimensional lens array having lens effect only in the array direction of the cylindrical lenses 3a. The array direction of the cylindrical lenses 3a is in accord with the direction in which the left-eye pixels 4L and right-eye pixels 4R are alternately arranged. The cylindrical lenses 3a are each positioned in accordance with the above-mentioned units of display 4U, 4U', 4U", and 4U'''.

Figure 3:
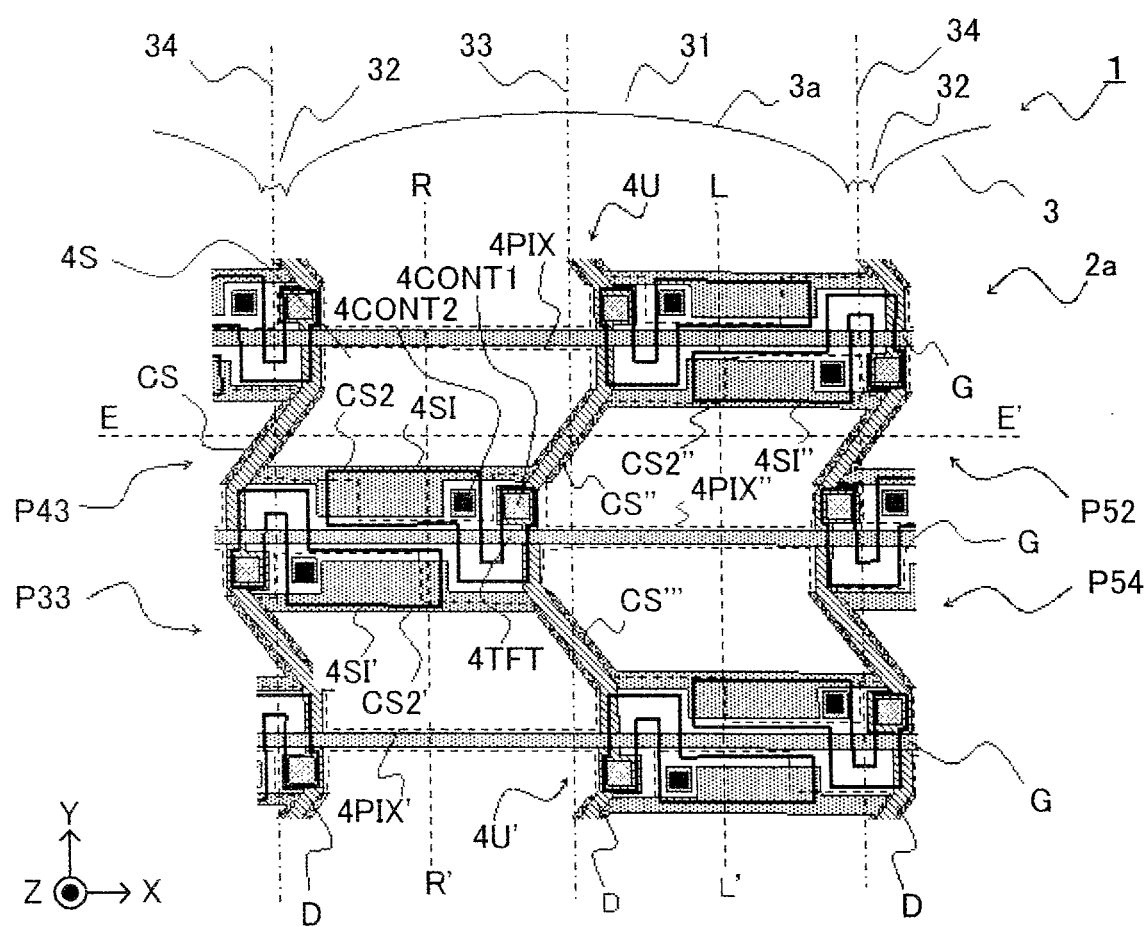
[FIG. 3] An enlarged view showing subpixels of the display panel according to Embodiment 1 of the present invention.

The TFT substrate 2a of the units of display 4U and 4U' has the layout structure as shown in FIG. 3. The units of display 4U and 4U' are different in the layout structure because a pixel thin-film transistor 4TFT is connected to a gate line G and data line D differently as shown in FIG. 1. Similarly, the units of display 4U" and 4U''' are also different in the layout structure. Here, the units of display 4U, 4U', 4U", and 4U''' all comprise a left-eye pixel 4L and a right-eye pixel 4R. Therefore, they are collectively referred to as "a unit of display 4U" for explaining the common structure. Furthermore, in the following explanation, the left-eye pixel 4L and right-eye pixel 4R are termed "a subpixel" without distinguishing one from the other for explaining the structure common to the pixels constituting a unit of display 4U. In other words, it can be said that a unit of display 4U comprises two subpixels 4S adjacent to each other. Furthermore, in the following explanation, "the display unit" refers to the entire screen region of the display panel 2 and "the display region" refers to the aperture of a subpixel 4S for distinction.

Here, as shown in FIG. 3, the optical axes determined according to the structure of a cylindrical lens 3a are defined as follows. The convex surface of a cylindrical lens 3a facing an user is termed the lens convex part 31. The trough part between adjacent cylindrical lenses 3a is termed the lens concave part 32. A virtual line extending along the longitudinal direction of a cylindrical lens 3a at the lens convex part 31 is termed the first axis 33. A virtual line extending along the longitudinal direction of a cylindrical lens 3a at the lens concave part 32 is termed the second axis 34. The first axis 33 is situated at the center of a unit of display 4U and the second axis 34 is situated at the border between adjacent units of display 4U.

As mentioned above, the cylindrical lens 3a has lens effect only in the direction perpendicular to its extending direction. Then, in this Embodiment, the direction in which the lens effect appears is in accord with the direction in which the left-eye pixels 4L and right-eye pixels 4R are alternately arranged. Consequently, the cylindrical lens 3a serves as a light beam separating unit separating light of the left-eye pixel 4L and light of the right-eye pixel 4R into different directions. Then, the lenticular lens 3 can separate an image displayed by the left-eye pixel 4L and an image displayed by the right-eye pixel 4R into different directions. In other words, the lenticular lens 3 is an optical member serving as an image separating unit or an image distributing unit. Furthermore, having lens effect as mentioned above, the cylindrical lens 3a has a focal point in accordance with its radius of curvature. Here, the focal length of a cylindrical lens 3a is defined as the distance between the principal point or vertex of the cylindrical lens 3a and the focal point. The focal length of a cylindrical lens 3a in this Embodiment is the distance between the vertex of the cylindrical lens 3a and the subpixel surface or a surface on which the left-eye pixels 4L and right-eye pixels 4R are arranged. The focal length is not confined thereto and can be set as appropriate by changing the radius of curvature or lens position of a cylindrical lens 3a.

In the following explanation, an XYZ Cartesian coordinate system is defined as follows for the purpose of convenience. In the direction in which the left-eye pixels 4L and right-eye pixels 4R are alternately arranged, the direction from the right-eye pixel 4R to the left-eye pixel 4L is defined as the +X direction and the opposite direction is defined as the −X direction. The +X direction and −X direction are collectively termed the X-axis direction. The longitudinal direction of a cylindrical lens 3a is defined as the Y-axis direction. Furthermore, the direction perpendicular both to the X-axis direction and to the Y-axis direction is defined as the Z-axis direction. In the Z-axis direction, the direction from the plane on which the left-eye pixels 4L or right-eye pixels 4R are arranged to the lenticular lens 3 is defined as the +Z direction and the opposite direction is defined as the −Z direction. The +Z direction extends forward or to the user. The user views the display panel 2 on the side facing in the +Z direction. Furthermore, the +Y direction is the direction in which a right-handed coordinate system is established. In other words, when the thumb of the right hand of a person is pointed in the +X direction and the index finger is pointed in the +Y direction, the middle finger points in the +Z direction. In the figures of this specification, the point of origin with a symbol x indicates that the direction from the front to back of the sheet is the positive direction and the point of origin with a filled circle indicates that the direction from the back to front of the sheet is the positive direction.

In the following explanation, a line of subpixels arranged in the X-axis is referred to as a row and a line of subpixels arranged in the Y-axis is referred to as a column. Furthermore, when the term "vertical" or "horizontal" is used with respect to the XY-plane, the "vertical" direction is the direction parallel to the Y-axis and the "horizontal" direction is the direction parallel to the X-axis. When the term "upward" or "downward" is used with respect to the XY-plane, the "upward" or "downward" direction is the direction parallel to the Y-axis and the "upward" direction is the +Y direction and the "downward" direction is the –Y direction.

With the XYZ Cartesian coordinate system defined above, the cylindrical lenses 3a are arrayed in the X-axis direction and the left-eye and right-eye images are separated in the X-axis direction. Furthermore, the units of display 4U comprising left-eye and right-eye pixels 4L and 4R are lined up in the Y-axis direction. The array pitch of units of display 4U and the array pitch of cylindrical lenses 3a in the X-axis direction are equal. A column of units of display 4U arranged in the Y-axis direction is so provided as to correspond to one cylindrical lens 3a.

As shown in FIG. 2, the display pixel 2 has a TFT substrate 2a and an opposite substrate 2b with a small space in-between, in which a liquid crystal layer 5LC is provided. The liquid crystal layer 5LC is configured to work, for example, in a transmission TN mode. This is not restrictive and any other liquid crystal mode can be employed. The TFT substrate 2a is provided on the –Z side of the display panel 2 and the opposite substrate 2b is provided on the +Z side. Then, the lenticular lens 3 is provided on the +Z side of the opposite substrate 2b. Polarizing plates 11 are applied to the +Z side of the TFT substrate 2a and to the –Z side of the opposite substrate 2b.

The display panel 2 is an active-matrix liquid crystal display panel having thin-film transistors (TFTs). The thin-film transistors serve as a switch for transferring display signals to the subpixels. This switch is operated by gate signals running through gate lines connected to the gate of the switch. In this Embodiment, data lines D1 to D7 extending in the column direction (the Y-axis direction) are provided on the surface of the TFT substrate 2a facing the liquid crystal layer 5LC (the surface facing in the +Z direction). Here, the data lines D1 to D7 are collectively referred to as the data line D. Furthermore, gate lines G1 to G13 extending in the row direction (the X-axis direction) are provided on the same surface of the TFT substrate 2a. Here, the gate lines G1 to G13 are collectively referred to as the gate line G. The data line D serves to supply display data signals to the thin-film transistors.

In this Embodiment, the gate lines G extend in the X-axis direction and arrayed in the Y-axis direction. Here, the gate lines G can be angled. When angled, the gate lines G are angled multiple times while extending in the X-axis direction. On the other hand, the data lines D are angled multiple times while extending in the Y-axis direction. The data lines D are arrayed in the X-axis direction. A subpixel 4S (a left-eye pixel 4L or right-eye pixel 4R) is placed near the intersection between a gate line G and a data line D.

Particularly, in FIG. 1, in order to clarify how a subpixel 4S is connected to a gate line G and a data line D, for example, a subpixel 4S connected to a data line D3 and a gate line G2 is denoted as P32. In other words, the letter P is followed by the number accompanying the data line D and then followed by the number accompanying the gate line G.

In this Embodiment, the limited numbers of gate lines G and data lines D necessary for explanation are used for easier understanding. However, the numbers are not restricted thereto and do not affect the nature of the present invention.

Figure 4:
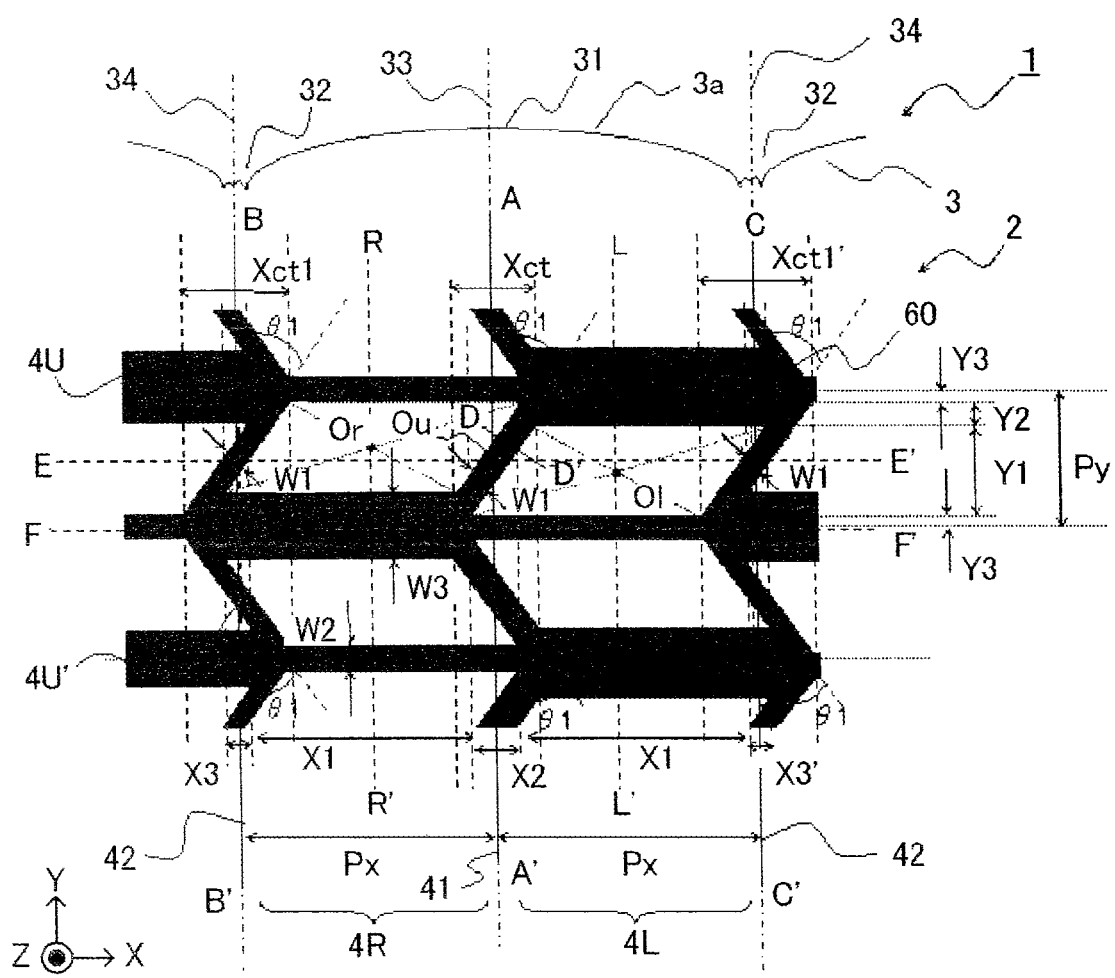
[FIG. 4] An enlarged view showing subpixels of the display panel according to Embodiment 1 of the present invention.

In FIG. 1, in order to clarify how a subpixel 4S is connected to a gate line G and a data line D, the pixel thin-film transistor 4TFT and pixel electrode 4PIX shown in FIG. 3 are extracted. In FIGS. 3 and 4, the components are shown in different size and scale as appropriate for ensuring the visibility of the figure.

As shown in FIG. 1, the region enclosed by adjacent gate lines G and data lines D forms a pixel region corresponding to a subpixel 4S. An aperture is formed in such a subpixel 4S.

The display panel 2 has a subpixel structure as shown in FIG. 3 when the TFT substrate 2a is seen from the observer side. A subpixel 4S is provided with a data line D, a gate line G, a pixel electrode 4PIX, a pixel thin-film transistor 4TFT, a charging capacitor electrode CS2, a charging capacitor line CS, and a silicon layer 4SI. The charging capacitor electrode CS2 is formed in the same layer as the charging capacitor line CS and electrically connected to the charging capacitor line CS. The charging capacitor 4CS is mainly formed between the charging capacitor electrode CS2 and an electrode comprising the silicon layer 4SI via an insulating layer. The charging capacitor electrode CS2 is an electrode part corresponding to the region where the charging capacitor 4CS is formed. The charging capacitor line CS is a wire mutually connecting the charging capacitor electrodes CS2 of adjacent subpixels 4S.

The pixel thin-film transistor 4TFT is a MOS thin-film transistor. One of the source and drain electrodes is connected to a data line D via a contact hole 4CONT1 and the other is connected to the pixel electrode 4PIX via a contact hole 4CONT2. Then, the pixel electrode 4PIX has the same potential as an electrode comprising the silicon layer 4SI. Consequently, a charging capacitor 4CS is formed between the electrode comprising the silicon layer 4SI and the charging capacitor electrode CS2. Then, the gate electrode of the pixel thin-film transistor 4TFT is connected to a gate line G. Furthermore, an opposite electrode 4COM is formed on the side of the opposite substrate 2b facing the liquid crystal layer 5LC. A pixel capacitor 4CLC is formed between the opposite electrode 4COM and pixel electrode 4PIX.

In this Embodiment, the electrode connected to the pixel electrode 4PIX is termed the source electrode and the electrode connected to a signal line is termed the drain electrode.

Here, as shown in FIG. 3, the contact hole 4CONT1 is shaded in gray, the contact hole 4CONT2 is filled in black, the pixel electrode 4PIX is indicated by dotted lines, and the silicon layer 4SI is indicated by solid lines.

Figure 13:
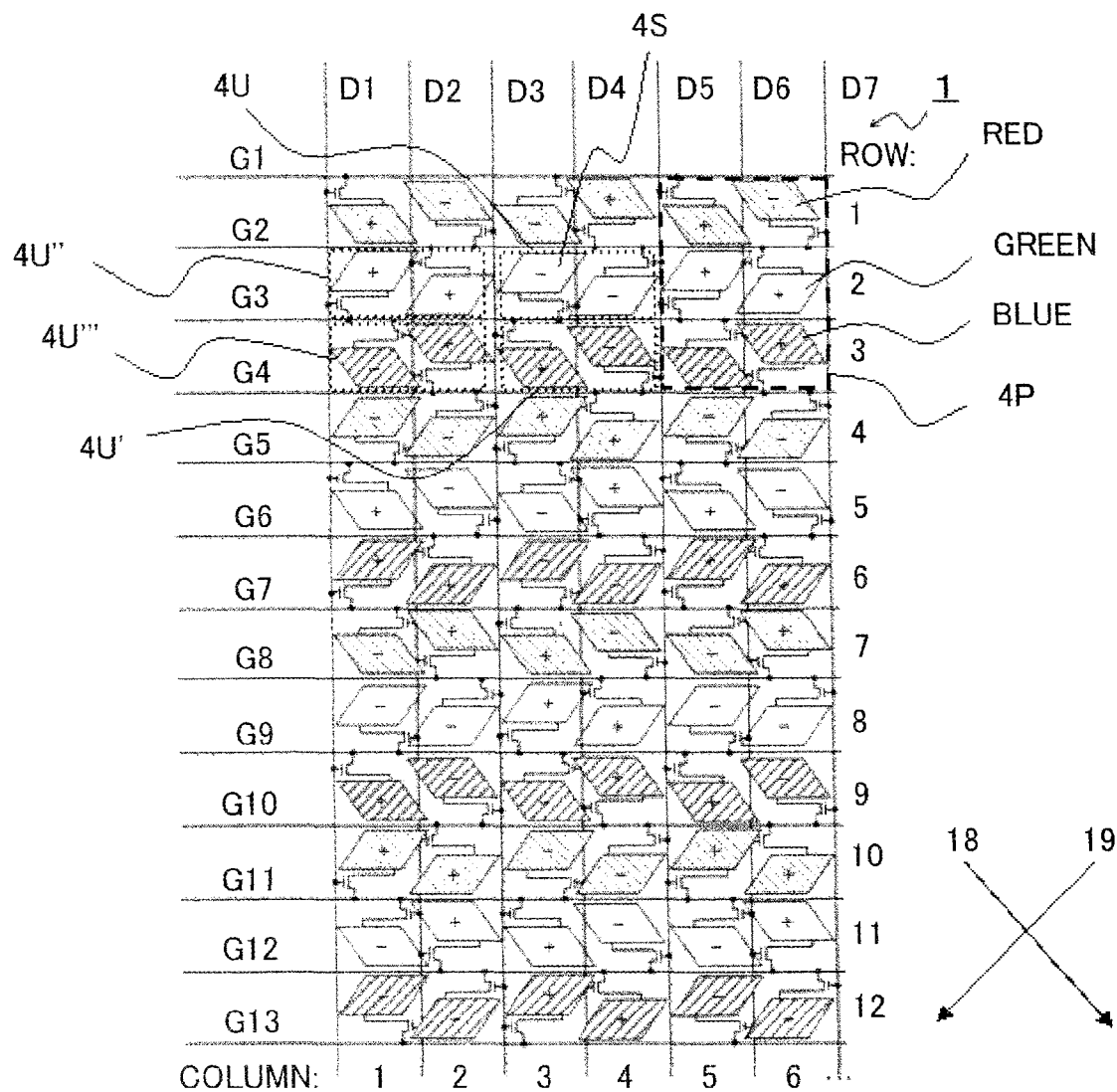
[FIG. 13] An illustration showing the polarities of subpixels in the image display device according to Embodiment 1 of the present invention.

As shown in FIG. 1, in this Embodiment, one pixel 4P comprises of three units of display 4U arranged in the Y-axis direction. Each unit of display 4 is colored in red, green, or blue as shown in FIG. 13. Red, green, and blue color filters each extend in the X-axis direction and create a stripe pattern repeated in the Y-axis direction. The number of colors is not limited to three and the monochrome consisting of one color can be used. Furthermore, the order of colors is not restricted to the above and the hue is not restricted to those colors. Three or more colors can be used. In this Embodiment, the color filters and black matrix are provided on the surface of the opposite substrate 2b facing the liquid crystal layer 5LC.

One pixel 4P comprising three units of display 4U arranged in the Y-axis direction and has a square shape comprising subpixels 4S arranged in three rows and two columns. Then, the pixel pitch Pu is presented by 3×Py or 2×Px in which Px is the pitch of subpixels 4S in the X-axis direction and Py is the pitch of subpixels 4S in Y-axis direction, and the following relationship is satisfied.

$$Pu = 2 \times Px = 3 \times Py \qquad \text{[Math 1]}$$

Figure 5:
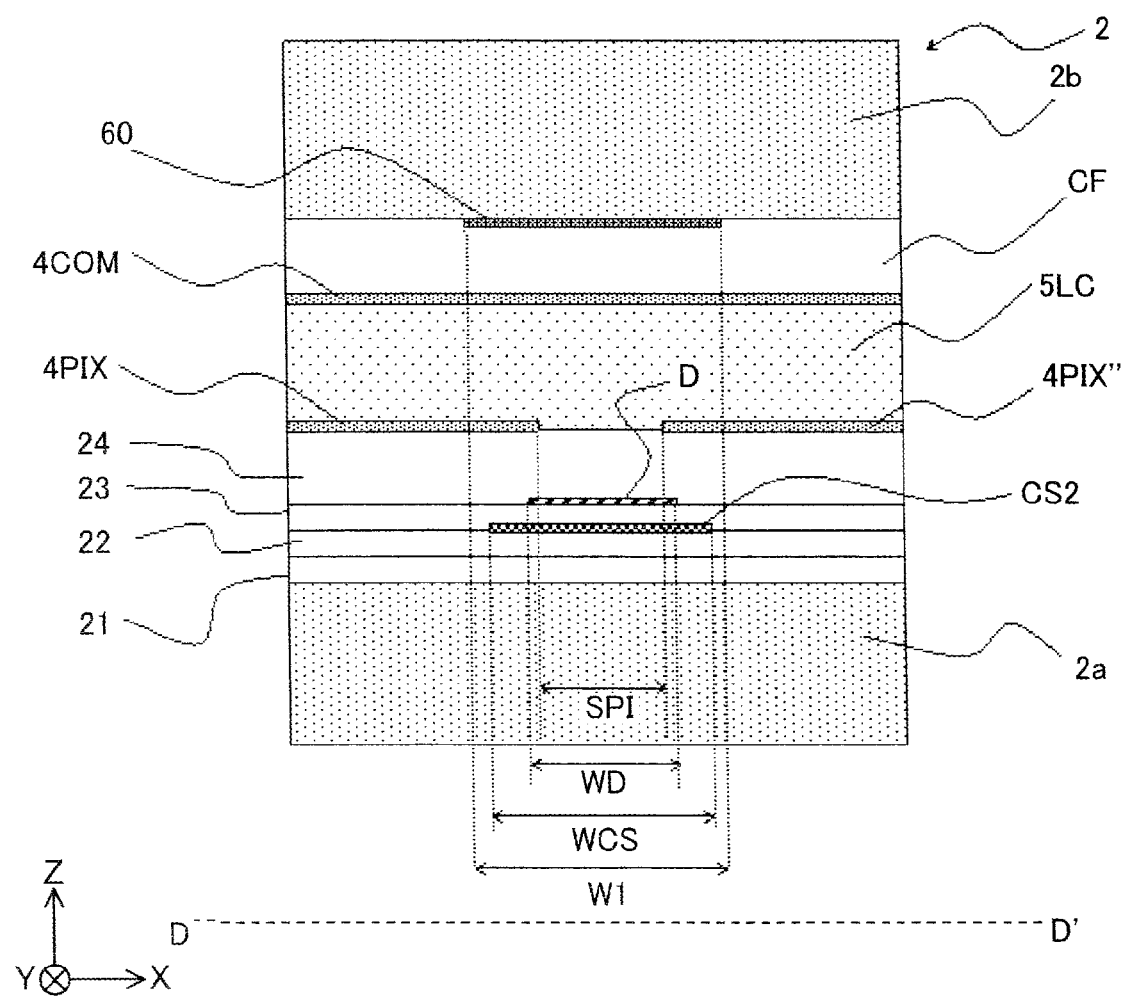
[FIG. 5] A cross-sectional view at the line D-D' of the display panel according to Embodiment 1 of the present invention.
Figure 6:
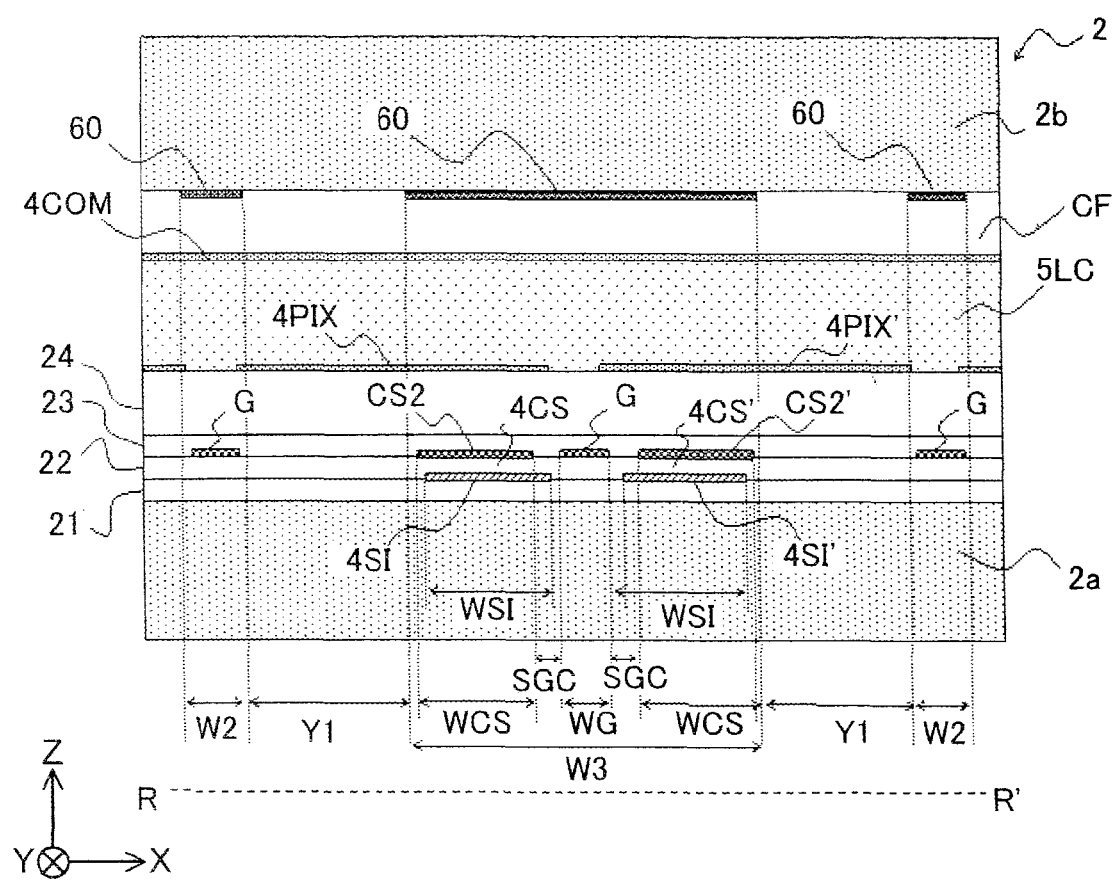
[FIG. 6] A cross-sectional view at the line R-R' of the display panel according to Embodiment 1 of the present invention.

The cross-sectional structure at the line D-D' in FIG. 4 is shown in FIG. 5. The cross-sectional structure at the line R-R' in FIG. 4 is shown in FIG. 6.

In this specification, the area other than the shielding unit is defined as the aperture. The black matrix 60 in this Embodiment is provided to the opposite substrate 2b on the side to the liquid crystal layer 5LC as the shielding unit covering all but the apertures of subpixels 4S, and has nearly parallelogram apertures. As shown in FIGS. 5 and 6, the black matrix 60 covers the pixel thin-film transistor 4TFT, gate line G and date line D and substantially functions as the shielding unit. In other words, in this Embodiment, the area other than the black matrix 60 is the aperture.

In this specification, the term "shielding unit" is used. This is not restricted to the black matrix 60 in particular and refers to portions that transmit no light. Therefore, it is possible that there is no black matrix 60 on the date line D or gate line G and the black matrix 60 covers only the thin-film transistor TFT and charging capacitor electrode CS2. In such a case, the date line D or gate line G serves as the shielding unit.

Here, as mentioned above, the subpixel 4S of the display panel 2 can be considered to substantially have a parallelogram shape from its aperture shape; then, the term "parallelogram pixel" is used in the explanation. Of the aperture of a parallelogram pixel, the boundary between the upper edge of the aperture and the shielding unit is defined as the upper side, the boundary between the lower edge of the aperture and the shielding unit is defined as the lower side, and the oblique boundary between the right or left edge of the aperture and the shielding unit is defined as the oblique side. Having a parallelogram shape, the opposing upper and lower sides of a parallelogram pixel are equal in length and the opposing oblique sides thereof are equal in length. In this Embodiment, the upper and lower sides are larger in length than the oblique sides.

As shown in FIG. 4, the apertures of parallelogram pixels arranged in the X-axis direction have regions overlapping with each other in the Y-axis direction. The shielding unit at the boundary between a right-eye pixel 4R and a left-eye pixel 4L is provided for the purpose of shielding the wiring part and, therefore, has a width W1 determined according to the width of the wiring part. For efficient placement of the wiring part, it is desirable to provide linear wiring parts at the oblique sides of a parallelogram pixel. In such a case, the shielding width is nearly constant.

The lines A-A', B-B', and C-C' are parallel to the Y-axis and situated in the regions where subpixels 4S adjacent in the X-axis direction overlap with each other. Particularly, the line A-A' indicates the boundary between the subpixels 4S adjacent in the X-axis direction in a unit of display 4U. The lines B-B' and C-C' indicate the boundary between units of display 4U adjacent in the X-axis direction. Furthermore, the line E-E' is parallel to the X-axis and passes through the center Ou of the unit of display 4U. The line F-F' indicates the boundary between the units of display 4U and 4U' adjacent to each other in the Y-axis direction.

Here, the inclination of wires is defined as a positive angle in the clockwise direction with respect to the +Y direction being at 0 degree. The oblique sides in the unit of display 4U have an inclination of +θ1, and the oblique sides in the unit of display 4U' have an inclination of −θ1. In other words, the wires on the oblique sides of parallelogram pixels are arranged at the same inclination in the X-axis direction and arranged at an inclination +θ1 or −θ1 alternately every other row in the Y-axis direction.

Since the aperture of a subpixel 4S is in the shape of a parallelogram, the aperture is equivalent upon rotation by 180 degrees in the XY plane and asymmetric about the line R-R' or L-L' parallel to the Y-axis and passing through the center Or or Ol of the subpixel. Here, the aperture is not restricted in shape to a parallelogram as long as the aperture is equivalent upon rotation by 180 degrees in the XY plane as just mentioned. For example, the aperture can be in any shape including of a trapezoid, polygon, oval, semicircle, crescent, and a shape having a curvature.

The unit of display 4U has the center Ou and the subpixels 4S adjacent to each other in the X-axis direction in the unit of display 4U are point-symmetric about the center Ou. The apertures of right-eye and left-eye pixels 4R and 4L have the centers Or and Ol, respectively, around the intersection of the diagonals of a parallelogram. The centers Or and Ol are shifted in the Y-axis direction to be away from the line E-E'. The units of display 4U and 4U' are line-symmetric about the line F-F'.

There is a region at the boundary between the subpixels 4S (a right-eye pixel 4R and a left-eye pixel 4L) in the unit of display 4U where their apertures overlap with each other in the Y-axis direction. That region has a width X2 in the X-axis direction. On the other hand, there are regions at the boundaries between units of display 4U adjacent to each other in the X-axis direction where their apertures overlap with each other in the Y-axis direction. Those regions have a width X3 or X3' in the X-axis direction. The subpixels 4S (a right-eye pixel 4R and a left-eye pixel 4L) of a unit of display 4U have regions where their apertures do not overlap with each other, namely non-overlapping regions. Those regions have a width X1 in the X-axis direction.

As described above, the subpixels 4S of a unit of display 4U have parallelogram apertures shifted in the Y-axis direction to be away from each other. Therefore, the overlapping width X2 of the apertures of subpixels 4S is larger than the overlapping widths X3 and X3' of the apertures of subpixels 4S between units of display 4U. Then, the following relationship is satisfied for the overlapping regions of the apertures of subpixels 4S.

$$X2 \geq X3 \qquad \text{[Math 2]}$$

$$X2 > X3' \qquad \text{[Math 3]}$$

At the line A-A', the vertexes of parallelogram apertures adjacent to each other in the X-axis direction are away from each other in the Y-axis direction so as to increase the overlapping width X2 in the X-axis direction and, then, increase the overlapping area. Furthermore, at the lines B-B' and C-C', the vertexes of parallelogram apertures adjacent to each other in the X-axis direction are closer to each other in the Y-axis direction so as to reduce the overlapping widths X3 and X3' in the X-axis direction and, then, reduce the overlapping area.

In this specification, the aperture width in the Y-axis direction of the aperture of a subpixel 4S is termed the vertical aperture width. Particularly, the vertical aperture width is the total of the aperture widths in the Y-axis direction of the apertures of subpixels 4S in regions where the apertures of subpixels 4S (a right-eye pixel 4R and a left-eye pixel 4L) adjacent to each other in the X-axis direction overlap with each other in the Y-axis direction.

Figure 7:
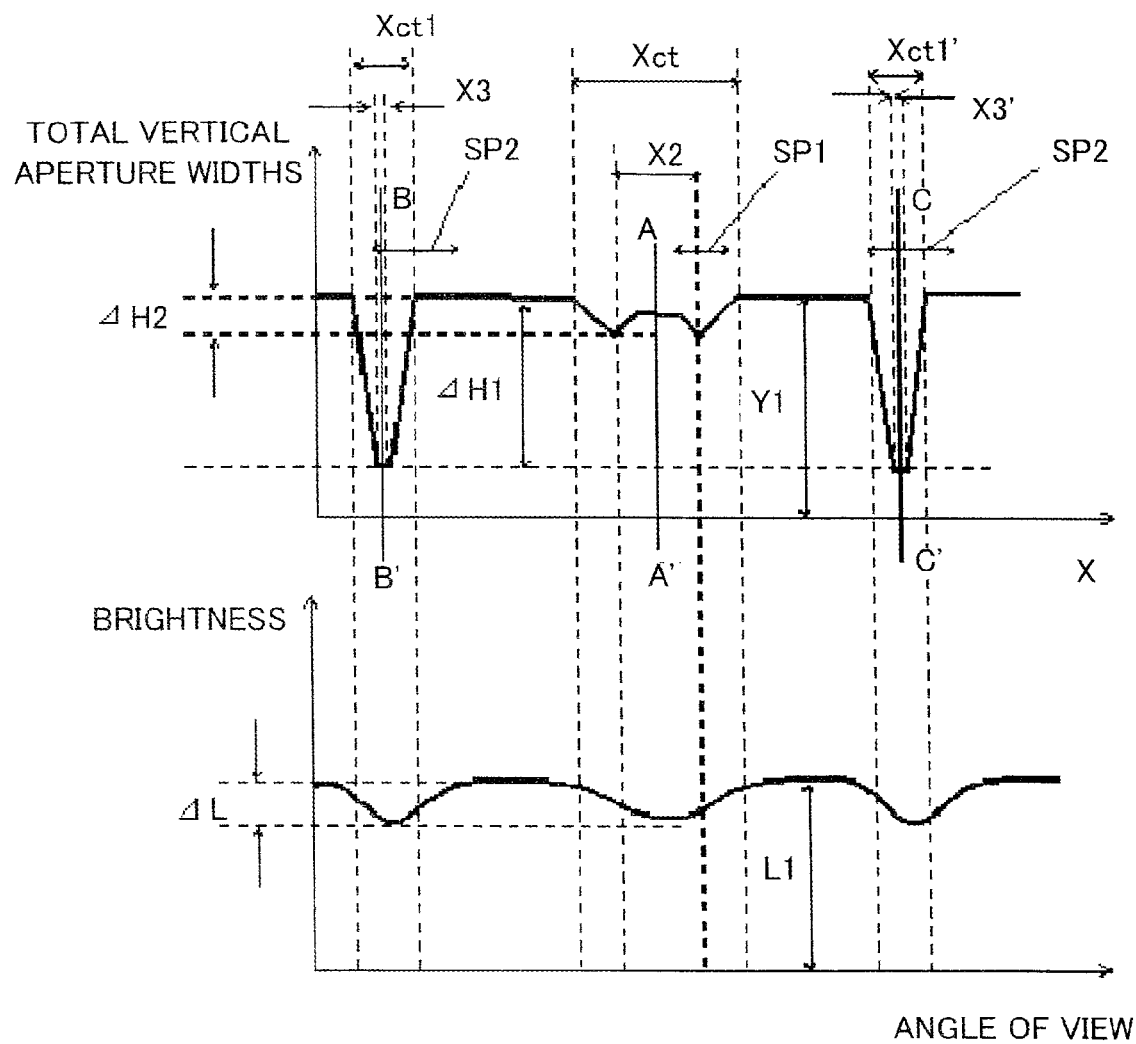
[FIG. 7] Schematic charts showing the profiles of vertical aperture width and brightness in a subpixel of the display panel according to Embodiment 1 of the present invention.

The vertical aperture width profile in a subpixel of the display panel 2 according to this Embodiment and the brightness profile of the image display device 1 are as shown in FIG. 7. As shown in the profile at the top of FIG. 7, the total width in the Y-axis direction of the apertures of a left-eye pixel 4L and a right-eye pixel 4R at the line A-A' is larger than the total widths in the Y-axis direction of the left-eye pixel 4L and right-eye pixel 4R at the lines B-B' and C-C'. As shown in the profile at the bottom of FIG. 7, light transmitted through the display panel 2 and lenticular lens 3 is evened and has a gentle profile when it is displayed by the image display device 1.

The transistor structure in this Embodiment will be described hereafter.

The pixel thin-film transistor 4TFT shown in FIG. 3 is a polysilicon thin-film transistor using polycrystalline silicon as a semiconductor. The polycrystalline silicon is, for example, a P-type semiconductor containing a tiny amount of boron. In other words, the pixel thin-film transistor 4TFT is a PMOS thin-film transistor that becomes conductive between the source and drain electrodes when the gate electrode has a potential lower than the source or drain electrode.

The polysilicon thin-film transistor is formed, for example, by forming a first insulating layer 21 comprising silicon oxide on the TFT substrate 2a, forming an amorphous silicon layer, and polycrystallizing the amorphous silicon layer to form a polysilicon thin film. The polycrystallization can be done by thermal annealing or laser annealing. Particularly, laser annealing using a laser such as an excimer laser can polycrystallize only the silicon layer while minimizing the temperature rise in the glass substrate. Therefore, alkali-free glass having a low melting point can be used; then, the cost can be reduced. For that reason, it is called low-temperature polysilicon and widely used. Here, an amorphous silicon thin-film transistor can be realized by eliminating the annealing step.

Then, a second insulating layer 22 comprising silicon oxide as a gate insulating layer is formed on the silicon layer and patterned as appropriate. In this process, it is preferable to dope ions in regions that will not be used as the silicon thin-film semiconductor layer so as to make such regions conductive. The patterning can be done by optical patterning using a photosensitive resist. For example, a photosensitive resist is applied by spin-coating, partially irradiated with light using an exposure device such as a stepper, and developed to leave a film of photosensitive resist only in the regions where the pattern will stay. Then, the silicon layer in the regions where the photosensitive resist film is absent is eliminated by dry etching or the like. Finally, the photosensitive resist film is peeled off.

Then, an amorphous silicon layer to form a gate electrode and a tungsten silicide layer are formed so as to create a gate electrode and the like. Here, the gate line to which the gate electrode is connected and/or the charging capacitor electrode and charging capacitor line can be formed in a similar manner. Then, a third insulating layer 23 comprising a silicon oxide layer and a silicon nitride layer is formed and patterned as appropriate. Subsequently, an aluminum layer and a titanium layer are formed to create a source electrode and a drain electrode. Here, the data line can concurrently be formed.

Then, a fourth insulating layer 24 comprising silicon nitride is formed and patterned as appropriate. Subsequently, a transparent electrode comprising, for example, ITO is formed and patterned to create a pixel electrode 4PIX. Consequently, a subpixel structure having a thin-film transistor can be formed. The fourth insulating layer 24 desirably has flattening effect and can be an insulating layer comprising multiple inorganic and organic films.

Here, the above thin-film transistor can be used to concurrently form the circuits driving the gate lines, data lines, and charging capacitor lines.

In this Embodiment, the gate driver circuit for scanning the gate lines G in sequence is formed on the TFT substrate 2a concurrently with the thin-film transistors. In this way, the frame of the display panel 2 can be smaller in width. With the subpixels and gate driver circuit being formed on the TFT substrate 2a in an integrated manner, the driver circuit can have a smaller number of parts, leading to reduced cost and low power consumption.

An exemplary configuration of the image display device 1 according to this Embodiment and conditions for the lenticular lens 3 to serve as an image distributing unit will be described hereafter. In this Embodiment, the image distributing unit has to distribute light emitted from the subpixels 4S into directions different from each other along the first direction in which the left-eye pixels 4L and right-eye pixels 4R are arranged, namely along the X-axis direction. Then, first, the case in which the image distributing effect is maximized will be discussed.

Figure 8:
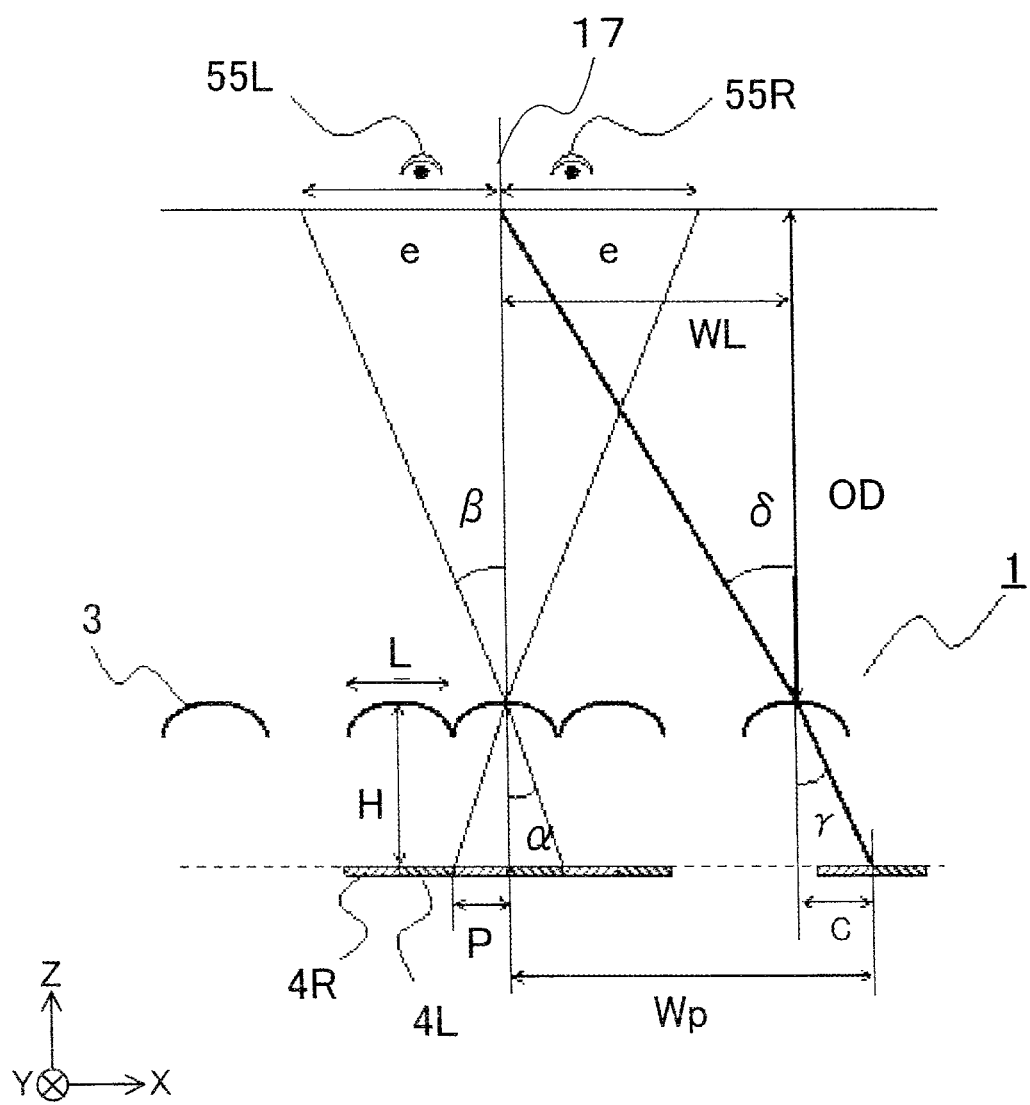
[FIG. 8] A cross-sectional view showing an optical model using a lenticular lens.

As shown in FIG. 8, light emitted from left-eye and right-eye pixels 4L and 4R is distributed by the image separating unit to the left-eye and right-eye observation regions on either side of the line 17 presenting the center axis of image separation. It is assumed that the distance between the principal point, or vertex, of the lenticular lens 3 and the subpixels is H, the refractive index of the lenticular lens 3 is n, and the lens pitch is L. Here, the pitch of subpixels 4S intended for an observing point in the image separation direction is P. In other words, in this Embodiment, the pitch Px in the X-axis direction of each of the left-eye pixels 4L and right-eye pixels 4R is P. The array pitch Pu in the image separation direction of units of display 4U comprising a left-eye pixel 4L and a right-eye pixel 4R is 2P.

The distance between the lenticular lens 3 and the observer is referred to as an optimum observation distance OD. The cycle of enlarged/projected images of subpixels at the distance OD, namely the cycle of widths of projected images of left-eye and right-eye pixels 4L and 4R on a virtual plane at the distance OD from the lens and parallel to the lens, is presented by e. Furthermore, the distance between the center of a cylindrical lens 3a at the center of the lenticular lens 3 and the center of a cylindrical lens 3a at the end of the lenticular lens 3 in the X-axis direction is presented by WL. The distance between the center of a unit of display 4U comprising a left-eye pixel 4L and a right-eye pixel 4R at the center of the display panel 2 and the center of a unit of display 4U at the end of the display panel 2 in the X-axis direction is presented by WP. The incident and exit angles of light to/from a cylindrical lens 3a at the center of the lenticular lens 3 are presented by α and β, respectively. The incident and exit angles of light to/from a cylindrical lens 3a at the end of the lenticular lens 3 in the X-axis direction are presented by γ and δ, respectively. Furthermore, the difference between the distances WL and WP is C and there are 2m subpixels in the region over the distance WP.

The array pitch L of cylindrical lenses 3a and the array pitch P of subpixels are related to each other. Therefore, one is determined in conformity to the other. Generally, the lenticular lens is designed in conformity to the display panel. Then, here, the subpixel array pitch P is treated as a constant. The refractive index n is determined according to selection of the material of the lenticular lens 3. On the other hand, the observation distance OD between the lens and observer and the cycle e of enlarged/projected pixel images at the distance OD are set to desired values. Using these values, the distance H between the lens vertex and subpixels and the lens pitch L are determined. The following mathematical formulae 4 to 12 are established based on the Snell's law and geometric relations.

$$n \times \sin \alpha = \sin \beta \qquad \text{[Math 4]}$$

$$OD \times \tan \beta = e \qquad \text{[Math 5]}$$

$$H \times \tan \alpha = P \qquad \text{[Math 6]}$$

$$n \times \sin \gamma = \sin \delta \qquad \text{[Math 7]}$$

$$H \times \tan \gamma = C \qquad \text{[Math 8]}$$

$$OD \times \tan \delta = WL \qquad \text{[Math 9]}$$

$$WP - WL = C \qquad \text{[Math 10]}$$

$$WP = Pu \times m = 2 \times m \times P \qquad \text{[Math 11]}$$

$$WL = m \times L \qquad \text{[Math 12]}$$

Here, the case in which the image distributing effect is maximized is discussed. The image distributing effect is maximized when the distance H between the vertex of the lenticular lens 3 and the subpixels is equal to the focal length f of the lenticular lens 3, which is presented by the following mathematical formula 13. Assuming that the lens has a radius of curvature r, the radius of curvature r is obtained by the following mathematical formula 14.

$$f = H \qquad \text{[Math 13]}$$

$$r = H \times (n-1)/n \qquad \text{[Math 14]}$$

The above parameters are summarized as follows. The array pitch P of subpixels 4S is determined from the display panel 2. The observation distance OD and cycle e of enlarged/projected pixel images are determined from the settings of the image display device 1. The refractive index n is determined from the material of the lens. The lens array pitch L derived from the above and the distance H between the lens and subpixels are parameters for determining the position at which light from the subpixels 4S is projected on the observation plane. The parameter changing the image distributing effect is the radius of curvature r of the lens. In other words, when the distance H between the lens and subpixels 4S is fixed, images from the right and left pixels 4S are blurred and not clearly separated as the radius of curvature of the lens is deviated from the ideal state. In other words, the range of radiuses of curvature in which the separation effect is valid should be obtained.

Figure 9:
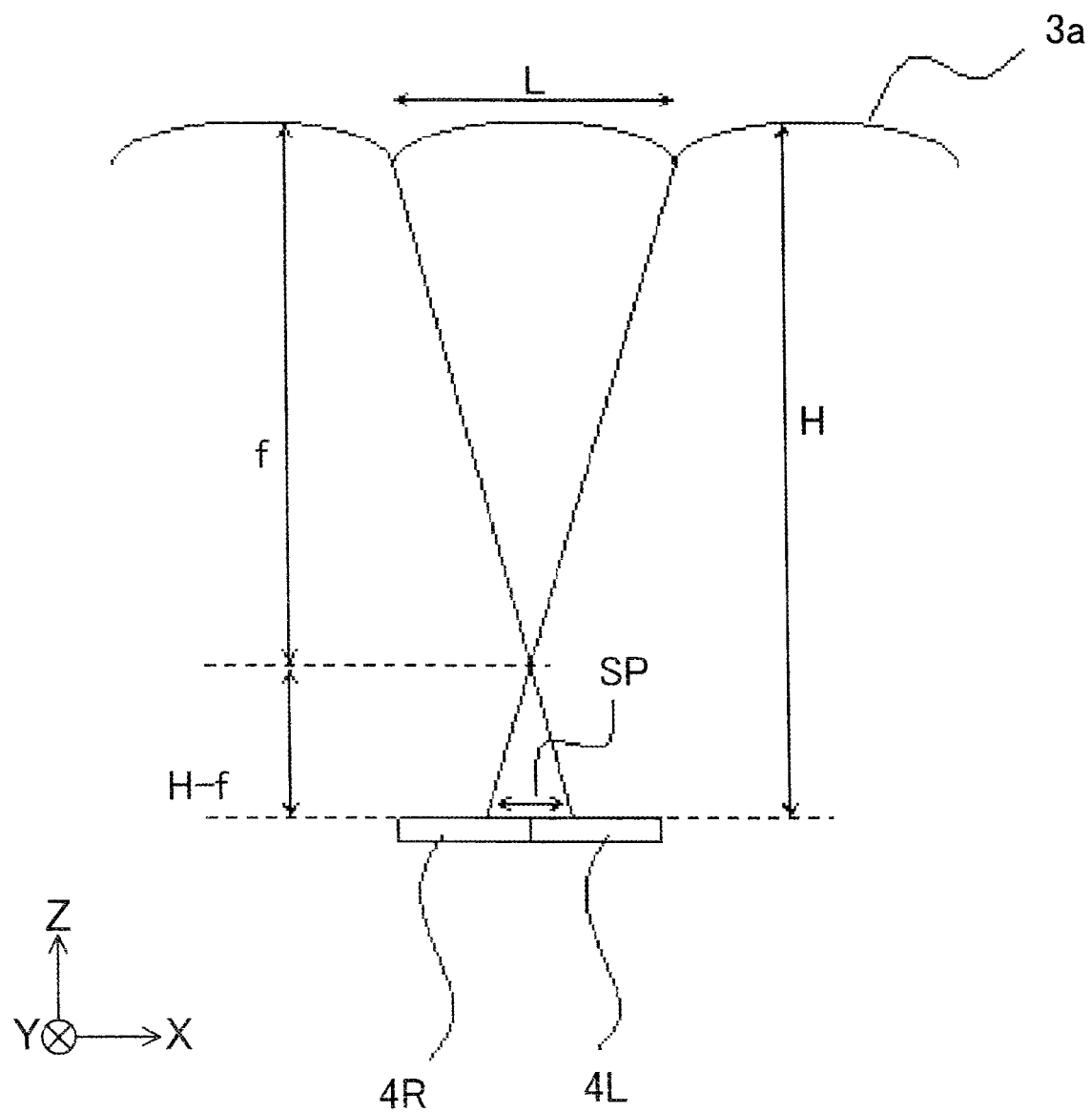
[FIG. 9] An illustration showing an optical model with the minimum radius of curvature for calculating image separation conditions of the lenticular lens.

First, the minimum value in the range of radius of curvature in which the lens separation effect is valid calculated. As shown in FIG. 9, in order for the separation effect to be valid, a triangle having a base given by the lens pitch L and a height given by the focal length f and a triangle having a base given by the sub pixel pitch P and a height H-f must be similar. If so, the following mathematical formula 15 is satisfied and the minimum value fmin of the focal length can be obtained.

$$f\min = H \times L/(L+P) \qquad \text{[Math 15]}$$

Next, the radius of curvature is calculated from the focal length. Using the mathematical formula 14, the minimum value rmin of the radius of curvature can be obtained from the following mathematical formula 16.

$$r\min = H \times L \times (n-1)/(L+P)/n \qquad \text{[Math 16]}$$

Figure 10:
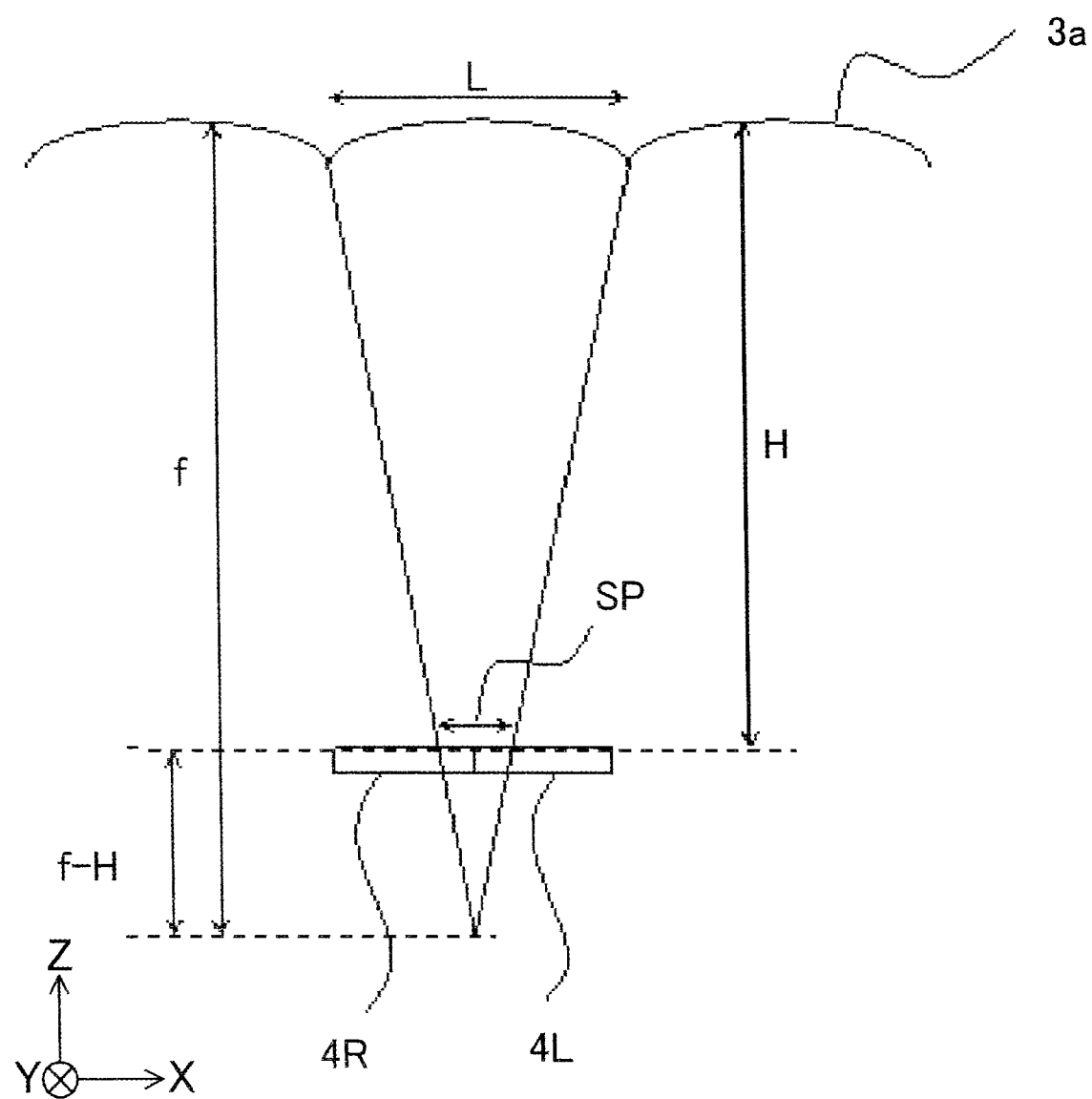
[FIG. 10] An illustration showing an optical model with the maximum radius of curvature for calculating image separation conditions of the lenticular lens.

Next, the maximum value is calculated. As shown in FIG. 10, in order for the separation effect to be valid, a triangle having a base given by the lens pitch L and a height given by the focal length f and a triangle having a base given by the subpixel pitch P and a height f-H must be similar.

Then, the following mathematical formula 17 is satisfied and the maximum value fmax of the focal length can be obtained.

$$f\max = H \times L/(L-P) \qquad \text{[Math 17]}$$

Next, the radius of curvature is calculated from the focal length. Using the mathematical formula 14, the maximum value rmax of the radius of curvature can be obtained from the following mathematical formula 18.

$$r\max = H \times L \times (n-1)/(L-P)/n \qquad \text{[Math 18]}$$

In summary, in order for a lens to have the image distributing effect, the lens has to have a radius of curvature in the range given by the following mathematical formula 19 presented by the mathematical formulae 13 and 15.

$$H \times L \times (n-1)/(L+P)/n \le r \le H \times L \times (n-1)/(L-P)/n \qquad \text{[Math 19]}$$

In the above explanation, an image display device of two observing points having left-eye pixels 4L and right-eye pixels 4R is described. This Embodiment is not restricted thereto. For example, this Embodiment is similarly applicable to an image display device of N observing points. In other words, in the N observing point scheme, the pitch Pu of units of display 4U and the pitch P of subpixels have the relationship Pu=N×P. In such a case, N×m subpixels are included in the region over the above-described distance WP instead of 2m subpixels.

In the configuration of this Embodiment, it is difficult to fully control the vertical aperture ratio near the vertexes of the oblique sides of a parallelogram aperture due to the accuracy of processing the shielding unit. Then, in this Embodiment, as shown in FIGS. 9 and 10, the focal point of the lens is shifted from the subpixel surface to blur an image, thereby reducing influence of the accuracy of processing the shielding unit and improving the image quality.

The technique of shifting the focal point of the lens from the subpixel surface to establish a blurred region as described above for higher image quality will be termed "the defocusing effect" in the following explanation. Furthermore, the width of an effective region in which the blurring occurs is termed "the spot diameter." In this Embodiment, the width over which effective blurring occurs in the X-axis direction is the spot diameter SP. The spot diameter SP is determined in accordance with the distance from the focal point of the lens and, therefore, can be set by adjusting the thickness of the lenticular lens sheet and/or polarizing plate 11 of the opposite substrate 2b.

Here, the width of an oblique side in the X-axis direction, WX1, is given by WX1=W1/sin θ1 as seen in FIG. 4. The distance between the vertexes of an oblique side of a parallelogram aperture is 2×X2. Here, it is preferable that the spot diameter SP on the subpixel surface when the focal point of the lens is shifted from the subpixel surface is between WX1 and 2×X2. When the spot diameter is equal to WX1, this is the borderline diameter to blend and blur the oblique side area of a parallelogram aperture; it is preferable that the spot diameter SP is larger than this. When the spot diameter is equal to 2×X2, the blurred region can be extended to the intersection between the oblique side and upper base of a parallelogram aperture and to the intersection between the oblique side and lower base. However, if the blurred region is further extended, the separation performance of the lens deteriorates. Hence, for giving priority to the separation performance in designing a lens, it is preferable that the radius of curvature of the lens is within the range satisfying the following mathematical formula 20 or 21.

$$H \times L \times (n-1)/(L+2 \times X2)/n \le r \le H \times L \times (n-1)/(L+WX1)/n \qquad \text{[Math 20]}$$

$$H \times L \times (n-1)/(L-WX1)/n \le r \le H \times L \times (n-1)/(L-2 \times X2)/n \qquad \text{[Math 21]}$$

Furthermore, in this Embodiment, the width of an oblique charging capacitor line CS in the X-axis direction, WX2, is given by WX2=W2/sin θ1 as seen in FIG. 4. For blending and blurring the intersection between a charging capacitor line CS and the oblique side of a parallelogram aperture, the spot diameter SP is preferably between WX1 and 2×(WX2+X2). When the spot diameter is equal to WX1, this is the borderline diameter to blend and blur the oblique side area of a parallelogram aperture; it is preferable that the spot diameter SP is larger than this. This is particularly effective when the accuracy of processing the charging capacitor line CS largely impacts the image quality. However, if the blurring rate is further increased, the magnitude of 3D crosstalk is unfavorably increased. Hence, it is preferable that the radius of curvature of the lens is within the range satisfying the following mathematical formula 22 or 23.

$$H \times L \times (n-1)/(L+2 \times WX2+2 \times X2)/n \leq r \leq H \times L \times (n-1)/(L+WX1)/n \quad \text{[Math 22]}$$

$$H \times L \times (n-1)/(L-WX1)/n \leq r \leq H \times L \times (n-1)/(L-2 \times WX2-2 \times X2)/n \quad \text{[Math 23]}$$

As described above, the spot diameter SP can be adjusted by changing the distance between the subpixels and lens for obtaining the defocusing effect. However, with any technique being used to produce the lenticular lens 3 among molding using a die, photolithography, inkjet, and so on, a given shape is ensured more at the lens convex part 31 of a cylindrical lens 3a than at the lens concave part 32 between adjacent cylindrical lenses 3a. The lens convex part 31 tends to have higher optical performance. It is more difficult to remove unpeeled residues and/or adherent foreign substances from the lens concave part 32 than from the lens convex part 31. This causes the lens concave part 32 to have lower optical separation performance. Therefore, there will be difference in the spot diameter SP between the lens convex part and concave part of a lenticular lens, which causes an unevenly profiled defocusing effect in one and the same plane.

As shown in FIG. 7, when the image separating unit has a spot diameter SP2 larger than a spot diameter SP1, the larger spot diameter SP2 is applied to the region where the vertical aperture width fluctuates more, whereby fluctuation in the brightness, namely 3D moire, can effectively be reduced. Furthermore, in the region to which the smaller spot diameter SP1 is applied, 3D crosstalk can effectively be reduced. Then, high quality three-dimensional display having 3D moire and 3D crosstalk balanced can be obtained. The spot diameter SP1 at the lens convex part 31 and the spot diameter SP2 at the lens concave part 32 have the following relationship.

$$SP1 < SP2 \quad \text{[Math 24]}$$

The subpixel structure in this Embodiment will be described in detail hereafter. In order to achieve a high aperture ratio and high image quality in a display device for multiple observing points, the vertical aperture ratio should be maximized while the vertical aperture ratio in subpixels adjacent to each other at the center of a unit of display 4U is made nearly constant regardless of the position in the horizontal direction. Here, the vertical aperture ratio is a value obtained by dividing the width in the Y-axis direction of the aperture in a cross-section of a subpixel at a line extending in the direction perpendicular to the image separation direction (the X-axis direction in this Embodiment) of the image separating unit (namely, extending in the Y-axis direction) by the subpixel pitch in the Y-axis direction. Such a vertical aperture ratio should be maximized while being made nearly constant in the image separation direction.

First, it is preferable that the gate line G and data line D are provided around each subpixel. In this way, the dead space between wires is reduced and the aperture ratio is improved. In other words, it is not recommended to provide the gate lines G or data lines D themselves next to each other with no subpixel in-between. This is because the wires of the same kind have to be spaced to prevent short-circuit when they are provided next to each other. Such a space will become a dead space and reduce the aperture ratio.

The shielding layer and color filters can be provided to the TFT substrate 2a. In this way, the accuracy of superimposition can be improved, allowing the shielding layer to have a smaller width so as to increase the aperture ratio. On the other hand, reducing the width of the shielding layer covering the gate line G leads to reduction in 3D moire, improving the display quality.

The subpixel structure and lens effect in this Embodiment will be described in detail hereafter.

Figure 11:
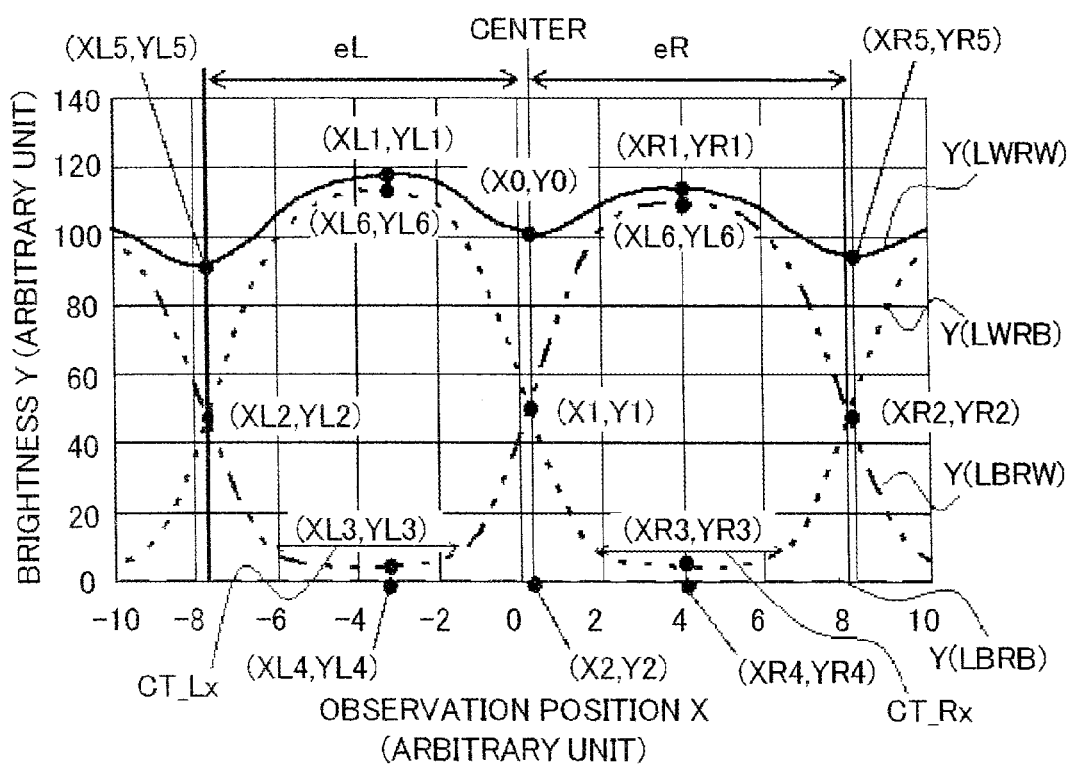
[FIG. 11] A graphical representation showing an exemplary profile of luminance in the image display device according to Embodiment 1 of the present invention.

First, the definition of 3D moire in this specification is discussed. The image display device 1 according to this Embodiment has the luminance profile as shown in FIG. 11. Here, the observation position X on the abscissa presents the angle indicating the image separation direction. The direction perpendicular to the display surface, namely the +Z-axis direction, is at 0 degree. The brightness Y on the ordinate presents relative luminance with respect to the luminance of 100 in the +Z-axis direction in the luminance profile associated with the angular direction. A line Y (LWRW) presents the profile of luminance when both subpixels, a left-eye pixel 4L and a right-eye pixel 4R, display white. A line Y (LBRB) presents the profile of luminance when both subpixels, a left-eye pixel 4L and a right-eye pixel 4R, display black. A line Y (LWRB) presents the profile of luminance when a left-eye pixel 4L displays white and a right-eye pixel 4R displays black. A line Y (LBRW) presents the profile of luminance when a left-eye pixel 4L displays black and a right-eye pixel 4R displays white.

The profile of luminance at the observer position on the +X side corresponds to an image output to the right eye. The profile of luminance at the observer position on the −X side corresponds to an image output to the left eye. The dotted lines present the profile of luminance when only one subpixel, a right-eye pixel 4R or a left-eye pixel 4L, outputs an image. The solid line presents the profile of luminance when both subpixels display an image. Therefore, the total of the profiles of luminance at the observing points presented by the dotted lines is equal to the profile of luminance presented by the solid line.

In order to address the problem with the above-described optical unit, the lens concave part 32 having low optical separation performance is provided in the regions near the lines B-B' and C-C' where the vertical aperture width largely fluctuates. In this way, a high level of defocusing effect occurs at the lens concave part 32, thereby blurring light emitted from the pixels and flattening the profile of luminance. Consequently, 3D moire can be reduced to a subjectively acceptable level. Furthermore, in the regions near the lines B-B' and C-C' where the vertical aperture width largely fluctuates, the overlapping regions have smaller widths X3 and X3', whereby the blurring as a result of the defocusing effect does not result in increasing 3D crosstalk. On the other hand, the lens convex part 31 having high optical separation performance is provided in the region near the line A-A' where the vertical aperture width slightly fluctuates so as to efficiently distribute light and reduce 3D crosstalk. Then, the display panel 2 of this Embodiment can control 3D moire and 3D crosstalk in accordance with the profile of optical separation performance of the image separating unit, providing high quality three-dimensional images.

Figure 16:
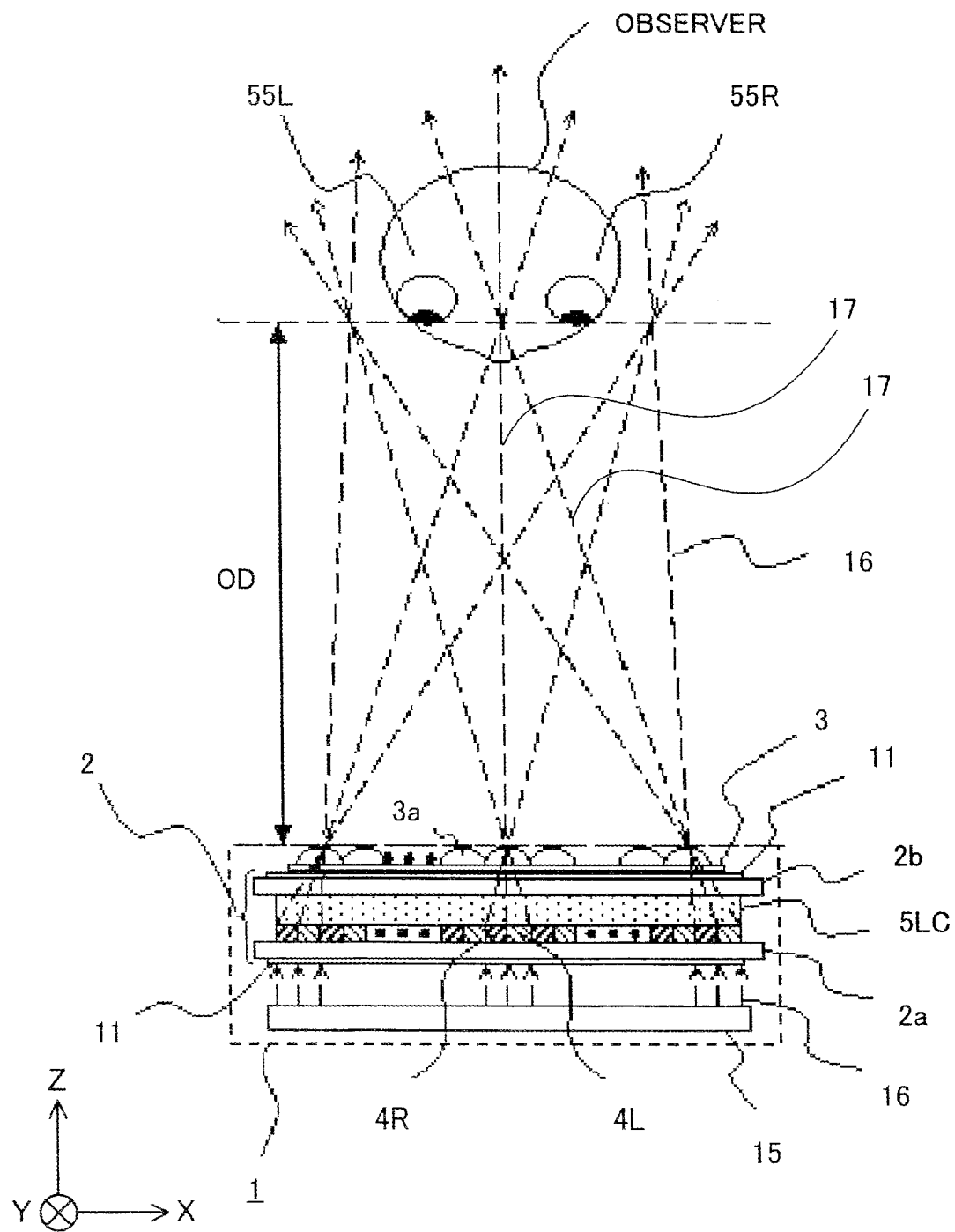
[FIG. 16] A conceptual illustration showing the light collection in the image display device according to Embodiment 1 of the present invention.

Furthermore, as shown in FIG. 16, the image display device 1 is often placed in the manner that the observer views the display surface squarely. Therefore, the image quality in front of the display surface is important. In this Embodiment, with the lens convex part 31 having high optical separation performance being provided at the line A-A', the defocusing is reduced to achieve efficient image separation in front. Then, light loss can be reduced and the luminance in front can be improved.

The subpixel according to this Embodiment has a nearly constant vertical aperture ratio in the image separation direction at the center of a unit of display 4U. However, the vertical aperture ratio may not be completely constant because of the processing accuracy in the course of producing the TFT and/or panel; the luminance may fluctuate depending on the observer position X. Particularly, when the TFT substrate 2a and opposite substrate 2b are largely misaligned in the Y-axis direction, the luminance tends to fluctuate under the influence of the black matrix 60 shielding the gate line G. As shown in FIG. 11, the luminance fluctuation near a point (X0, Y0) is caused by the shielding unit crossing the line A-A' and the luminance fluctuation near points (XR5, YR5) and (XL5, YL5) is caused by the shielding unit crossing the line B-B' or line C-C'. Such luminance fluctuation is called 3D moire. The 3D moire associated with the lines A-A', B-B', and C-C' is presented by $\Delta YC$, $\Delta YL$, and $\Delta YR$, respectively. In this Embodiment, they are defined as follows.

$$YC=(YL1+YR1)/2 \qquad \text{[Math 25]}$$

$$\Delta YC=(YC-Y0)/YC$$

$$\Delta YL=(YL1-YL5)/YL1$$

$$\Delta YR=(YR1-YR5)/YR1 \qquad \text{[Math 26]}$$

$$\Delta YC/\Delta XC=\Delta YC/(XR1-XL1)/2$$

$$\Delta YL/\Delta XL=\Delta YL/(XL1-XL5)$$

$$\Delta YR/\Delta XR=\Delta YR/(XR5-XR1) \qquad \text{[Math 27]}$$

Furthermore, the viewable ranges eR and eL of the right and left eyes are defined as follows.

$$eR=|XR2-X1| \qquad \text{[Math 28]}$$

$$eL=|X1-XL2| \qquad \text{[Math 29]}$$

The calculation using the above mathematical formulae revealed that the 3D moire $\Delta YC$, $\Delta YL$, and $\Delta YR$ were 20%, 27%, and 25%, respectively. As shown in FIG. 7, the total vertical aperture widths at the lines B-B' and C-C' are smaller than the total vertical aperture width at the line A-A'. The fluctuation in width with respect to the aperture width Y1 in FIG. 7 is $\Delta H2$ at the line A-A' and $\Delta H1$ at the lines B-B' and C-C'. The fluctuation in width $\Delta H1$ is four times larger than the fluctuation in width $\Delta H2$. The total vertical aperture widths at the lines B-B' and C-C' abruptly fluctuate. However, since the spot diameter SP2 at the lens concave part is larger than the spot diameter SP1 at the lens concave part, the fluctuation in luminance corresponding to the lines B-B' and C-C' is flattened and the difference in 3D moire among $\Delta YC$, $\Delta YL$, and $\Delta YR$ is reduced in the luminance profile shown in FIG. 11.

The inventors of the present invention found in subjective assessment results that the display quality can be maintained without giving the observer discomfort where the luminance fluctuation is within 30%. Therefore, the above 3D moire $\Delta YC$, $\Delta YL$, and $\Delta YR$ is all within the subjectively acceptable range. Furthermore, it is desirable that the fluctuation in vertical aperture ratio at the line A-A' in FIG. 4 is designed to be within 30%. To this end, the following relationship must be satisfied.

$$0.7<(Y1-W1/\sin\theta 1)/Y1<1.3 \qquad \text{[Math 30]}$$

Furthermore, even if the fluctuation in vertical aperture ratio in the image separation direction is 30% or higher in a subpixel layout, the defocusing effect can be utilized to equalize the light transmitted through the region where the vertical aperture largely fluctuates to reduce the 3D moire to approximately 15%, or a half. Since the restrictions on the design can be alleviated by utilizing the defocusing effect, the fluctuation in vertical aperture ratio can be designed to be within 60% in consideration of the defocusing effect.

Furthermore, the 3D crosstalk is the mixture ratio of an image for one observing point to an image for the other observing point as described above. The minimum value L_CTmin of 3D crosstalk in the left-eye viewable range eL and minimum value R_CTmin of 3D crosstalk in the right-eye viewable range eR are defined as follows.

$$L\_CT\text{min}=(YL3-YL4)/(YL6-YL4)$$

$$R\_CT\text{min}=(YR3-YR4)/(YR6-YR4) \qquad \text{[Math 31]}$$

If the 3D crosstalk minimum values L_CTmin and R_CTmin are equal to or lower than a given value, the observer can enjoy excellent three-dimensional visibility. Subjective assessment results revealed that the 3D crosstalk minimum values L_CTmin and R_CTmin in the left-eye and right-eye viewable ranges eL and eR are desirably equal to or lower than 5 to 10%.

Therefore, the range providing excellent three-dimensional observation can be increased as the range of observation position in the X-axis direction in which 3D crosstalk is equal to or lower than 5 to 10% is extended. Here, the range of observation position in the X-axis direction in which 3D crosstalk is equal to or lower than a given value is defined as follows. As shown in FIG. 11, the range proving excellent three-dimensional visibility in the left-eye viewable range eL is defined as CT_Lx and the range proving excellent three-dimensional visibility in the right-eye viewable range eR is defined as CT_Rx.

In this Embodiment, the range of observation position in the X-axis direction in which 3D crosstalk is equal to or lower than 7.5% was assessed. The range of 3D crosstalk allowing for excellent three-dimensional visibility can be assessed using an optical measuring device having the angular resolution and determined in combination with subjective assessment. However, the absolute quantity of assessment may vary depending on the design specification of an optical measuring device. For that reason, the range of observation position in the X-axis direction is not restricted to the range in which 3D crosstalk is equal to or lower than 7.5%, and can be determined as appropriate based on the measuring results from an optical measuring device and subjective assessment results.

As a result of assessment using the same lenticular lens 3 in the pixel structures described in the Patent Literature 1 and Patent Literature 2 in which the vertical aperture width is constant in the image separation direction, the 3D moire between (XL1, YL1) and (XL5, YL5) and between (XR1, YR1) and (XR5, YR5) was excellent. However, the 3D crosstalk between (XL1, YL1) and (XL5, YL5) and between (XR1, YR1) and (XR5, YR5) was larger than the 3D crosstalk between (XL1, YL1) and (X0, Y0) and between (XR1, YR1) and (X0, Y0). Particularly, the 3D crosstalk between (XL1, YL1) and (XL5, YL5) and between (XR1, YR1) and (XR5, YR5) was equal to or higher than 7.5% and the ranges CT_Lx and CT_Rx were diminished toward the point of origin. Consequently, the three-dimensional viewable range was narrowed and the three-dimensional display performance was deteriorated.

With the units of display 4U being placed in accordance with the optical separation performance profile of the lenticular lens 3 serving as the image separating unit, the image display device 1 according to this Embodiment can reduce 3D crosstalk to increase the region providing excellent three-dimensional visibility while reducing 3D moire to within a subjectively acceptable range. Furthermore, at the center of a unit of display 4U, light is efficiently distributed by the lens effect of high optical separation performance, whereby the luminance in front of the display region can be improved.

The drive method, or display operation, of the display panel according to this Embodiment having the above configuration will be described hereafter.

In this Embodiment, the display panel 2 is driven by dot inversion drive. In the dot inversion drive, as shown in FIG. 12, the polarity of display data to be transferred is inverted with respect to a reference potential every data line, every gate line, and every frame. The dot inversion drive is also called the 1H1V inversion drive. This is because the polarity is inverted every data line arrayed in the horizontal direction (H direction) and every gate line arrayed in the vertical direction (V direction).

As shown in FIG. 13, signals of the same sign polarity are written in the subpixels of which the upper and lower sides of parallelogram pixels are adjacent to each other in the vertical direction. With the regions where the upper and lower sides of parallelogram pixels adjacent to each other having the same polarity, defective orientation and/or disclination of the liquid crystal molecules along the gate line G extending in the X-axis direction is prevented. Then, light leakage is reduced and high contrast is obtained. Furthermore, the black matrix 60 provided around the gate line G for preventing deterioration in the contrast due to light leakage can have a smaller width W2, increasing the aperture ratio.

This Embodiment can reduce fluctuation in the potential of the charging capacitor line CS and charging capacitor electrode CS2 in the subpixels upon writing display data in the subpixels. This will be discussed hereafter. Attention is paid to two units of display 4U adjacent to each other in the X-axis direction in FIG. 13. Among the subpixels 4S in these units of display 4U, different polarities are written in the subpixels 4S selected by the common gate line G in the same gate selection period. Then, as shown in FIG. 3, the charging capacitor line CS is electrically connected to the charging capacitor electrode CS2 between the subpixels 4S adjacent to each other in the X-axis direction so that the charging capacitor electrodes CS2 of the subpixels 4S adjacent to each other in the X-axis direction have the same potential. Consequently, the potential of the charging capacitor electrode CS2 does not shift to one polarity in the subpixels 4S of which the gate period is selected concurrently. Then, the crosstalk occurring in the direction in which the charging capacitor line CS and charging capacitor electrode CS2 extend can be reduced and high quality display can be realized.

Furthermore, not only display data of the positive polarity but also display data of the negative polarity are written in the subpixels 4S in two consecutive gate selection periods. Consequently, the configuration of this Embodiment has the effect of reducing fluctuation in the potential of the charging capacitor line CS in using conventional dot inversion drive and allows the subpixels 4S of which the upper and lower sides of parallelogram apertures are adjacent to each other in the vertical direction to have the same polarity. In this way, high image quality display can be realized at a low cost.

Here, the reference potential for dot inversion drive can be the potential of the common electrode facing the pixel electrode 4PIX. However, precisely speaking, the common electrode potential is often a DC offset applied for reducing influence of feed-through of the pixel thin-film transistor 4TFT and is different from the reference potential.

Figure 14:
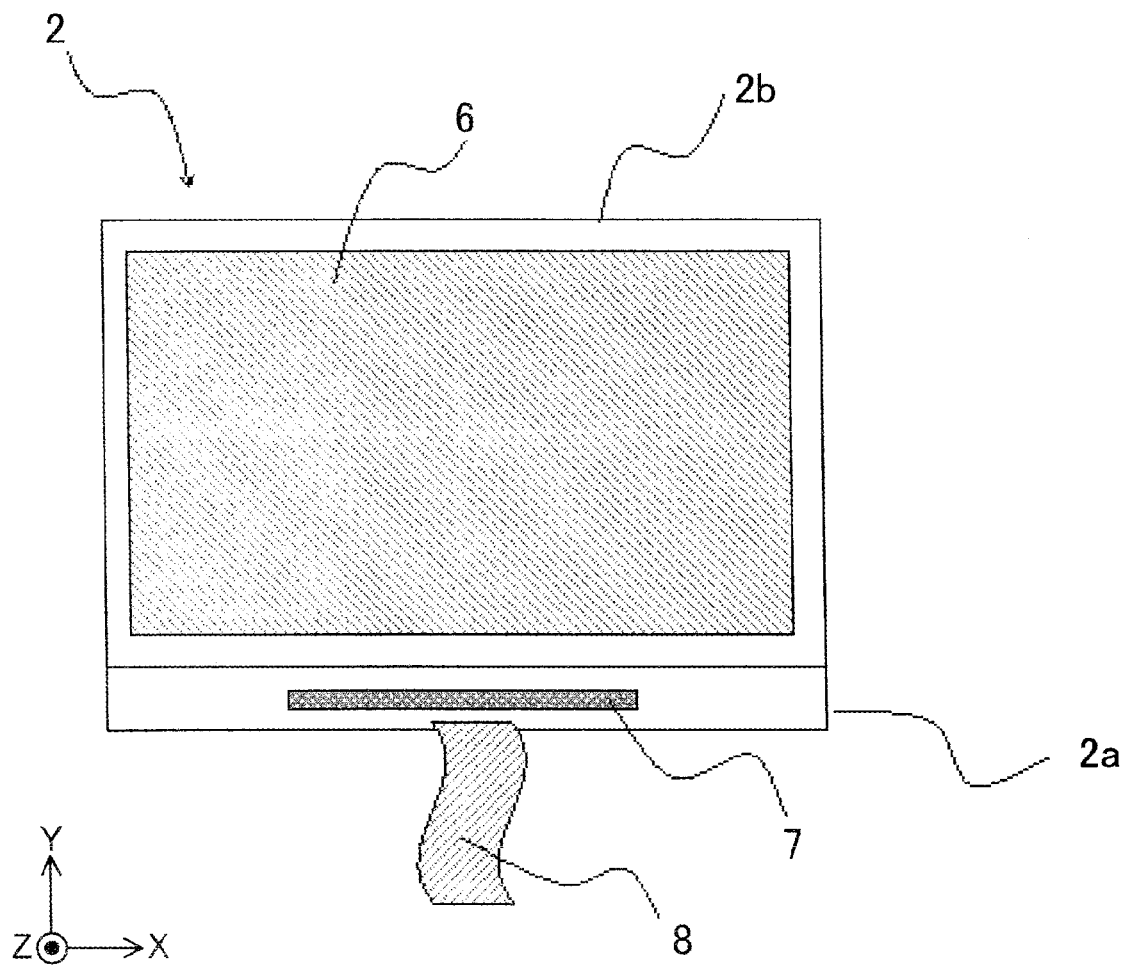
[FIG. 14] A plane view showing the display panel according to Embodiment 1 of the present invention.

The display panel 2 is placed with the long side oriented in the X-axis direction and the short side oriented in the Y-axis direction as shown in FIG. 14. Having the image separation direction in accord with the X-axis direction, the display panel 2 is a display panel accommodating landscape (widescreen) display. A drive IC 7 for controlling video signals is mounted on a long side of the TFT substrate 2a of the display panel 2. The output of the drive IC 7 is connected to the data lines of the display unit 6. Generally, the output pin pitch of the drive IC 7 is smaller than the data line pitch. Therefore, the wires extending from the output pins of the drive IC 7 to the data lines must be spread and, therefore, some distance is necessary between the drive IC 7 and display unit 6. Furthermore, a multiplexer circuit for data signals can be installed in the drive IC 7 and a switching circuit capable of sorting data signals output from the drive IC 7 in a time-sharing manner according to the operation of the multiplexer circuit can be provided on the TFT substrate 2a. In this way, the number of data signal wires output from the drive IC 7 to be connected can be reduced.

Furthermore, in this Embodiment, the gate driver circuit for scanning the gate lines in sequence is formed on the TFT substrate 2a concurrently with the thin-film transistors. In this way, the frame width of the display panel 2 at the long side can be reduced. Furthermore, the display panel 2 can have a smaller frame on each side by providing the drive IC 7 connected at a long side of the display panel 2 on a long side and integrating the gate driver circuit connected at a short side of the display panel 2. The display panel 2 having smaller frames is smaller in size and the number of display panels 2 obtained from one mother board is increased, thereby reducing the cost. Furthermore, integral formation of the subpixels and gate driver circuit on the TFT substrate 2a leads to reduction in the number of parts of the driver circuit, thereby reducing the cost and power consumption.

The image display device 1 as described above has the subpixels 4S in which the data line D, gate line G, charging capacitor electrode CS2, and switching unit are efficiently placed, ensuring high three-dimensional image quality while improving the aperture ratio.

Furthermore, in the subpixel structure of the display panel 2, the vertical aperture width at the lines B-B' and C-C' is different from the vertical aperture width at the line A-A'. The optical unit has the optical separation performance profile in accordance with the aperture width. Therefore, light output from the display panel 2 can efficiently be distributed by the optical unit, improving the three-dimensional image display quality.

The display panel 2 mounted on the image display device 1 comprises square pixels 4P in which the subpixels 4S for two observing points (a right-eye pixel 4R and a left-eye pixel 4L) are arranged in the image separation direction. Therefore, the two-dimensional display (2D display) is provided when the right-eye pixel 4R and left-eye pixel 4L display the same image and the three-dimensional display (3D display) is provided when the right-eye pixel 4R and left-eye pixel 4L display different images. The subpixels 4S can be driven independently. Then, the three-dimensional display (3D display) and two-dimensional display (2D display) can be mixed on the same screen.

Figure 15A:
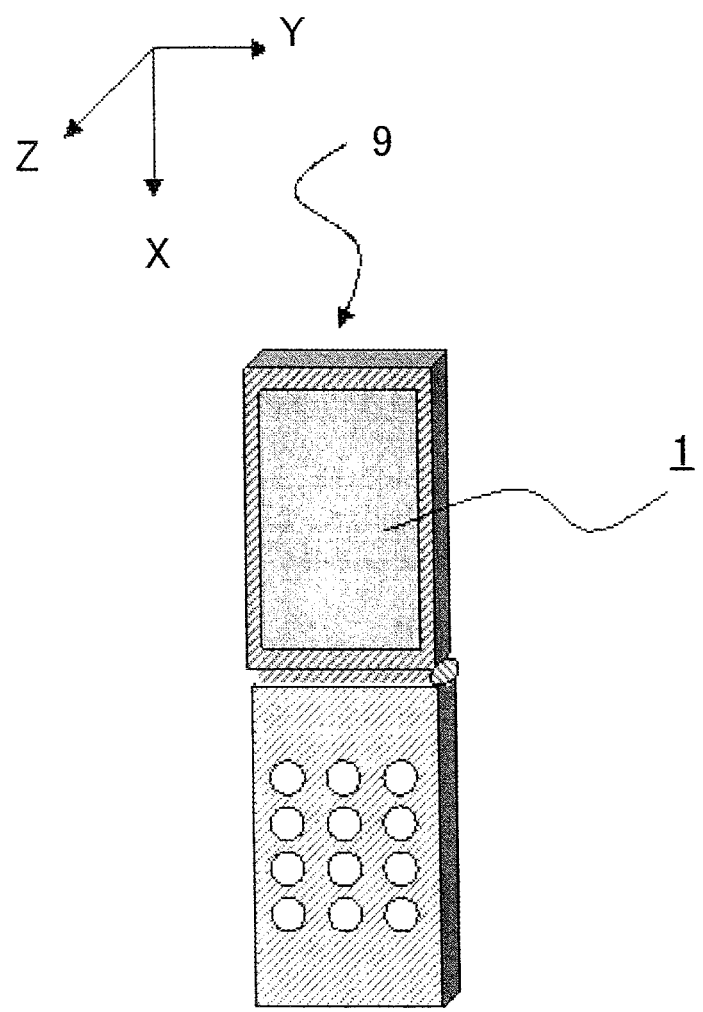
[FIG. 15A] A perspective view showing a portable device in which the image display device of the present invention is installed.
Figure 15B:
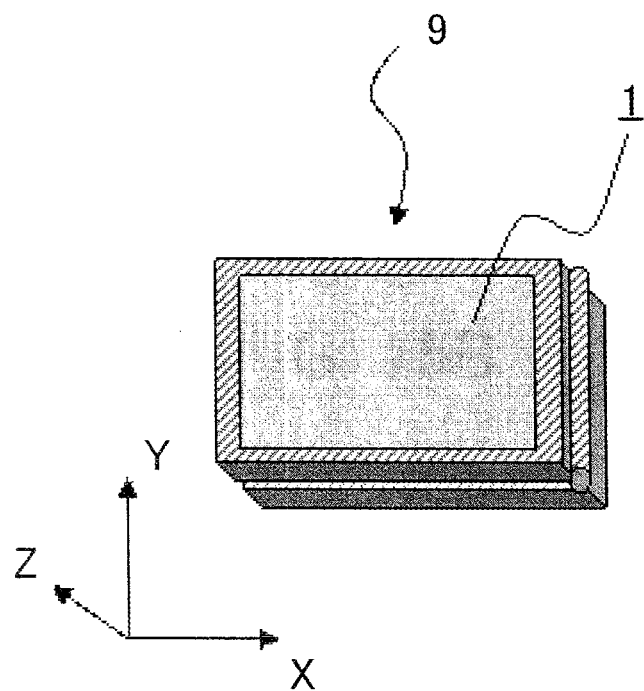
[FIG. 15B] A perspective view showing a portable device in which the image display device of the present invention is installed.
Figure 15C:
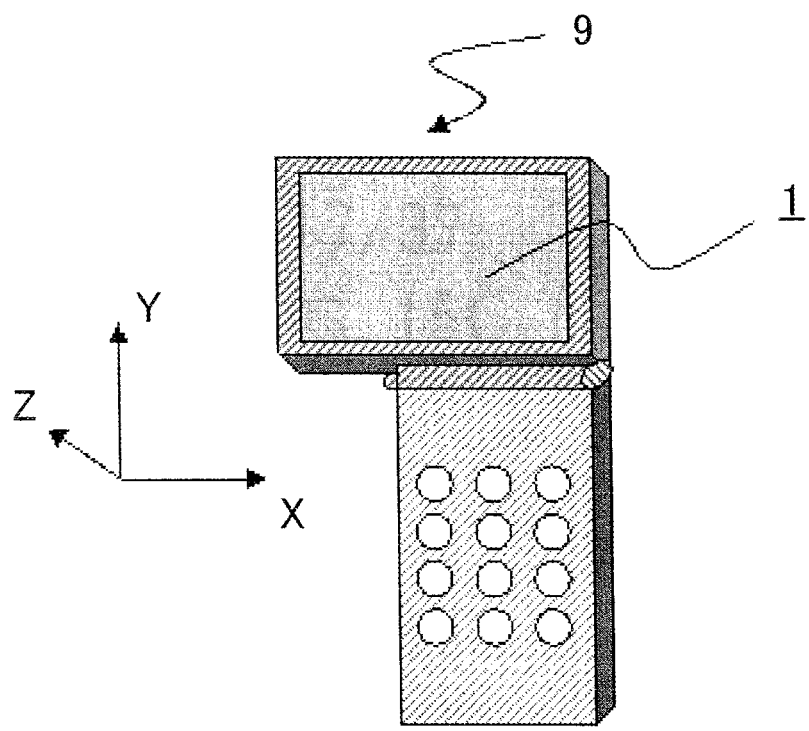
[FIG. 15C] A perspective view showing a portable device in which the image display device of the present invention is installed.

Furthermore, the image display device 1 according to this Embodiment can be installed in a cellular phone 9 as shown in FIGS. 15A to 15C. As shown in FIG. 15A, the X-axis direction of the image display device 1 is in accord with the lengthwise direction of the screen of the cellular phone 9 and the Y-axis direction of the image display device 1 is in accord with the crosswise direction of the screen of the cellular phone 9. Then, as shown in FIGS. 15B and 15C, the screen part of the cellular phone 9 is provided with a hinge having a rotation shaft so that the screen part is movable. Then, the display screen can be oriented differently according to the usage environment so that the image separation direction, namely the X-axis direction, is nearly parallel to the line connecting the eyes of the viewer for use. Consequently, the observer can easily view the three-dimensional display. Furthermore, the display panel 2 in this Embodiment has a narrow frame and, therefore, is favorably applicable to portable devices without imposing any limitation on the functionality, design, and operability required for portable devices.

In this Embodiment, the subpixel on the +X side of a unit of display 4U is a left-eye pixel 4L and the subpixel on the −X side of the unit of display is a right-eye pixel 4R. However, this is not restrictive. The first observing point pixel and second observing point pixels can be a right-eye pixel 4R and a left-eye pixel 4L, respectively. In this way, after the display panel 2 is rotated in the XY plane by 180 degrees, the same three-dimensional display can be provided by rearranging the image data. Particularly, provided with a rotatable display screen, the portable device as shown in FIG. 15 is highly operable. Information should be provided regardless of how the image display device 1 is oriented in the hands of the observer. Therefore, the image display device 1 according to this Embodiment is effectively applicable to such portable devices.

[Modified Embodiment Of Embodiment 1]

In this Embodiment, the source and drain electrodes of a pixel thin-film transistor 4TFT become conductive when the gate electrode has a potential lower than the source or drain electrode. Conversely, a so-called NMOS thin-film transistor that becomes conductive when the gate electrode has a potential higher than the source or drain electrode can be used.

Furthermore, in this Embodiment, the contact holes 4CONT1 and 4CONT2 of a subpixel 4S are shifted from the center of the subpixel in the X-axis direction. The observing point of the observer is highly possibly situated near the vicinity of the center of a subpixel 4S that is enlarge and projected on the observation plane by the image separating unit such as a lens. The contact holes 4CONT1 and 4CONT2 provided near the center of a subpixel 4S may disturb the orientation of liquid crystal molecules and adversely impact the display. Therefore, if the contact holes 4CONT1 and 4CONT2 are provided near the center of a subpixel 4S, the most viewed part is more likely to be subject to deterioration in the image quality. Then, as in this Embodiment, the contact holes 4CONT1 and 4CONT2 shifted from the vicinity of the center of a subpixel contribute to improving the display image quality.

Furthermore, in this Embodiment, as for the position of the pixel thin-film transistors 4TFT in the subpixels 4S of which the upper and lower sides of parallelograms are adjacent to each other in the vertical direction, the pixel thin-film transistors 4TFT of the subpixels 4S are positioned in an asymmetric manner in the X-axis direction with respect to the center line of the subpixels 4S. Consequently, the pixel thin-film transistors 4TFT of subpixels can be positioned in diverse manners in the subpixels 4S so that influence of multiple pixel thin-film transistors 4TFT does not overlap with each other at the same position on the observation plane, allowing for high image quality.

Furthermore, in this Embodiment, the black matrix 60 as the shielding layer in the opposite substrate 2b is larger than the line width of the subpixels 4S on the TFT substrate 2a in consideration of misalignment between the opposite substrate 2b and TFT substrate 2a. In other words, in the above explanation, the shielding layer covering all but the apertures of subpixels can be formed by the wiring on the TFT substrate 2a. Such a shielding layer may cover at least a part of the aperture of a subpixel 4S, and the aperture formed by the shielding layer and the aperture of a subpixel 4S may be similar. Furthermore, the aperture formed by the shielding layer may be smaller than the aperture of a subpixel 4S. In this way, even if the TFT substrate 2a and opposite substrate 2b are misaligned, the aperture shape is subject to less change, allowing for high image quality.

The connection between a gate line G/a data line D and a subpixel 4S in this Embodiment can also be described as follows. A column of subpixels 4S between any two of multiple data lines D may include subpixels 4S connected to one data line D via a pixel switch and subpixels 4S connected to the other data line D via a pixel switch in an alternate manner. Furthermore, a row of subpixels 4S between any two of multiple gate lines G may include subpixels 4S connected to one gate line G via a pixel switch and subpixels 4S connected to the other gate line G via a pixel switch in an alternate manner. For the above arrangement, it is preferable that the number of data lines D is larger than the number of column of subpixels 4S by one. Similarly, it is preferable that the number of gate lines G is larger than the number of rows of subpixels 4S by one.

In this Embodiment, the lenticular lens 3 has the lens surface on the side facing in the +Z direction, namely facing the user. However, this is not restrictive. The lens surface may be provided on the side in the −Z direction, namely facing the display panel 2. In such a case, the distance between the lens and subpixels can be reduced, which is advantageous for accommodating higher resolutions.

Furthermore, the unit of display 4U can be in the shape of a square. The shape of a square means that the pitch in the X-axis direction of units of display 4U for N observing points, Pu=N×Px, is equal to the pitch in the Y-axis direction thereof, Py, and the relationship Pu=N×Px=Py is satisfied. In other words, the pitch of units of display 4U is equal in all directions in which the units of display are repeatedly arranged.

In the above explanation, multiple observing points are set on the observation plane and the subpixels for those observing points of all units of display 4U on the display surface emit light for the set observing points. This scheme collects light for set observing points at the corresponding observing points, and is also called the light collection scheme. The above-described three-dimensional display device of two observing points and three-dimensional display devices of multiple observing points in which the number of observing points is further increased are classified as the light collection scheme. The concept of the light collection scheme can be presented as shown in FIG. 16. As shown in FIG. 16, the lines 17 presenting the center axis of image separation gather at the observing points of the observer and the observer can observe independent images with the right and left eyes. The light collection scheme is characterized in that light beams entering the eyes of the observer are reproduced for display. The image display device 1 according to this Embodiment is effectively applicable to the light collection scheme.

Furthermore, as shown in FIG. 16, the direction of light emitted from the cylindrical lenses 3*a* of the lenticular lens 3 is set according to the viewing position of the observer. The lines 17 presenting the center axis of image separation are oriented to the observer. The right-eye and left-eye images are distributed to the left eye 55L and right eye 55R, respectively, with respect to the center axis of image separation. The cylindrical lenses 3*a* have a convex, curved surface, of which the highest point in the Z axis direction is the vertex. A virtual line extending through the vertex of the lens convex part 31 in the longitudinal direction of a cylindrical lens 3*a* can form a first axis 33 when the pitch of cylindrical lenses 3*a* and the pitch of units of display 4U are equal. However, since the pitch L of the cylindrical lenses 3*a* is different from the pitch Pu of the units of display 4U in this Embodiment when the cylindrical lenses 3*a* and units of display 4U are seen in the direction perpendicular to the display surface, the vertex of a cylindrical lens 3*a* does not always coincide with the center line A-A' of a unit of display 4U. This is because the lines 17 presenting the center axis of image separation gather at one point on the observer and the center axis of image separation seen from the observer serves as an apparent optical axis. In this specification, the center axis of image separation seen from the position of the observer is defined as the first optical axis 33. As shown in FIG. 16, the line 17 presenting the axis of image separation is perpendicular to the display surface and the first optical axis 33 for observation in the direction perpendicular to the display surface coincides with the line A-A' at the center of the display unit of the display panel 2.

Figure 17:
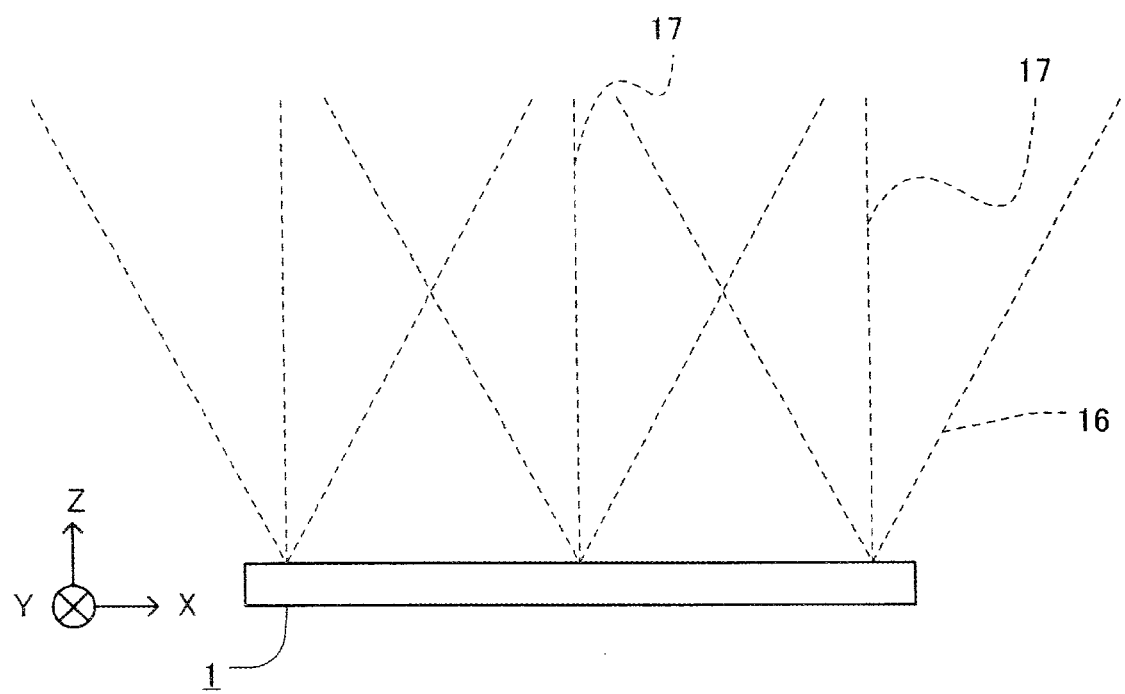
[FIG. 17] A conceptual illustration showing the spatial scheme.

Furthermore, schemes called spatial image, spatial image reproduction, spatial image reconstruction, and spatial image formation schemes have been proposed. The concept of these schemes can be presented as shown in FIG. 17. Unlike the light collection scheme, the spatial image scheme has no specific observing point. The spatial image scheme is different from the light collection scheme in that light emitted from an object in the space is reproduced to display the object. Three-dimensional image display devices of integral photography, integral videography, and integral imaging schemes are classified as the spatial image scheme. In the spatial image scheme, the observer at an arbitrary position does not view only the subpixels for the same observing point throughout the display surface. However, there are multiple kinds of regions having a given width and formed by the subpixels for the same observing point. In each region, the image display device 1 according to this Embodiment can yield the same effect as in the light collection scheme. Therefore, the image display device 1 according to this Embodiment can also effectively applicable to the spatial image scheme.

In this Embodiment, the term "observing point" refers to "the position from which the image display device is viewed (observation position)" or "a point or a region at which or in which the eye of the user should be positioned," not to "the point on the display region to which the user pays attention (viewing point)."

The polarizing plate 11 can be applied to a side of the lenticular lens 3 instead of being applied to the display panel 2 installed in the image display device 1 according to this Embodiment. Furthermore, the polarizing plate 11 can be provided on the observer's side of the lenticular lens 3. With the polarizing plate 11 positioned differently, the distance H between the vertex of the lens and the subpixels can be adjusted in a simple manner. Consequently, the freedom of design can be improved. Furthermore, the image separating unit installed in the image display device 1 according to this Embodiment is not restricted to the lenticular lens 3 and can be those using a parallax barrier comprising alternate transparent and nontransparent regions. The parallax barrier can be an electro-optical element in which the transparent and nontransparent regions are switched by liquid crystal molecules or a MEMS shutter. Furthermore, the effects of this Embodiment can be obtained by using a GRIN (gradient index) lens, which is an electro-optical element using liquid crystal, as the image separating unit.

The liquid crystal display panel of the image display device 1 of this Embodiment is not restricted to those of the TN liquid crystal drive mode, and can be those of other liquid crystal drive modes. Examples of the liquid crystal drive mode include IPS (in-plain switching), FFS (fringe field switching), and AFFS (advanced fringe field switching) modes among horizontal electric field modes, and MVA (multi-domain vertical alignment) employing multiple domains to diminish the viewing angle dependency, PVA (patterned vertical alignment), and ASV (advanced super v) modes among vertical orientation modes. Furthermore, the liquid crystal display panels of OCB (optically compensated bend) and film compensation TN modes can appropriately be used.

Furthermore, in the above explanation, the display panel 2 according to this Embodiment is a liquid crystal display panel utilizing liquid crystal molecules as the electro-optic element. The display panel 2 is applicable not only to a transmissive liquid crystal display panel, but also to a reflective liquid crystal display panel, semitransmissive liquid crystal display panel, slightly reflective liquid crystal display panel including the transmission region at a higher ratio than the reflective region, and slightly transmissive liquid crystal display panel including the reflective region at a higher ratio than the transmission region. Furthermore, the drive method of the display panel 2 is favorably applicable to the TFT scheme. The thin-film transistors in the TFT scheme are favorably applicable not only to those of amorphous silicon, low-temperature polysilicon, high-temperature polysilicon, and monocrystalline silicon, but also to those of organic materials such as pentacene, metal oxides such as zinc oxide, and carbon nanotubes. Furthermore, the display panel 2 according to this Embodiment does not rely on the structure of thin-film transistors and those of bottom-gate, top-gate, staggered, and inversely-staggered types can favorably be used.

In this Embodiment, the subpixels have a pixel thin-film transistor 4TFT with a double gate. However, this is not restrictive and the pixel thin-film transistor 4TFT may have a single or triple gate structure. The multi-gate structure such as double and triple gates serves to reduce optical leak current when the thin-film transistor is off, preventing the TFT properties from deteriorating due to light from the backlight or from outside the image display device. Consequently, flickers, noise, and crosstalk can be reduced and a high quality image display device can be provided. Particularly, polysilicon thin-film transistors have low resistance between the source and drain compared with amorphous thin-film transistors and, therefore, the above multi-gate structure can be very effective. Furthermore, the multi-gate structure is effective for increasing the luminance of the backlight to gain the brightness in the case of highly fine pixels.

Furthermore, the display panel 2 is applicable to a display panel that is not of a liquid crystal type such as an organic electroluminescence display panel, or a PALC (plasma address liquid crystal). In an organic electroluminescence display panel, the non-light emitting region serves as the light blocking region. Application of the structure of the shielding unit of this Embodiment to the non-light emitting region can lead to the same effect.

Furthermore, in this Embodiment, the terminal device is a cellular phone 9 by way of example. However, this is not restrictive and the present invention is applicable to a variety of portable terminal devices such as PDAs, personal TVs, game machines, digital cameras, digital video cameras, and note-type personal computers. Furthermore, the present invention is also applicable to a variety of fixed terminal devices such as cash dispensers, vending machines, monitors, and television receivers in addition to the portable terminal devices.

[Embodiment 2]

The image display device according to Embodiment 2 of the present invention, display panel installed in the image display device, and drive method thereof will be described.

Figure 18:
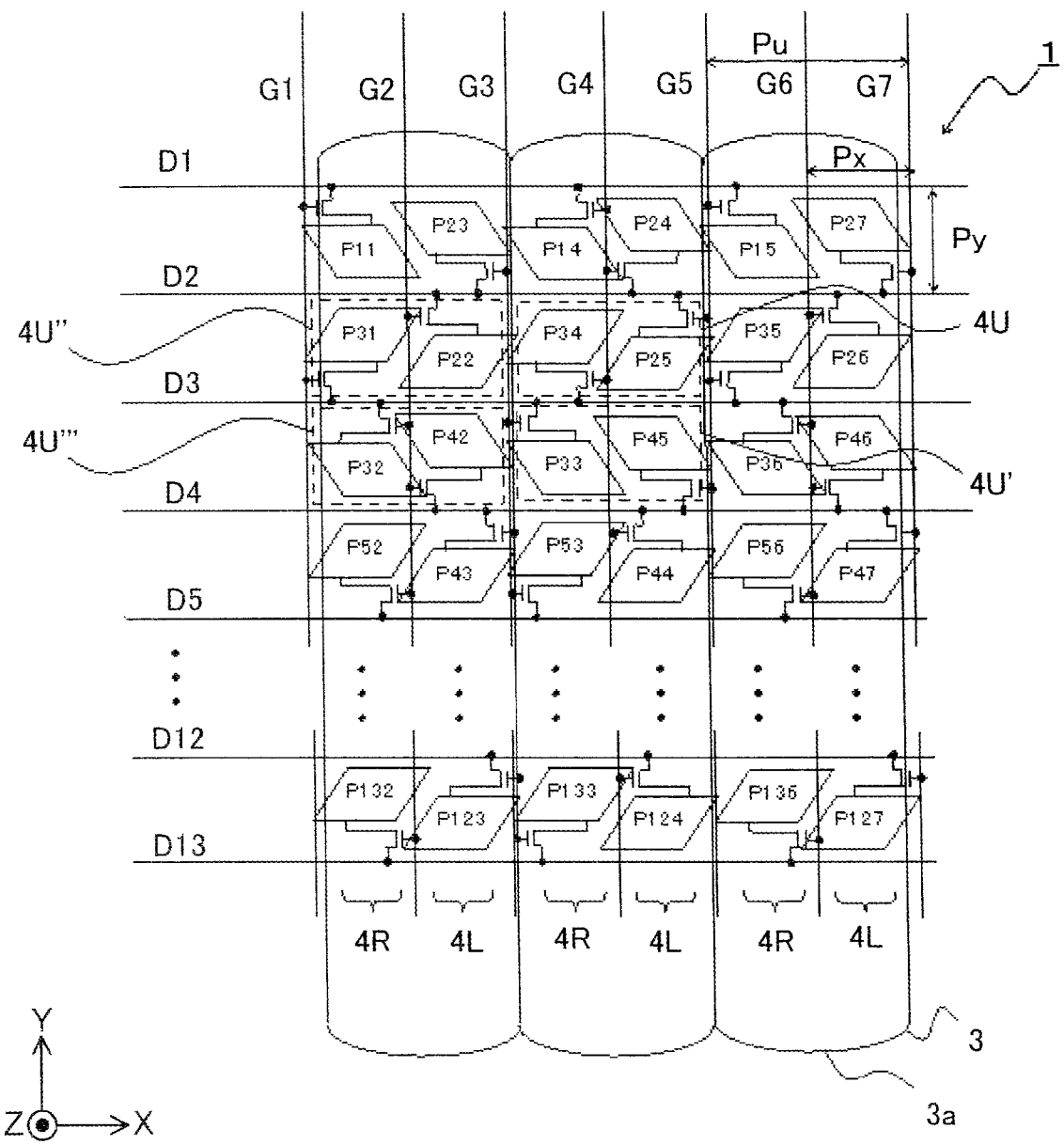
[FIG. 18] A plane view showing the subpixels of the display panel according to Embodiment 2 of the present invention.
Figure 19:
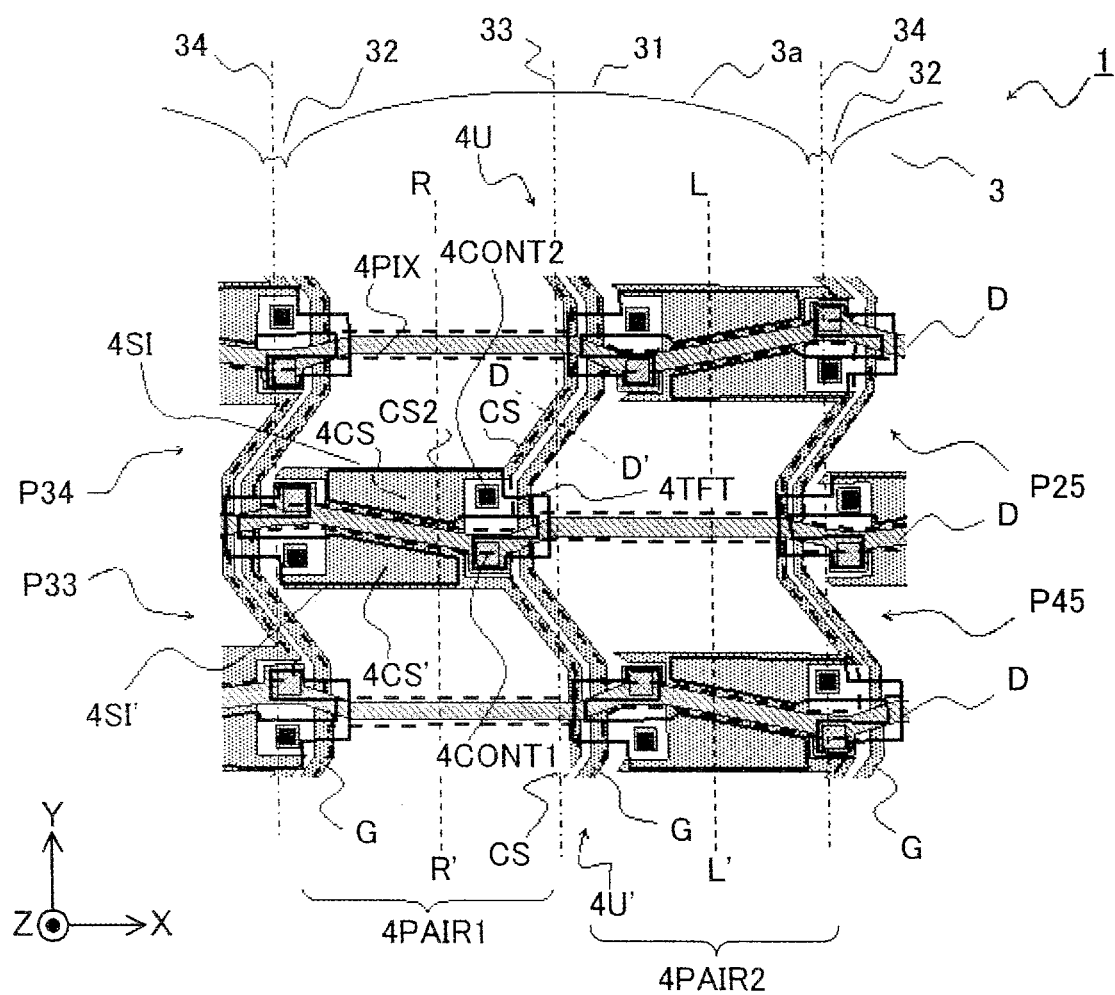
[FIG. 19] An enlarged view showing subpixels of the display panel according to Embodiment 2 of the present invention.
Figure 20:
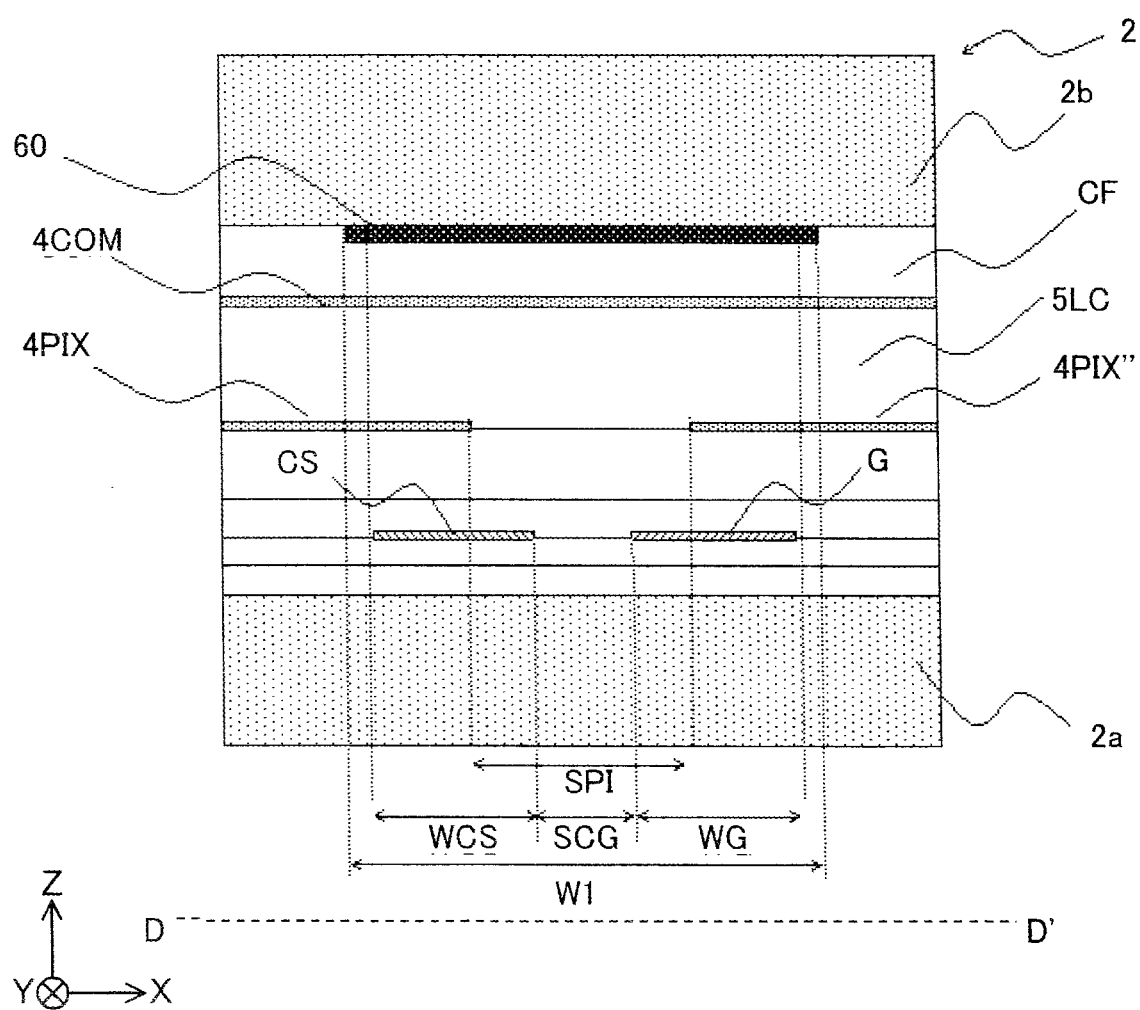
[FIG. 20] A cross-sectional view at the line D-D' of the display panel according to Embodiment 2 of the present invention.
Figure 21:
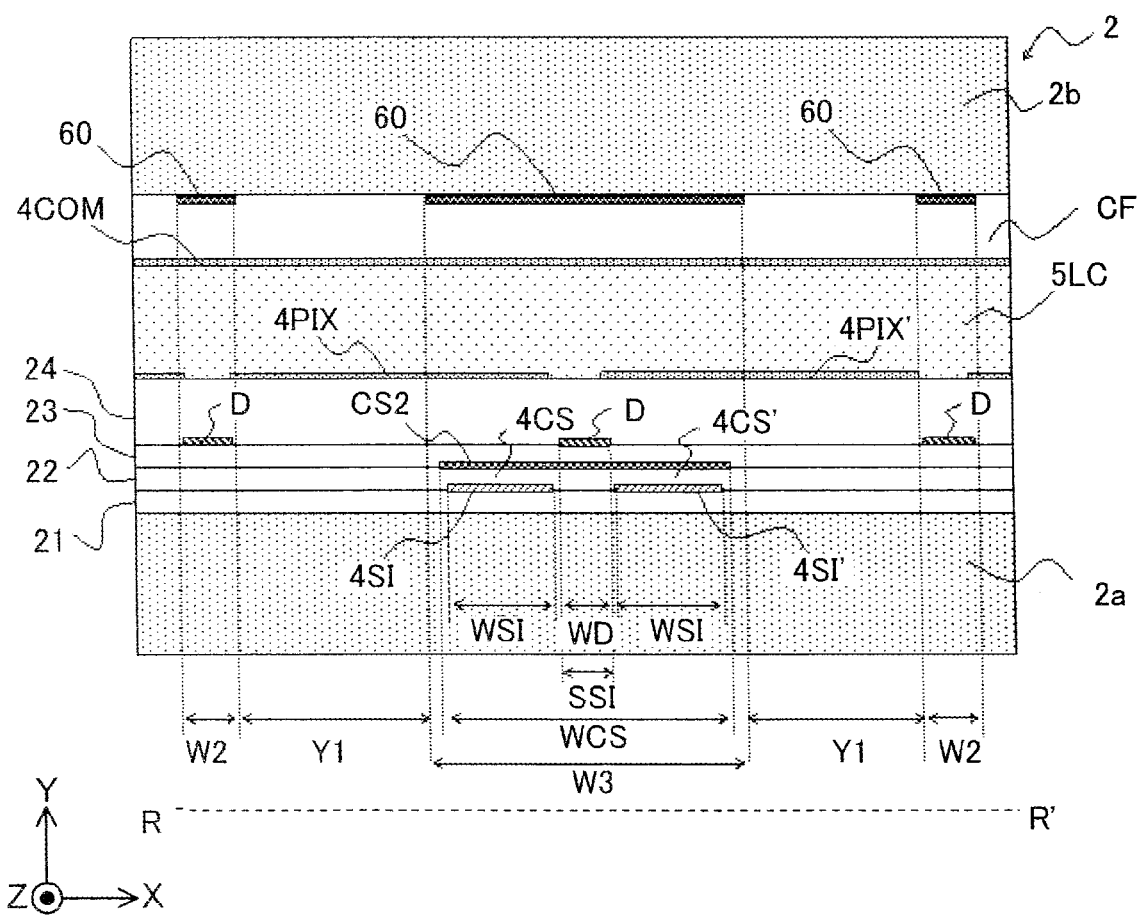
[FIG. 21] A cross-sectional view at the line R-R' of the display panel according to Embodiment 2 of the present invention.

In the display panel 2 installed in the image display device according to this Embodiment, the pixel thin-film transistors TFT, gate lines G, and data lines D are connected as shown in FIG. 18 and the subpixels are structured as shown in FIG. 19. The cross-sectional structures at the lines D-D' and R-R' in FIG. 19 are shown in FIGS. 20 and 21, respectively.

In the display panel 2 according to this Embodiment, as shown in FIG. 18, gate lines G1 to G7 extend in the column direction, namely in the Y-axis direction, on the surface of the TFT substrate 2a facing the liquid crystal layer 5LC, namely facing in the +Z direction. Data lines D1 to D13 extend in the row direction, namely in the X-axis direction, on the same surface of the TFT substrate 2a.

In this Embodiment, the gate lines G are angled, but extend in the Y-axis direction while being angled multiple times. The gate lines G are arrayed in the X-axis direction. Furthermore, the data lines D are angled, but extend in the X-axis direction while being angled multiple times. The data lines D are arrayed in the Y-axis direction. A subpixel 4S (a left-eye pixel 4L or a right-eye pixel 4R) is placed near the intersection between a gate line G and a data line D. The same notation as in Embodiment 1 is used for clarify how a subpixel 4S is connected to a gate line G and a data line D. The letter P is followed by the number accompanying the data line D and then followed by the number accompanying the gate line G. In other words, the relationship of the directions in which the gate lines G and data lines D extend to the image separation direction of the lenticular lens 3 in the image display device 1 according to this Embodiment is different from that in Embodiment 1.

In this Embodiment, an expression "adjoining pixel pair" is used. This refers to two subpixels 4S situated on either side of a data line D and connected to the data line D between them. In other words, the subpixels 4S constituting an adjoining pixel pair are supplied with the data potential of video signals via the data line D interposed between them. For example, as shown in FIG. 18, two pixels P34 and P33 adjoining each other in the Y-axis direction constitute an adjoining pixel pair 4PAIR1. Furthermore, two pixels P31 and P32 adjoining each other in the Y-axis direction constitute an adjoining pixel pair 4PAIR2. In the following explanation, the adjoining pixel pairs 4PAIR1 and 4PAIR2 are collectively referred to as 4PAIR for explaining the common structure.

The subpixels 4S constituting an adjoining pixel pair 4PAIR are controlled in switching operation via different gate lines G. In the adjoining pixel pair 4PAIR1 on the left in FIG. 19, the subpixel 4S on the −Y side is controlled by the gate line G on the −X side, and the subpixel 4S on the +Y side is controlled by the gate line G on the +X side.

Then, adjoining pixel pairs 4PAIR adjacent to each other in the extending direction of the data lines D, namely in the X-axis direction, are connected to different data lines D, not to a common data line D. This is because the adjoining pixel pairs 4PAIR are adjacent to each other in the X-axis direction with a shift in the Y-axis direction by one subpixel 4S. With this placement, the necessary number of wires can be minimized, improving the aperture ratio.

Here, with reference to FIG. 18 again, the placement of subpixels in this Embodiment will be reviewed. First, attention is paid to an adjoining pixel pair comprising the pixels P31 and P32. For easier understanding, the above adjoining pixel pair is denoted by (P31, P32) in the following explanation. Then, this adjoining pixel pair (P31, P32) is adjoined by adjoining pixel pairs (P23, P22) and (P42, P43) in the +X direction. The adjoining pixel pair (P22, P23) uses the data line D2 as the common data line. Here, "the common data line" means a shared data line D placed between the subpixels constituting an adjoining pixel pair. The subpixels 4S constituting an adjoining pixel pair are connected to the common data line placed between them and a data potential supplied via the common data line D is written in them at given times. The adjoining pixel pair (P31, P32) uses the data line D3 as the common data line and the adjoining pixel pair (P22, P23) uses the data line D2 as the common data line; the adjoining pixel pairs (P31, P32) and (P22, P23) use different data lines D as their respective common data lines D. Here, their respective common data lines are adjacent to each other. The layout of subpixels 4S in FIG. 19 shows the structural relationship of, for example, the adjoining pixel pair (P34, P33) to pixels P25 and P45 adjacent to it in the +X direction shown in FIG. 18.

The adjoining pixel pair (P31, P32) is adjoined also by another adjoining pixel pair (P42, P43) in the +X direction. Those adjoining pixel pairs also use different data lines as their respective common data lines D.

Furthermore, the adjoining pixel pair (P23, P22) or adjoining pixel pair (P42, P43) is adjoined by an adjoining pixel pair (P34, P33) in the +X direction. Like the adjoining pixel pair (P31, P32), the adjoining pixel pair (P34, P33) uses the data line D3 as the common data line. In other words, the adjoining pixel pairs using the same data line D as the common data line are arranged in every other column of subpixels. In other words, a data line D connected to adjoining pixel pairs constituting a right-eye pixel 4R is not connected to adjoining pixel pairs constituting a left-eye pixel 4L.

In the adjoining pixel pair comprising the pixels P22 and P23, the pixel P22 on the −Y side of the common data line D2 is controlled by the gate line G2 situated on the −X side, and the pixel P23 on the +Y side of the common data line D2 is controlled by the gate line G3 situated on the +X side. In other words, of the subpixels 4S of this adjoining pixel pair situated above and below the common data line D, the subpixel 4S on the +Y side is connected to the gate line G on the +X side.

On the other hand, in the adjoining pixel pair comprising the pixels P31 and P32, the pixel P32 on the −Y side of the common data line D3 is connected to the gate line G2 situated on the +X side, and the pixel P31 on the +Y side of the common data line D3 is connected to the gate line G1 situated on the −X side. In other words, of the subpixels 4S of this adjoining pixel pair situated above and below the common data line D, the subpixel 4S on the +Y side is connected to the gate line G on the −X side. In the columns of subpixels adjacent in the +X direction, the adjoining pixel pairs of which the subpixel 4S on the +Y side is controlled by the gate line G on the −X side use the data line D on the −Y side as the common date line. Consequently, the same kind of adjoining pixel pairs are arranged diagonally. In further other words, in this Embodiment, the adjoining pixel pairs of which the subpixel on the +Y side is connected to the gate line G on the −X side and the adjoining pixel pairs of which the subpixel on the +Y side is connected to the gate line G on the +X side are arrayed.

The pixel thin-film transistors 4TFT provided in an adjoining pixel pair 4PAIR have a double-gate structure in the shape of a horizontal U with their openings of the U shape facing each other. A charging capacitor electrode CS2 shared by the two subpixels 4S constituting the adjoining pixel pair 4PAIR is formed between the facing horizontal U-shaped pixel thin-film transistors 4TFT. A charging capacitor 4CS is formed between the charging capacitor electrode CS2 and the silicon layer 4SI provided in each subpixel 4S.

This Embodiment is the same in the other structure as the above-described Embodiment 1.

The channel parts of pixel thin-film transistors 4TFT in the adjoining pixel pairs 4PAIR1 and 4PAIR2 are parallel to the image separation direction, namely the X-axis direction. The channel part is the operation part of a pixel thin-film transistor 4TFT and should be uniform throughout the subpixels 4S. The data line D is inclined in a direction different from the image separation direction, namely the X-axis direction, in a layer above the channel region of pixel thin-film transistors 4TFT. Furthermore, the data line D is inclined in a direction different from the image separation direction above the charging capacitor electrode CS2. As described above, the data lines D extend in the X-axis direction while being angled multiple times in a layer above the pixel thin-film transistor 4TFT provided at the upper side of a parallelogram and the charging capacitor electrode CS2. Being angled at the upper side of a parallelogram, the data line D is efficiently placed, improving the aperture ratio. Furthermore, since the channel part of a pixel thin-film transistor 4TFT is parallel to the X-axis direction, uniform transistor properties can be obtained by orienting the channel parts of pixel thin-film transistors 4TFT equally according to the excimer laser scanning direction in the case of using laser annealing to form a polysilicon thin film.

In this Embodiment, the pixel thin-film transistors 4TFT controlling the subpixels 4S of an adjoining pixel pair 4PAIR have a double-gate structure and the channel part parallel to the X-axis direction. The source electrodes of the pixel thin-film transistors 4TFT are electrically connected to the pixel electrodes 4PIX via contact holes 4CONT2 for controlling the subpixel 4S on the +Y side and the subpixel 4S on the −Y side, respectively. The contact holes 4CONT2 are formed near the pixel electrodes 4PIX to control for efficient placement. In such s structure, the drain electrode connected to a data line D is not parallel to the X-axis direction and, therefore, the data line D should be angled. As shown in FIG. 19, in this Embodiment, the data line D in a layer above the charging capacitor electrode CS2 is inclined in a direction different from the image separation direction so as to electrically connect the drain electrodes of the pixel thin-film transistors 4TFT of an adjoining pixel pair 4PAIR along the shortest path. The same wiring layout of inclined data line D can apply to connect the drain electrode and data line D in every adjoining pixel pair 4PAIR. Therefore, the conditions upon writing into the subpixels 4S can be maintained uniform.

As shown in FIGS. 19 and 21, the charging capacitor line CS is electrically connected to the charging capacitor electrode CS2. Hence, the charging capacitor lines CS of the subpixels 4S constituting an adjoining pixel pair 4PAIR have the same potential. Since the upper and lower sides of parallelograms of an adjoining pixel pair 4PAIR face each other, the common charging capacitor electrode CS2 serves to reduce the wasted space and efficiently reserve the area for forming the charging capacitor 4CS. Then, the aperture ratio can be increased compared with the prior art and the transmittance can be improved.

Since the parallelogram pixels are adjacent to each other in the manner that the upper side of one subpixel 4S and the lower side of the other subpixel 4S of an adjoining pixel pair 4PAIR face each other, provision of the common charging capacitor electrode CS2 leads to increase in the area for forming the pixel capacitor 4CLC. Then, the aperture ratio can be increased compared with the prior art and the transmittance can be increased.

The drive method, or display operation, of the above-described image display device 1 according to this Embodiment will be described hereafter. In this Embodiment, the image display device 1 is driven by dot inversion drive. In the dot inversion drive, as shown in FIG. 22, the polarity of display data to be transferred is inverted with respect to a reference potential every data line, every gate line, and every frame. The dot inversion drive is also called 1H1V inversion drive. This is because the polarity is inverted every data line arrayed in the horizontal direction (H direction) and every gate line arrayed in the vertical direction (V direction).

Figure 23:
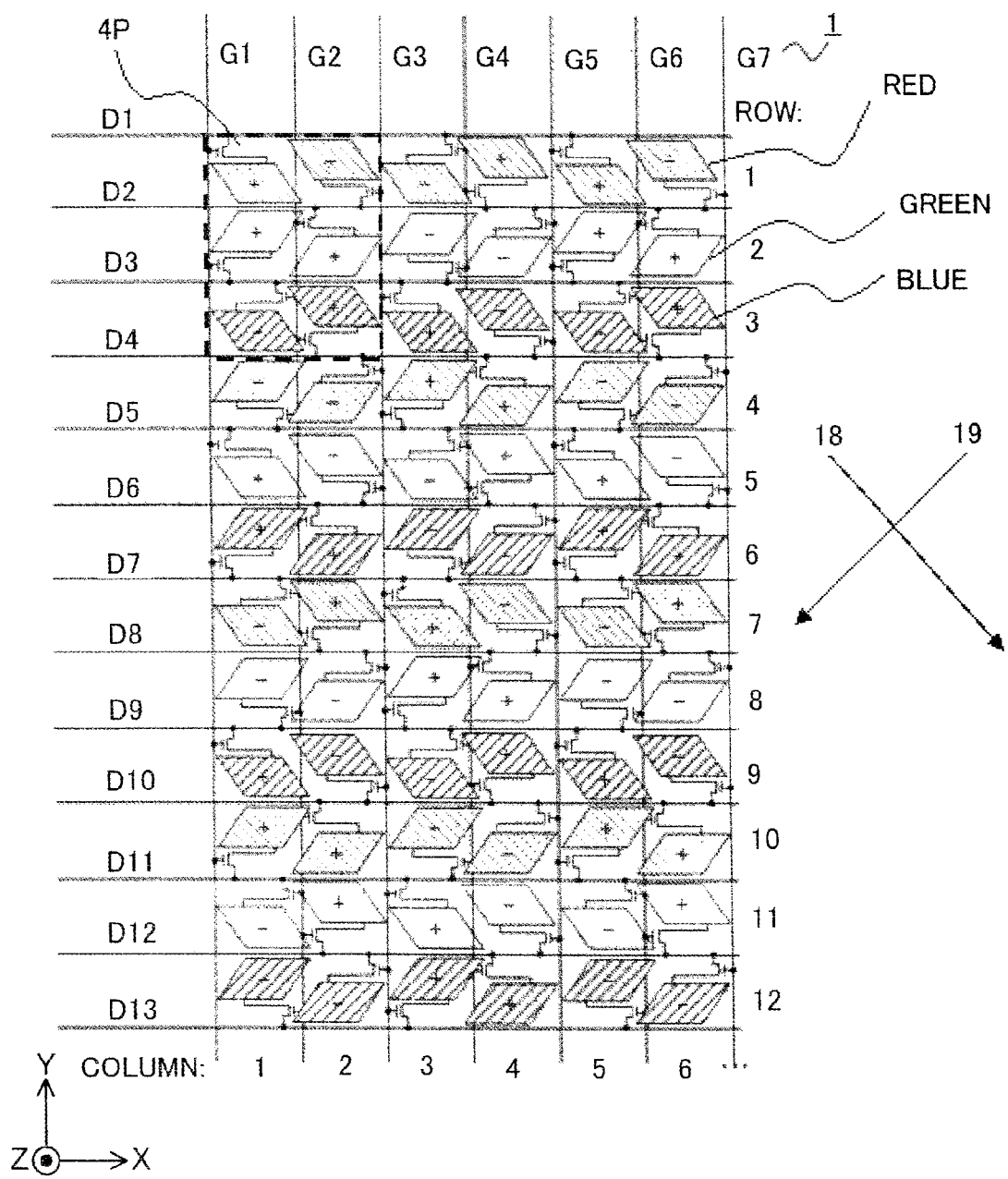
[FIG. 23] An illustration showing the polarities of subpixels in the image display device according to Embodiment 2 of the present invention.

The image display device 1 realizes the polarities of subpixels 4S as shown in FIG. 23 in a given frame as a result of dot inversion drive. First, as the gate line G1 is selected, display data of the positive polarity are transferred to the data line D1 and a positive voltage is written in the pixel P11. On the other hand, display data of the negative polarity are transferred to the data line D2. Similarly, display data of the positive polarity are transferred to the data lines D3, D5, D7, D9, D11, and D13, and display data of the negative polarity are transferred to the data lines D4, D6, D8, D10, and D12. Then, when the gate line G2 is selected, the polarities of the data lines are all inverted. In other words, display data of the negative polarity are transferred to the data lines D1, D3, D5, D7, D9, D11, and D13, and display data of the positive polarity are transferred to the data lines D2, D4, D6, D8, D10, and D12. Subsequently, when the gate line G3, G5, or G7 is selected, the same operation as when the gate line G1 is selected is conducted. When the gate line G4 is selected, the same operation as when the gate line G2 is selected is conducted. After this frame is over, the polarity inversion is further conducted in the next frame. In other words, when the gate line G1, G3, G5, or G7 is selected, display data of the negative polarity are transferred to the data lines D1, D3, D5, D7, D9, D11, and D13, and display data of the positive polarity are transferred to the data lines D2, D4, D6, D8, D10, and D12. When the gate line G2, G4, or G6 is selected, display data of the positive polarity are transferred to the data lines D1, D3, D5, D7, D9, D11, and D13, and display data of the negative polarity are transferred to the data lines D2, D4, D6, D8, D10, and D12.

A group of subpixels comprising right-eye pixels 4R has the polarity distribution yielding the two-line dot inversion (2H1V dot inversion) effect, and so does a group of subpixels comprising left-eye pixels 4L. Consequently, the polarity distribution of an image to be viewed with an eye shows the polarity inverted every two data lines D2 arrayed in the horizontal direction (H direction) or every gate line G arrayed in the vertical direction (V direction). The basic set of polarity distribution according to this Embodiment consists of a total of 16 pixels, four pixels in the X-axis direction and four pixels in the Y-axis direction.

This Embodiment can prevent fluctuation in the potential of the charging capacitor line CS upon writing display data in the subpixels 4S. This is because not only the subpixels in which display data of the positive polarity are written but also the subpixels in which display data of the negative polarity are written are connected to the common charging capacitor electrode CS2 of an adjoining pixel pair 4PAIR in two consecutive gate line G selection periods. In this way, it is possible to prevent the potential of the charging capacitor line CS from fluctuating to one polarity and, then, reduce crosstalk occurring in the extending direction of the charging capacitor line CS and realize high quality image display. The structure according to this Embodiment can realize the two-line dot inversion effect and the effect of preventing fluctuation in the potential of the charging capacitor line CS while using conventional dot inversion drive, and allows the subpixels of which the bases of parallelogram apertures are adjacent to each other to have the same polarity. In this way, high quality image display can be realized at a low cost.

Figure 24:
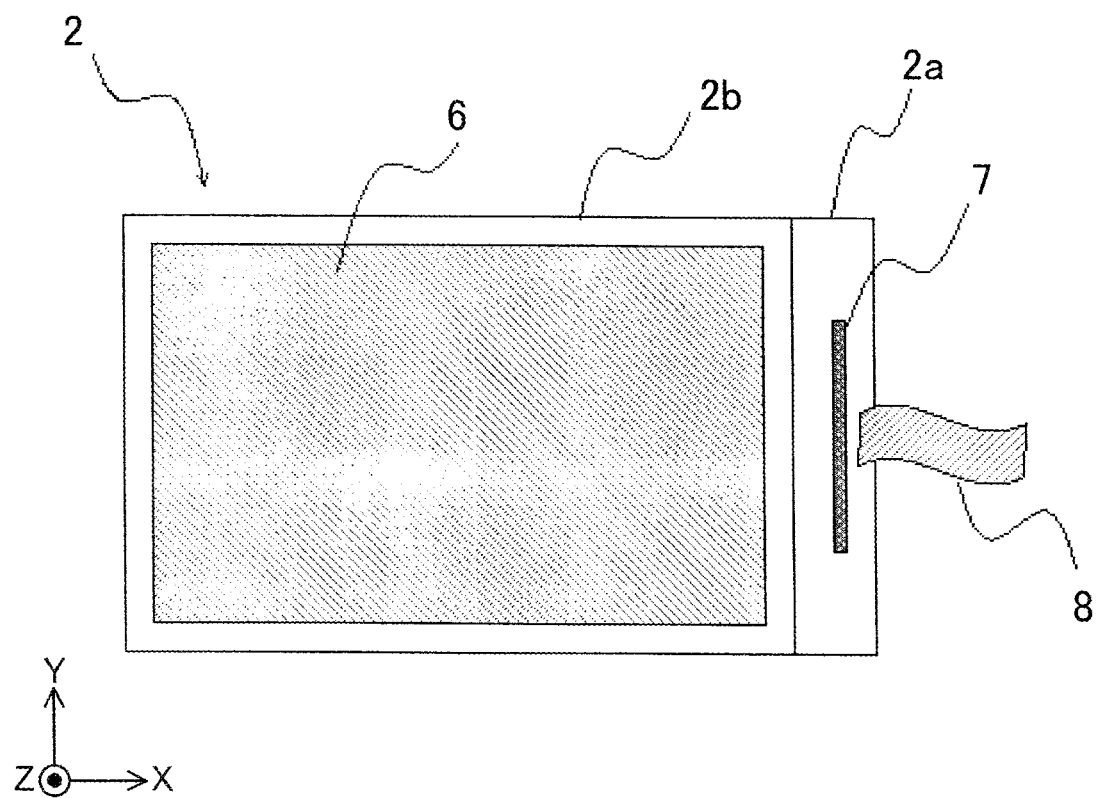
[FIG. 24] A plane view showing the display panel according to Embodiment 2 of the present invention.

As shown in FIG. 24, the display panel 2 is placed with the long side oriented in the X-axis direction and the short side oriented in the Y-axis direction. Having the image separation direction in accord with the X-axis direction, the display panel 2 is a display panel accommodating landscape (widescreen) display. In an example, the display panel 2 has a screen resolution WVGA: 800 pixels in the X-axis direction and 480 pixels in the Y-axis direction. As described above, a unit of display 4U comprises two subpixels corresponding to two observing points. One pixel comprises three units of display 4U and the units of display 4U are colored in three colors. In such a case, the numbers of data lines and gate lines used in the display unit 6 are as follows: the number of data lines arrayed in the Y-axis direction is 480×3+1=1441 and the number of gate lines arrayed in the X-axis direction is 800×2+1=1601. Therefore, the display panel 2 shown in FIG. 24 has data lines less than gate lines.

Furthermore, a drive IC 7 for controlling video signals is mounted on a short side of the TFT substrate 2a of the display panel 2. The output of the drive IC 7 is connected to the data lines of the display unit 6. Generally, the output pin pitch of the drive IC 7 is smaller than the data line pitch. Therefore, the wires extending from the output pins of the drive IC 7 to the data lines must be spread and, therefore, some distance is necessary between the drive IC 7 and display unit 6. The distance between the display unit 6 and drive IC 7 can be reduced for the same output pin pitch as the number of data lines to make connection is smaller. In the case of the display unit 6 being used in the landscape mode, the number of data lines can be reduced when the data lines extend horizontally, namely in the X-axis direction, to be connected to the drive IC 7 at a short side of the display panel 2 than when the data lines extend vertically to be connected to the drive IC 7 at a long side of the display panel 2. Then, the data lines extending horizontally allows for a smaller frame. Furthermore, a smaller number of data lines can reduce the necessary number of drive ICs 7, reducing the cost and reducing the workload of the drive IC 7. Furthermore, a multiplexer circuit for data signals can be installed in the drive IC 7 and a switching circuit capable of sorting data signals output from the drive IC 7 in a time-sharing manner according to the operation of the multiplexer circuit can be provided on the TFT substrate 2a. In this way, the number of data signal wires output from the drive IC 7 to be connected can further be reduced.

In this Embodiment, a gate driver circuit for scanning the gate lines in sequence is formed on the TFT substrate 2a concurrently with the pixel thin-film transistors. In this way, the frame width of the display panel 2 at the long side can be reduced. Furthermore, the display panel 2 can have a smaller frame on each side by proving the drive IC 7 connected at a short side of the display panel 2 on a short side and integrating the gate driver circuit connected at a long side of the display panel 2. The display panel 2 having smaller frames is smaller in size and the number of display panels 2 obtained from one mother board is increased, reducing the cost. Furthermore, integral formation of the subpixels and gate driver circuit on the TFT substrate 2a leads to reduction in the number of parts of the driver circuit, reducing the cost and power consumption.

The screen resolution is not restricted to the above configuration. Apparently, a display panel 2 for N observing points having pixels colored in K colors and a screen resolution of Mx pixels in the X-axis direction and My pixels in the Y-axis direction can yield the above effects provided that the relationship N×Mx<K×My is satisfied.

As described above, the data lines D connected to the adjoining pixel pairs 4PAIR constituting right-eye pixels 4R are not connected to the adjoining pixel pairs 4PAIR constituting left-eye pixels 4L. Therefore, with the odd-numbered data lines D1, D3, D5, D7, D9, D11 and D13 and even-numbered data lines D2, D4, D6, D8, D10, and D12 being driven independently, the right-eye pixel 4R and left-eye pixel 4L can operate separately to display a simplified parallax image. The three-dimensional visibility can be inspected simply by supplying signals to the even-numbered data lines D or to the odd-numbered data lines D separately in the production process of placing the lenticular lens 3 on the display panel 2. Then, the production yield in the subsequent process can be improved. The same signals can be supplied to the even-numbered lines or to the odd-numbered lines at a time. The switch for changeover of input signals between the even-numbered and odd-numbered lines can be formed on the TFT substrate 2a concurrently with the pixel thin-film transistors 4TFT. In this way, the inspection device can be simplified.

The image display device 1 according to this Embodiment can be installed in a cellular phone 9 as shown in FIG. 15 in the same manner as in Embodiment 1. The display panel 2 in this Embodiment is characterized by having a narrow frame and, therefore, is favorably applicable to portable devices without imposing any limitation on the functionality, design, and operability required for portable devices.

[Embodiment 3]

The image display device according to Embodiment 3 of the present invention and display panel installed in the image display device will be described.

Figure 25:
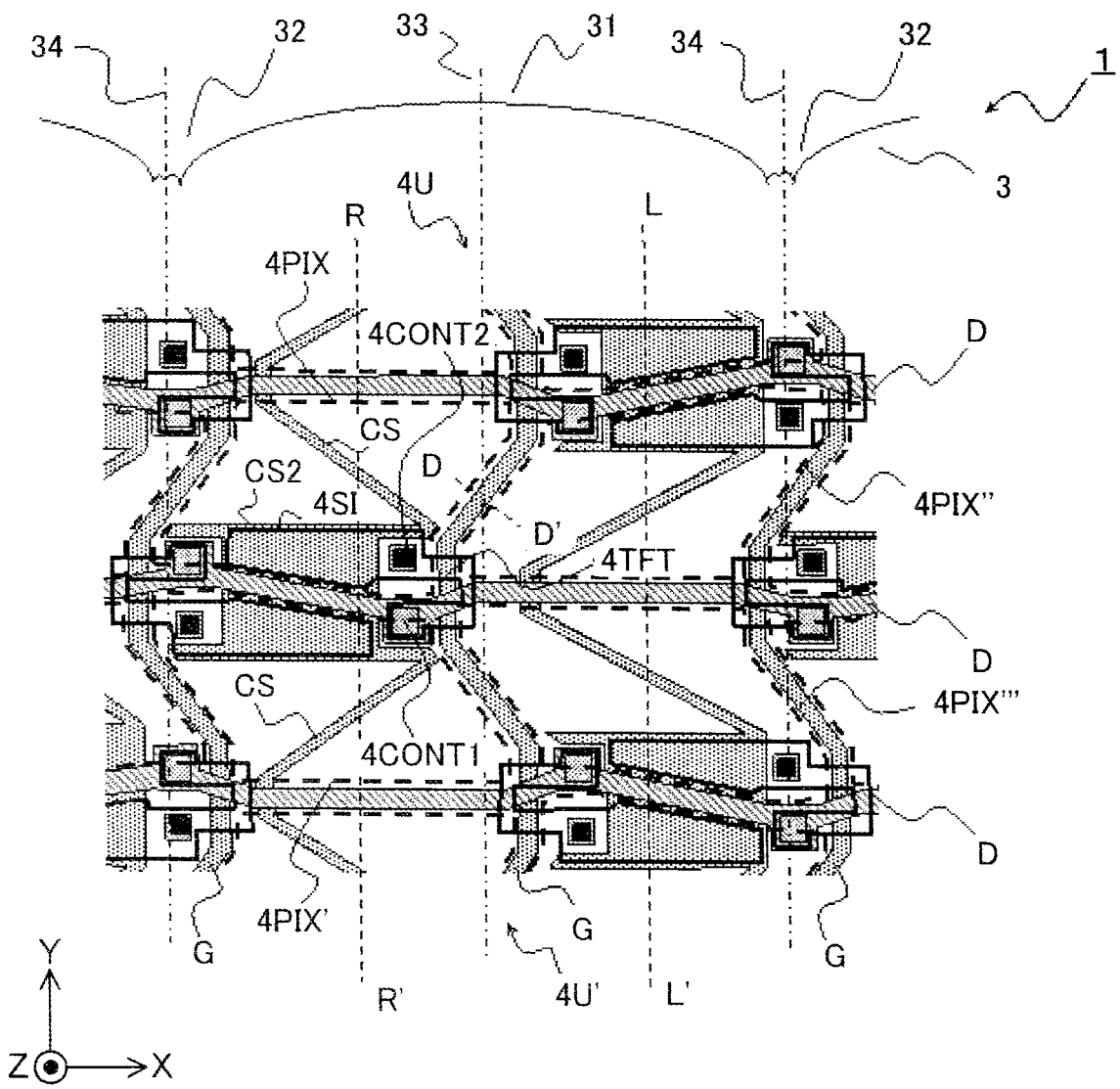
[FIG. 25] An enlarged view showing subpixels of the display panel according to Embodiment 3 of the present invention.
Figure 26:
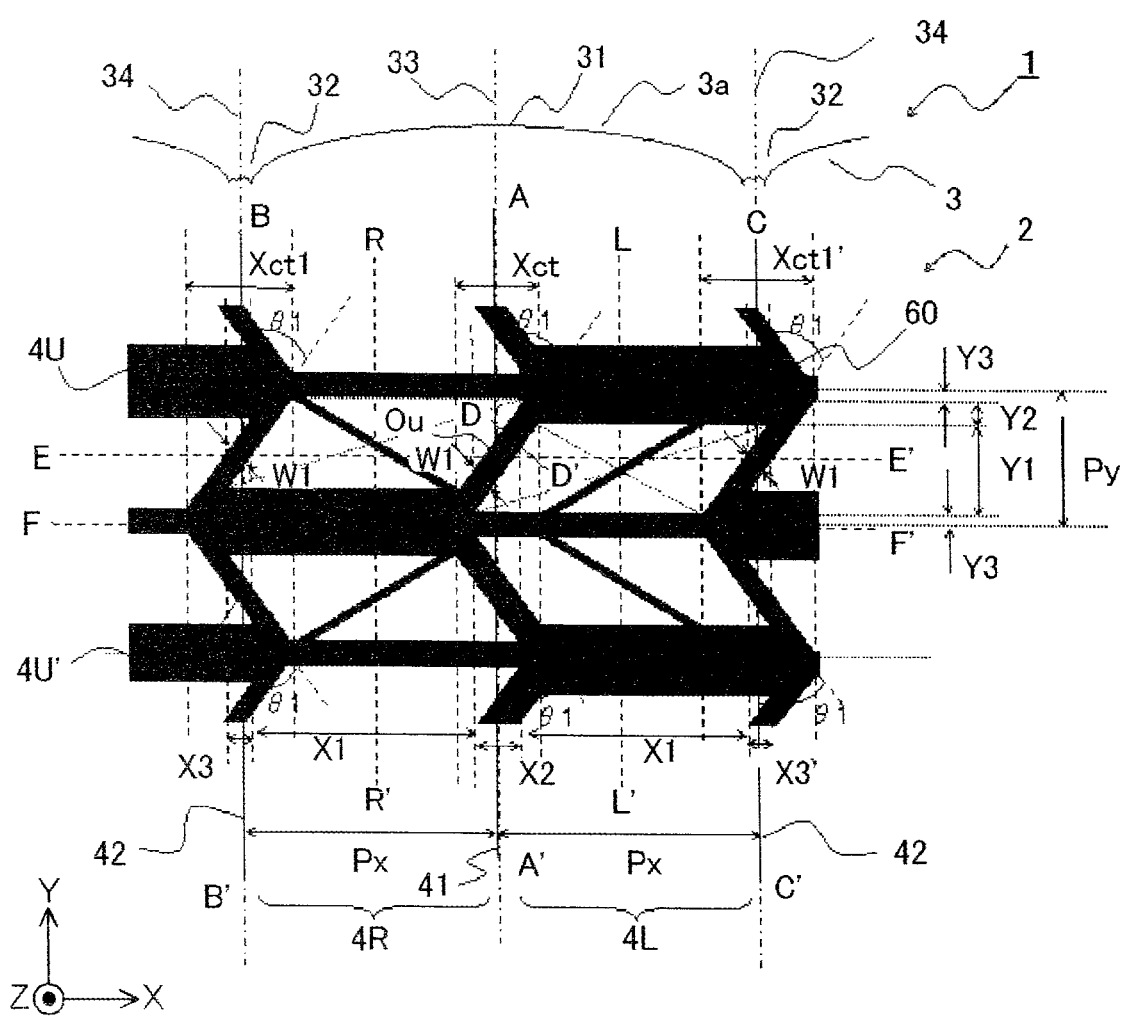
[FIG. 26] An enlarged view showing subpixels of the display panel according to Embodiment 3 of the present invention.
Figure 27:
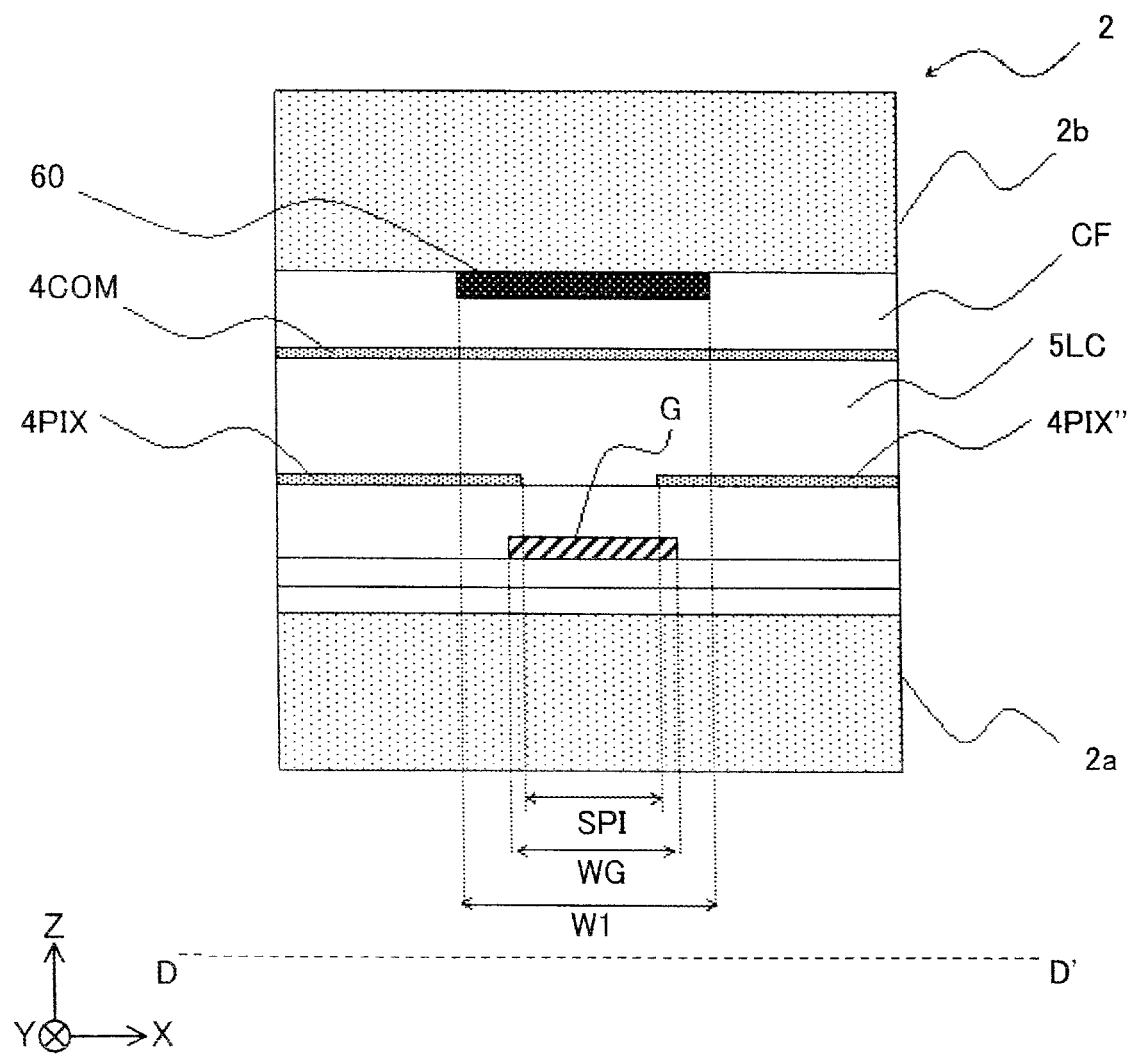
[FIG. 27] A cross-sectional view at the line D-D' of the display panel according to Embodiment 3 of the present invention.

The subpixels of the display panel installed in the image display device according to this Embodiment have the structures as shown in FIGS. 25 and 26. The cross-sectional structure at the line D-D' in FIGS. 25 and 26 is shown in FIG. 27.

As shown in FIGS. 25 and 26, one charging capacitor line CS is provided in a subpixel 4S and crosses a virtual line R-R' passing through the center of the subpixel 4S. The virtual line R-R' is parallel to the Y-axis direction and bisects the subpixel 4S in the X-axis direction.

In a subpixel 4S, the gate line G and charging capacitor line CS are inclined in directions different from the image separation direction. The gate line G and charging capacitor line CS have different inclinations.

The gate lines G in the subpixels 4S arranged in the X-axis direction have the same inclination. The charging capacitor lines CS are inclined differently in a unit of display 4U and inclined equally in an adjoining pixel pair 4PAIR. Furthermore, the charging capacitor line CS is angled in different directions every subpixel 4S in the X-axis direction and in the Y-axis direction so that the inclination is diversified in the X-axis direction and in the Y-axis direction.

This Embodiment is the same in the other structure and operation as the above-described Embodiment 1.

With the gate line G and charging capacitor line CS being inclined differently, the cycle of moire stripes appearing due to the lens array pitch and wire array pitch is diversified in different directions, whereby the moire strips appearing due to the periodic structure of the display panel 2 and image separating unit is made less visible, improving the display quality.

[Embodiment 4]

The image display device according to Embodiment 4 of the present invention and display panel installed in the image display device will be described.

Figure 28:
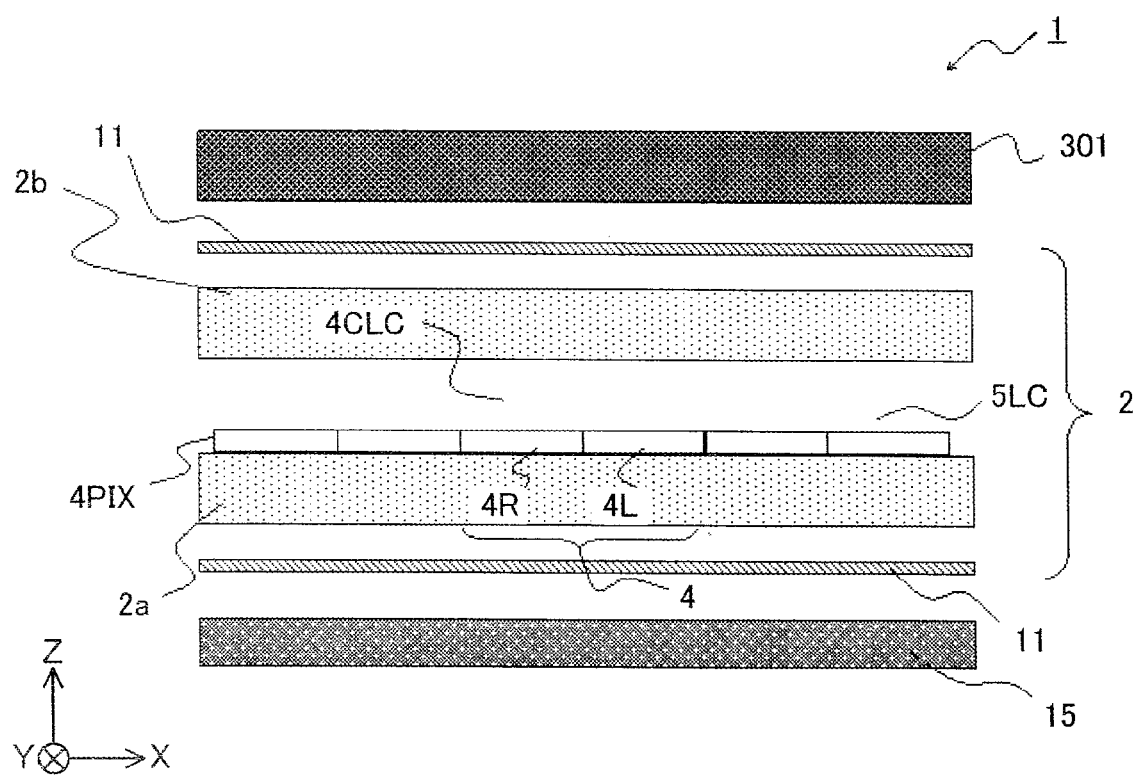
[FIG. 28] Across-sectional view showing the image display device according to Embodiment 4 of the present invention.

The image display device 1 according to this Embodiment has, as the image separating unit, an optical element comprising a liquid crystal GRIN (gradient index) lens 301 as shown in FIG. 28.

Figure 29:
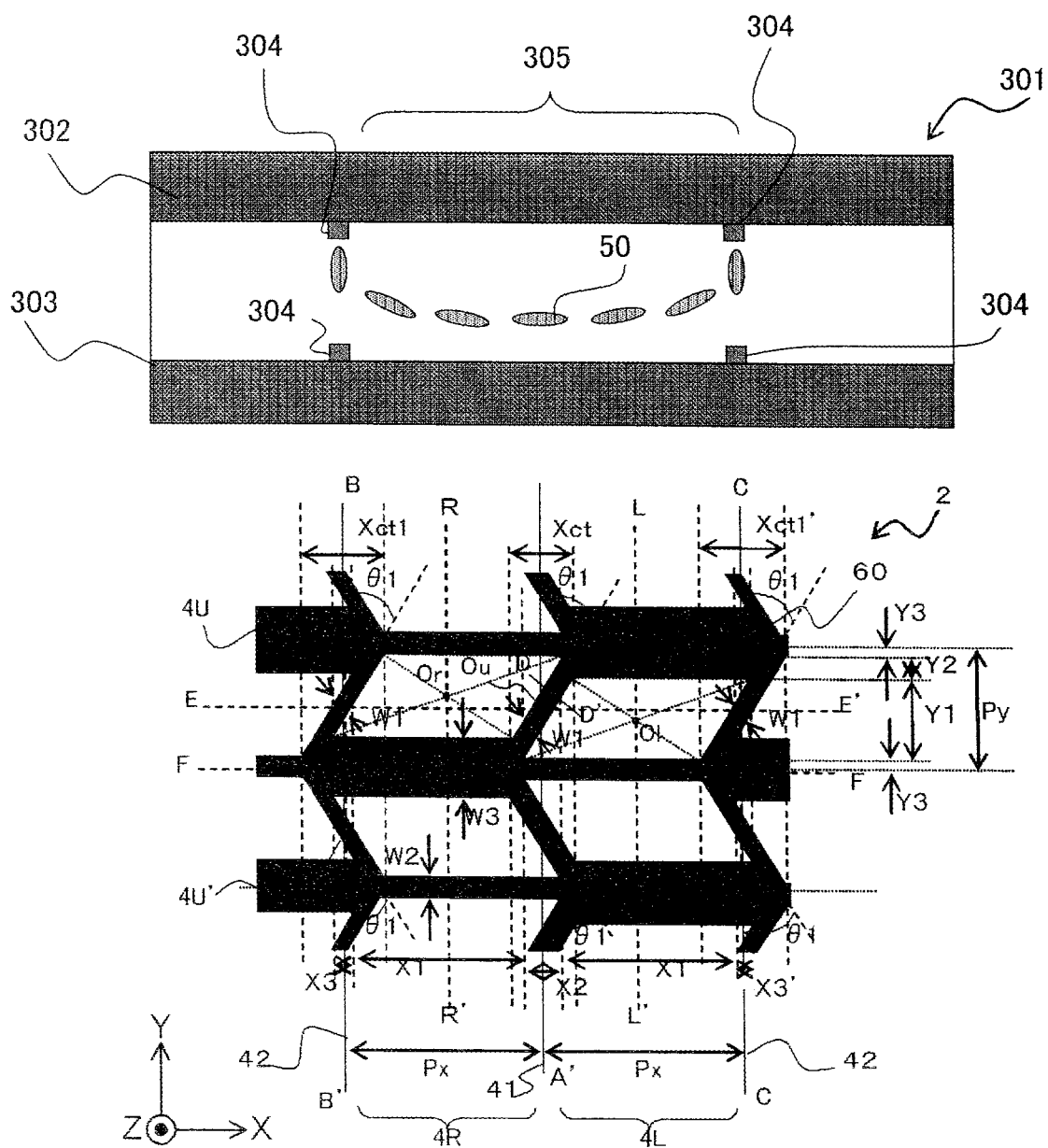
[FIG. 29] Across-sectional view showing the image separating unit according to Embodiment 4 of the present invention.

As shown in FIG. 29, the liquid crystal molecules 50 between a control substrate 302 and an opposite substrate 303 are subject to electric field control by control electrodes 304, whereby the liquid crystal GRIN lens 301 has a variable refractive index and yields the same effect as a lens. When it is turned off, the liquid crystal GRIN lens 301 is subject to no change in the refractive index and allows light to transmit as it is. When the liquid crystal GRIN lens 301 is turned on, the liquid crystal molecules are radially oriented along the electrodes arranged in stripes in the vertical direction of the panel, whereby the liquid crystal GRIN lens 301 plays the role of a lens. A pair of control electrodes 304 forms a lens element 305. The lens elements 305 are arrayed in the plane of the liquid crystal GRIN lens 301. The lens elements 305 are placed in accordance with the units of display 4U.

This Embodiment is the same in the other structure and operation as the above-described Embodiment 1.

As shown in FIG. 29, some of the liquid crystal molecules 50 are not fully controlled by the control electrodes 304. Therefore, the liquid crystal GRIN lens 301 has an optical performance profile dependent on the liquid crystal orientation. Then, even in the case of using a GRIN (gradient index) lens, which is an electro-optical element using liquid crystal, as the optical unit, the profile of refractive index corresponding to the lens concave part 32 is more uneven than the profile of refractive index corresponding to the lens convex part 31 because of the electric field created by the control electrodes 304. Furthermore, as with the above-described lenticular lens 3, besides the GRIN lens having the optical separation performance lower at the portions corresponding to the lens concave part 32, even with a liquid crystal lens comprising a combination of a concave-convex substrate having lens effect and liquid crystal molecules 50, the optical separation performance tends to deteriorate at steep, convex portions corresponding to the lens concave part 32.

The liquid crystal GRIN lens 301 can yield partial lens effect in the plane of the liquid crystal GRIN lens 301 by selectively turning on/off the lens elements 305. Consequently, the three-dimensional display (3D display) and two-dimensional display (2D display) can be mixed on the same screen.

The display panel 2 according to this Embodiment has a subpixel pitch Pu of 150 μm and a liquid crystal layer thickness of 4 μm. The optical element comprising the liquid crystal GRIN lens 301 has a liquid crystal layer thickness of 50 μm. However, since this liquid crystal layer thickness is larger than 10 times the thickness of the liquid crystal layer of a conventional liquid crystal panel, the response is significantly slow. Then, if the content requires frequent switching between 3D display and 2D display on the same screen, some limitation is imposed on mixing 3D display and 2D display on the same screen by partially turning on/off the lens elements 305 of the liquid crystal GRIN lens 301.

This Embodiment can operate the left-eye pixel 4L and right-eye pixel 4R in a unit of display 4U independently when the liquid crystal GRIN lens 301 is on. Then, 3D display and 2D display can be mixed on the same screen while keeping the liquid crystal GRIN lens 301 on. On the other hand, when the liquid crystal GRIN lens 301 is off, high quality 2D display under no influence of the refractive index can be provided.

On the other hand, if the content does not require frequent switching between 3D display and 2D display on the same screen, the lens elements 305 of the liquid crystal GRIN lens 301 can be operated in part for display, reducing the power consumption of the liquid crystal GRIN lens 301.

[Embodiment 5]

The image display device according to Embodiment 5 of the present invention and display panel installed in the image display device will be described.

Figure 30:
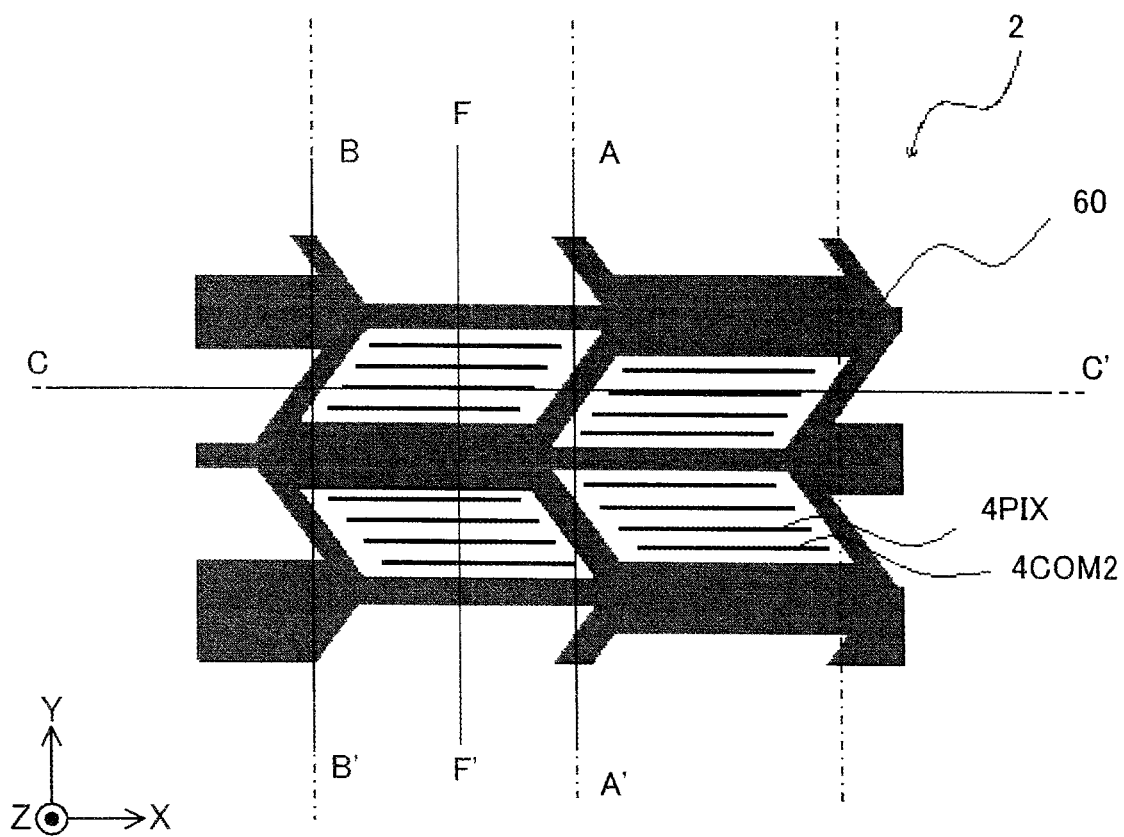
[FIG. 30] An enlarged view showing subpixels of the display panel according to Embodiment 5 of the present invention.

In the display panel 20 according to this Embodiment, as shown in FIG. 30, a pixel electrode 4PIX and a common electrode 4COM2 are provided on the same substrate and an electric field nearly parallel to the substrate surface is applied to drive the liquid crystal molecules. The pixel electrode 4PIX and common electrode 4COM2 are parallel to the upper and lower sides of a parallelogram subpixel.

Figure 31:
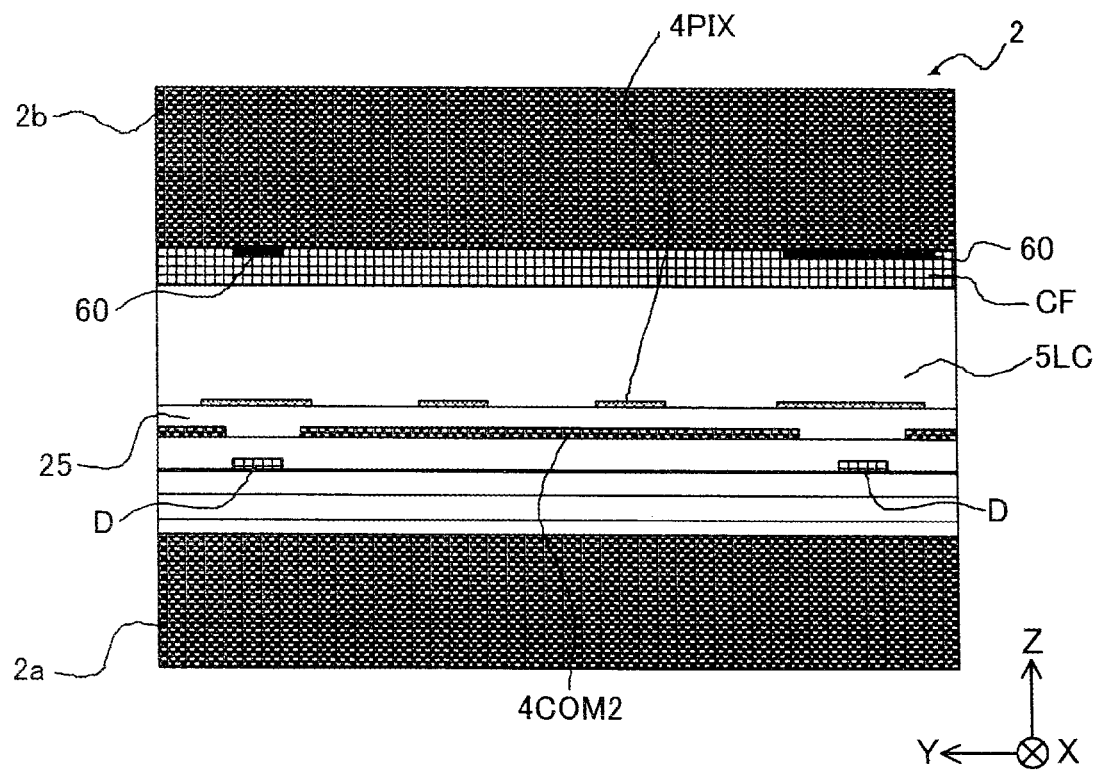
[FIG. 31] A cross-sectional view at the line F-F' of the display panel according to Embodiment 5 of the present invention.

FIG. 31 shows an example of a cross-sectional structure at the line F-F' in FIG. 30. The pixel electrode 4PIX and common electrode 4COM2 are formed with an insulating film 25 in-between, and the pixel electrode 4PIX is provided with a slit electrode. Here, the common electrode 4COM2 instead of the pixel electrode 4PIX can be provided with a slit electrode. This Embodiment is the same in the other structure and operation as the above-described Embodiment 1.

Having the above configuration, this Embodiment can provide an image display device with a larger angle of view.

Particularly, a conventional liquid crystal display element controls the rubbing process on one substrate in one direction. Therefore, if each subpixel has an asymmetric structure with respect to the rubbing direction, the display properties vary depending on the subpixel. Then, difference in display properties between observing points will appear particularly in a three-dimensional display device.

The units of display 4U in this Embodiment comprise subpixels of a single outer shape, diminishing difference in the staggered structure and/or electric field profile structure between subpixels and reducing difference in display properties between observing points caused by difference in the subpixel shape. Furthermore, the subpixels are oriented uniformly so as to stabilize the liquid crystal orientation upon application of a voltage. In other words, difference in the image quality between observing points can be diminished, and uniform images can be output at the observing points to provide high quality three-dimensional images. Furthermore, the subpixels of a single shape contribute to stabilizing the orientation of liquid crystal molecules throughout the subpixels, reducing defective orientation and/or light leakage and improving the contrast.

[Modified Embodiment Of Embodiment 5]

The image display device according to a modified Embodiment of Embodiment 5 of the present invention and display panel installed in the image display device will be described.

Figure 32:
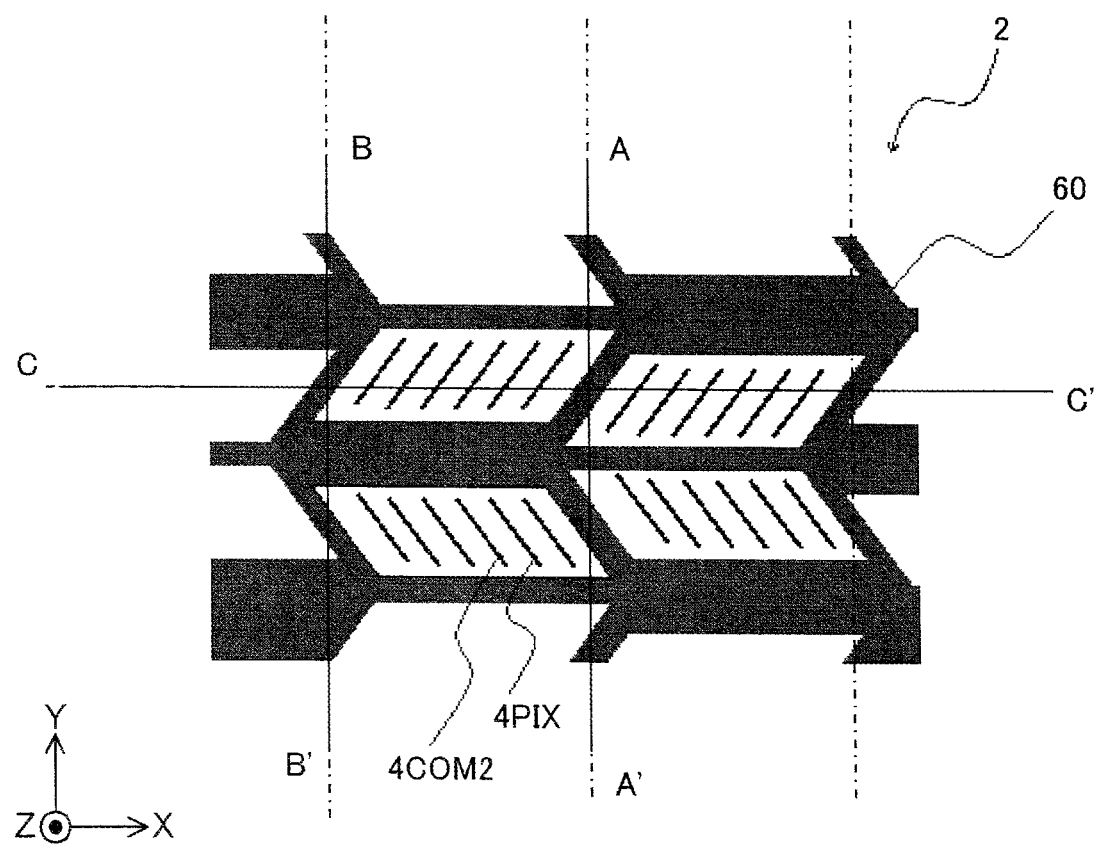
[FIG. 32] An enlarged view showing subpixels of the display panel according to a modified embodiment of Embodiment 5 of the present invention.
Figure 33:
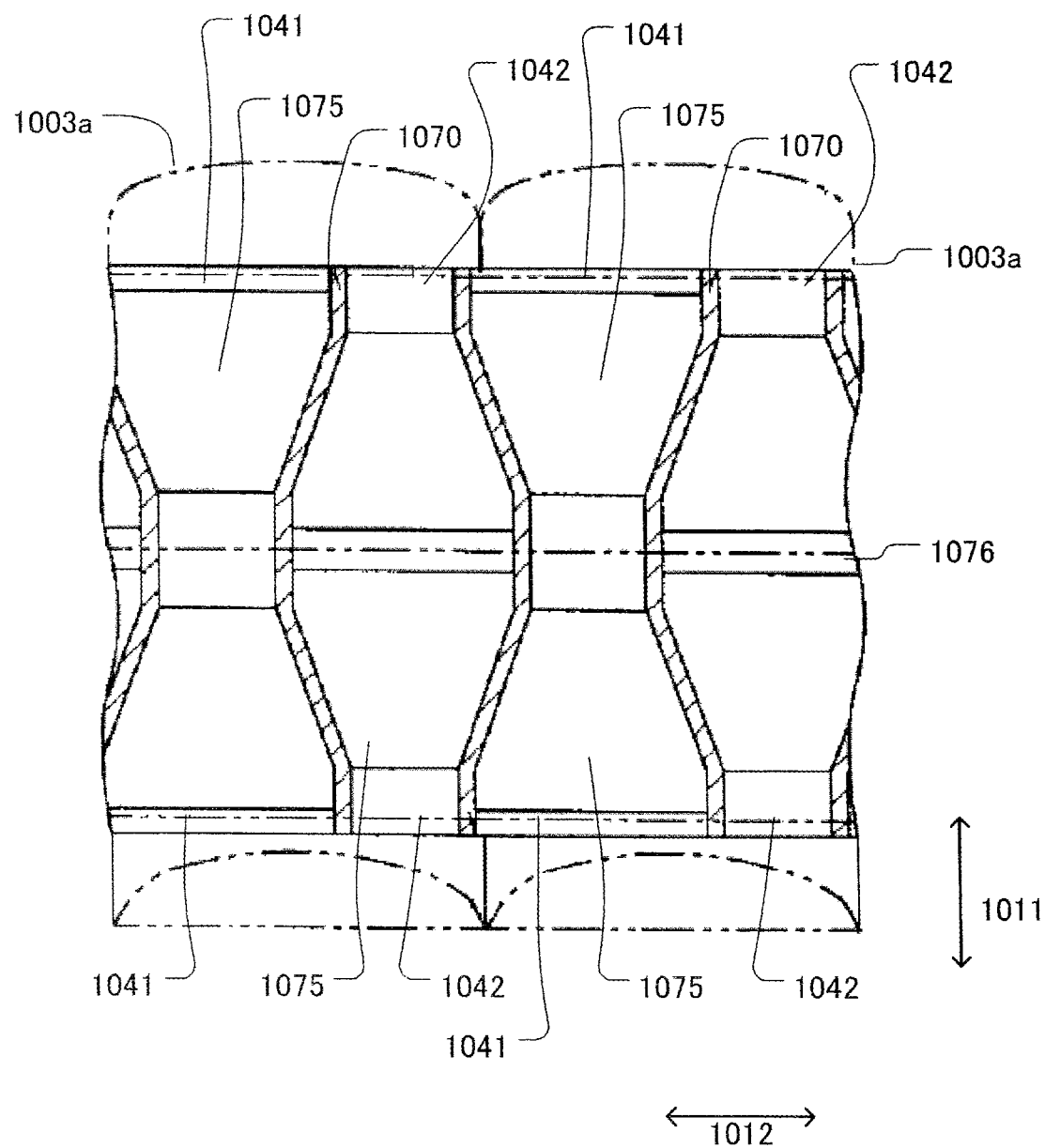
[FIG. 33] A plane view showing pixels of a prior art three-dimensional image display device.
Figure 34A:
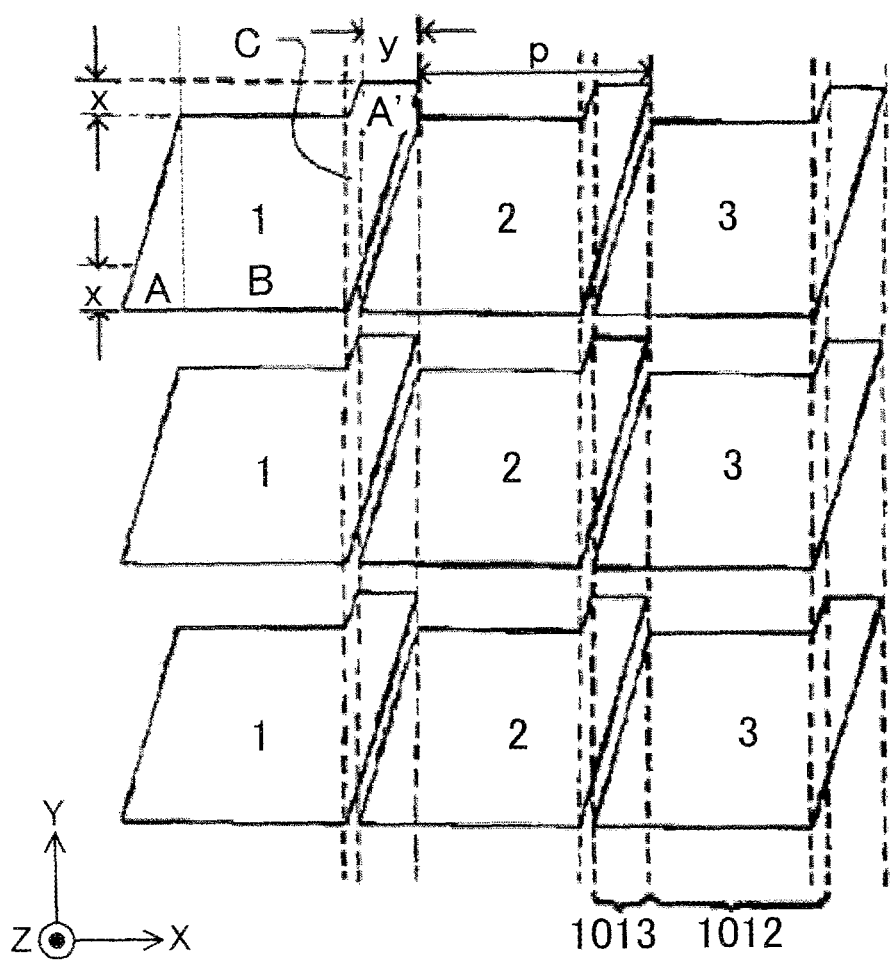
[FIG. 34A] A plane view showing pixels of a prior art three-dimensional image display device.
Figure 34B:
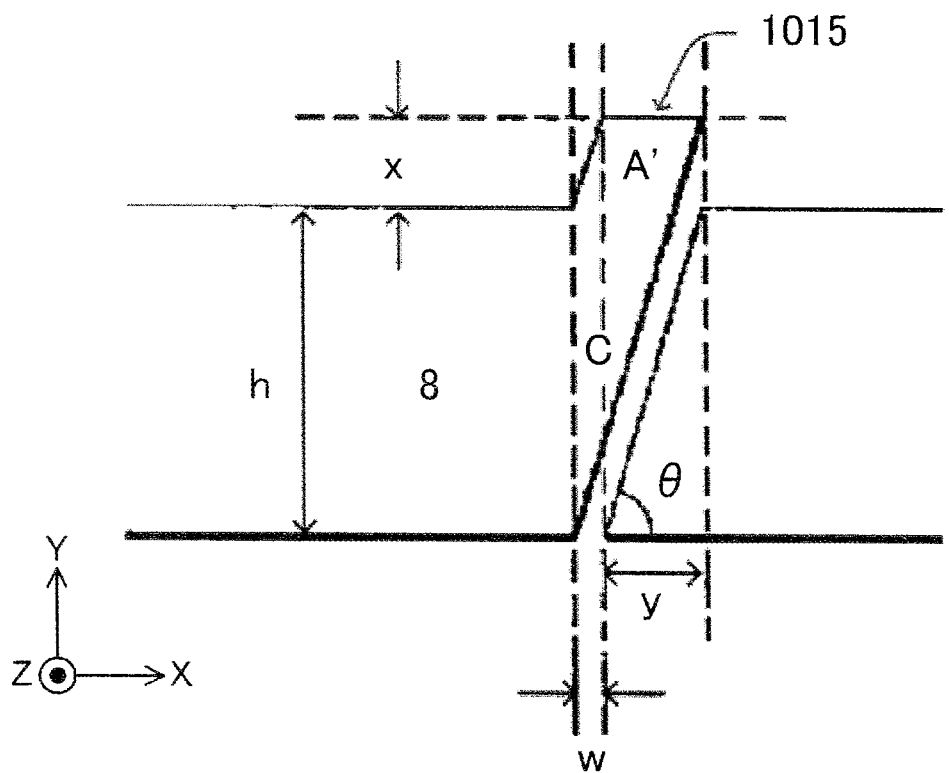
[FIG. 34B] A plane view showing pixels of a prior art three-dimensional image display device.

In the display panel 2 according to this Embodiment, as shown in FIG. 32, a pixel electrode 4PIX and a common electrode 4COM2 are provided on the same substrate and an electric field nearly parallel to the substrate surface is applied to drive the liquid crystal molecules. The pixel electrode 4PIX and common electrode 4COM2 are parallel to the oblique sides of a parallelogram subpixel.

The liquid crystal molecules of subpixels 4S adjacent to each other in the Y-axis direction are oriented in directions different from each other by an electric field from the pixel electrode 4PIX. The liquid crystal molecules of subpixels arranged in the Y-axis direction form different domains, reducing change in hue when seen in a diagonal direction.

In this Embodiment, a positive liquid crystal material having a positive dielectric constant anisotropy ($\Delta\epsilon>0$) is employed and the rubbing direction on the side to the TFT substrate 2a is set to the −Y direction or the +Y direction. Then, the liquid crystal molecules 50 are oriented with their long axis nearly in parallel to the Y-axis direction in the initial state.

The liquid crystal material is not restricted to positive materials and can be negative materials having a negative dielectric constant anisotropy ($\Delta\epsilon<0$). When a negative liquid crystal material is used, the rubbing direction is set to the −X direction or the +X direction. Then, the liquid crystal molecules 50 are oriented with their long axis nearly in parallel to the X-axis direction. It is difficult for a negative liquid crystal material to rise in the long axis direction with respect to the electric field in the direction perpendicular to the substrate surface. The liquid crystal molecules above the electrodes are entrained by the liquid crystal molecules rotating in a substrate plane and oriented, whereby the transmittance above the electrodes can be improved. Furthermore, difference in brightness between above the electrodes and between the electrodes is diminished, whereby 3D moire caused by this difference in brightness can be reduced.

This Embodiment is the same in the other structure and operation as the above-described image display device 1 of Embodiment 5.

This Embodiment employs a domain cycle of two rows due to angling and a color filter cycle of three rows. Then, multi-domain compensation occurs in every six rows. The subpixels having the same color and shape are repeated in a cycle of six rows, 6×Py. When this cycle is enlarged, unevenness becomes more visible and the image quality deteriorates. Therefore, subjective assessment revealed that the desirable pixel pitch Pu is equal to or smaller than 150 μm. In other words, it is desirable that the subpixel pitch in the Y-axis direction is equal to or smaller than 50 μm.

Various Embodiments and modifications are available to the present invention without departing from the broad sense of spirit and scope of the present invention. The above-described Embodiments are given for explaining the present invention and do not confine the scope of the present invention. In other words, the scope of the present invention is set forth by the scope of claims, not by the Embodiments. Various modifications made within the scope of claims and scope of significance of the invention equivalent thereto are considered to fall under the scope of the present invention.

The above Embodiments are partially or entirely described as in the following subjunction, but not limited thereto.

(Subjunction 1)

An image display device, comprising:

a display panel in which units of display including at least a pixel displaying a first observing point image and a pixel displaying a second observing point image are arranged in a matrix; and an optical distributer for distributing light emitted from the pixel displaying the first observing point image and pixel displaying the second observing point image in directions different from each other in a first direction, wherein the pixel displaying the first observing point image and pixel displaying the second observing point image are adjacent to each other in the first direction;

the units of display are arranged in rows extending in the first direction and in columns extending in a second direction perpendicular to the first direction;

a shielding unit is provided around an aperture of the pixel displaying the first observing point image and an aperture of the pixel displaying the second observing point image;

the aperture of the pixel displaying the first observing point image and aperture of the pixel displaying the second observing point image include a first region where the apertures overlap with each other in the second direction and a second region that is a remaining region;

a total aperture width in the second direction of the aperture of the pixel displaying the first observing point image and aperture of the pixel displaying the second observing point image in the first region is a first aperture width;

an aperture width in the second direction of the aperture of the pixel displaying the first observing point image and aperture of the pixel displaying the second observing point image in the second region is a second aperture width;

a third region where two of the units of display adjacent to each other in the first direction overlap with each other in the second direction is provided, and a total aperture width in the second direction of the two units of display in the third region is a third aperture width;

the aperture of the pixel displaying the first observing point image and aperture of the pixel displaying the second observing point image each comprises a shape that is at least point-symmetric and not line-symmetric;

centers of the apertures are shifted in the second direction with respect to a line parallel to the first direction and passing through a center of the unit of display, and the aperture of the pixel displaying the first observing point image and aperture of the pixel displaying the second observing point image are point-symmetric about the center of the unit of display; and the third aperture width is different from the first aperture width.

(Subjunction 2)

The image display device according to Subjunction 1, wherein:

the third aperture width is smaller than the first aperture width.

(Subjunction 3)

The image display device according to Subjunction 1 or 2, wherein:

the optical distributer comprises an alternate structure at least in the first direction comprising regions of high separation performance and regions of low separation performance in distributing light from the pixel displaying the first observing point image and pixel displaying the second observing point image in directions different from each other; and the regions of high separation performance extend from the aperture of the pixel displaying the first observing point image to the aperture of the pixel displaying the second observing point image.

(Subjunction 4)

The image display device according to any one of Subjunction 1 to 3, wherein:

the optical distributer comprises a lenticular lens sheet in which convex parts and concave parts of cylindrical lenses are alternately arranged in the first direction; and the convex parts of cylindrical lenses are provided at positions corresponding to the first region and the concave parts of cylindrical lenses are provided at positions corresponding to the third region.

(Subjunction 5)

The image display device according to any one of Subjunction 1 to 3, wherein:

the optical distributer comprises a refractive index distributed lens comprising a pair of substrates with liquid crystal in-between; and a pair of electrodes provided to the substrates is provided at positions corresponding to the third region.

(Subjunction 6)

The image display device according to any one of Subjunction 1 to 5, wherein:

the pixel displaying the first observing point image and pixel displaying the second observing point image are subpixels, and the apertures are enclosed by data lines, gate lines and charging capacitor electrodes;

the subpixels of the display panel are arranged in an array of adjoining pixel pairs each comprising two subpixels provided on either side of one of the gate lines and adjacent to each other in the second direction as a basic unit;

a switcher of one of the two subpixels and a switcher of the other of the two subpixels are controlled by the gate line interposed between and shared by the two subpixels and connected to different ones of the data lines;

one electrode of the switchers forms a capacitor together with the charging capacitor electrode; and the charging capacitor electrode is electrically connected to a charging capacitor line provided at least in a boundary region between the subpixels in the unit of display.

(Subjunction 7)

The image display device according to any one of Subjunction 1 to 5, wherein:

the pixel displaying the first observing point image and the pixel displaying the second observing point image are subpixels, and the apertures are enclosed by data lines, gate lines and charging capacitor electrodes;

the subpixels of the display panel are arranged in an array of adjoining pixel pairs each comprising two subpixels provided on either side of one of the data lines and adjacent to each other in the second direction as a basic unit;

a switcher of one of the two subpixels and a switcher of the other of the two subpixels are connected to the data line interposed between and shared by the two subpixels and controlled by different ones of the gate lines;

one electrode of the switchers forms a capacitor together with the charging capacitor electrode;

the charging capacitor electrode is provided at least in a boundary region between the subpixels of the adjoining pixel pair; and N charging capacitor lines electrically connected to the charging capacitor electrode each crosses at least one of virtual lines parallel to the second direction and dividing a width of the subpixel into N+1 equal parts in the first direction at the aperture.

(Subjunction 8)

The image display device according to any one of Subjunction 1 to 7, wherein:

the display panel comprises a substrate at least provided with a pair of parallel electrodes and a liquid crystal layer interposed between the substrate and an opposite substrate; and the pair of parallel electrodes is arranged in the second direction and liquid crystal molecules of the liquid crystal layer are driven by an electric field created between the pair of parallel electrodes.

(Subjunction 9)

The image display device according to Subjunction 8, wherein:

the pair of parallel electrodes comprises transparent electrodes comprising at least two layers formed with an insulating film in-between; and one layer of the transparent electrodes is provided with a slit electrode.

(Subjunction 10)

The image display device according to Subjunction 9, wherein:

the slit electrode is a transparent electrode on a side to the liquid crystal layer.

(Subjunction 11)

A display panel in which units of display including at least a pixel displaying a first observing point image and a pixel displaying a second observing point image are arranged in a matrix, wherein:

the units of display are arranged in rows extending in a first direction in which the pixel displaying the first observing point image and pixel displaying the second observing point image are adjacent to each other and in columns extending in a second direction perpendicular to the first direction;

a shielding unit is provided around an aperture of the pixel displaying the first observing point image and an aperture of the pixel displaying the second observing point image;

the aperture of the pixel displaying the first observing point image and aperture of the pixel displaying the second observing point image include a first region where the apertures overlap with each other in the second direction and a second region that is a remaining region;

a total aperture width in the second direction of the aperture of the pixel displaying the first observing point image and aperture of the pixel displaying the second observing point image in the first region is a first aperture width;

an aperture width in the second direction of the aperture of the pixel displaying the first observing point image and aperture of the pixel displaying the second observing point image in the second region is a second aperture width;

a third region where two of the units of display adjacent to each other in the first direction overlap with each other in the second direction is provided, and a total aperture width in the second direction of the two units of display in the third region is a third aperture width;

the aperture of the pixel displaying the first observing point image and aperture of the pixel displaying the second observing point image each comprises a shape that is at least point-symmetric and not line-symmetric;

centers of the apertures are shifted in the second direction with respect to a line parallel to the first direction and passing through a center of the unit of display, and the aperture of the pixel displaying the first observing point image and aperture of the pixel displaying the second observing point image are point-symmetric about the center of the unit of display; and the third aperture width is different from the first aperture width.

(Subjunction 12)

A terminal device in which the image display device according to any one of Subjunction 1 to 10 is installed.

Having described and illustrated the principles of this application by reference to one or more preferred Embodiments, it should be apparent that the preferred Embodiments may be modified in arrangement and detail without departing from the principles disclosed herein and that it is intended that the application be construed as including all such modifications and variations insofar as they come within the spirit and scope of the subject matter disclosed herein.

Legend

1 image display device

2 display panel

2a TFT substrate
2b opposite substrate
3 lenticular lens
3a cylindrical lens
31 lens convex part
32 lens concave part
33 first axis
34 second axis
301 liquid crystal GRIN lens
302 control substrate
303 opposite substrate
304 control electrode
305 lens element
4U unit of display
4S subpixel
4R right-eye pixel
4L left-eye pixel
4P pixel
41 boundary between subpixels
42 boundary between units of display
4PAIR1, 4PAIR2, 4PAIR adjoining pixel pair
4PIX pixel electrode
4TFT pixel thin-film transistor
4CLC pixel capacitor
4CS charging capacitor
CS charging capacitor line
CS2 charging capacitor electrode
4CONT1, 4CONT2 contact hole
4COM opposite electrode
4COM2 common electrode
4SI silicon layer
5LC liquid crystal layer
50 liquid crystal molecules
6 display unit
7 drive IC
8 flexible substrate
9 cellular phone
11 polarizing plate
15 backlight
16 line presenting the light beam direction
17 line presenting the center axis of image separation
18 TFT substrate rubbing direction
19 opposite substrate rubbing direction
21 first insulating layer
22 second insulating layer
23 third insulating layer
24 fourth insulating layer
25 insulating film
55L left eye
55R right eye
60 black matrix
G, G1, . . . , G13 gate line
D, D1, . . . , D13 data line
RED red filter
GREEN green filter
BLUE blue filter
SP spot diameter
1011 vertical direction (the longitudinal direction of a cylindrical lens)
1012 horizontal direction (the arrangement direction of a cylindrical lens)
1003a cylindrical lens
1041 first observing point pixel
1042 second observing point pixel
1070 wiring
1075 aperture
1076 shielding unit

What is claimed is:

1. An image display device, comprising:
a display panel in which units of display including at least a pixel displaying a first observing point image and a pixel displaying a second observing point image are arranged in a matrix; and
an optical distributer for distributing light emitted from said pixel displaying the first observing point image and pixel displaying the second observing point image in directions different from each other in a first direction, wherein
said pixel displaying the first observing point image and pixel displaying the second observing point image are adjacent to each other in said first direction;
said units of display are arranged in rows extending in said first direction and in columns extending in a second direction perpendicular to said first direction;
a shielding unit is provided around an aperture of said pixel displaying the first observing point image and an aperture of said pixel displaying the second observing point image;
the aperture of said pixel displaying the first observing point image and aperture of said pixel displaying the second observing point image include a first region where the apertures overlap with each other in said second direction and a second region that is a remaining region;
a total aperture width in said second direction of the aperture of said pixel displaying the first observing point image and aperture of said pixel displaying the second observing point image in said first region is a first aperture width;
an aperture width in said second direction of the aperture of said pixel displaying the first observing point image and aperture of said pixel displaying the second observing point image in said second region is a second aperture width;
a third region where two of said units of display adjacent to each other in said first direction overlap with each other in said second direction is provided, and a total aperture width in said second direction of said two units of display in said third region is a third aperture width;
the aperture of said pixel displaying the first observing point image and aperture of said pixel displaying the second observing point image each comprises a shape that is at least point-symmetric and not line-symmetric;
centers of the apertures are shifted in said second direction with respect to a line parallel to said first direction and passing through a center of said units of display, and the aperture of said pixel displaying the first observing point image and aperture of said pixel displaying the second observing point image are point-symmetric about the center of said units of display; and
said third aperture width is different from said first aperture width.

2. The image display device according to claim 1, wherein:
said third aperture width is smaller than said first aperture width.

3. The image display device according to claim 1, wherein:
said optical distributer comprises an alternate structure at least in said first direction comprising regions of high separation performance and regions of low separation performance in distributing light from said pixel displaying the first observing point image and pixel displaying the second observing point image in directions different from each other; and said regions of high separation performance extend from the aperture of said pixel displaying the first observing point image to the aperture of said pixel displaying the second observing point image.

4. The image display device according to claim 1, wherein:
said optical distributer comprises a lenticular lens sheet in which convex parts and concave parts of cylindrical lenses are alternately arranged in said first direction; and
said convex parts of cylindrical lenses are provided at positions corresponding to said first region and said concave parts of cylindrical lenses are provided at positions corresponding to said third region.

5. The image display device according to claim 1, wherein:
said optical distributer comprises a refractive index distributed lens comprising a pair of substrates with liquid crystal in-between; and
a pair of electrodes provided to said substrates is provided at positions corresponding to said third region.

6. The image display device according to claim 1, wherein:
said pixel displaying the first observing point image and pixel displaying the second observing point image are subpixels, and said apertures are enclosed by data lines, gate lines and charging capacitor electrodes;
said subpixels of said display panel are arranged in an array of adjoining pixel pairs each comprising two subpixels provided on either side of one of said gate lines and adjacent to each other in said second direction as a basic unit;
a switcher of one of said two subpixels and a switcher of the other of said two subpixels are controlled by said gate line interposed between and shared by said two subpixels and connected to different ones of said data lines;
one electrode of said switchers forms a capacitor together with said charging capacitor electrode; and
said charging capacitor electrode is electrically connected to a charging capacitor line provided at least in a boundary region between said subpixels in said unit of display.

7. The image display device according to claim 1, wherein:
said pixel displaying the first observing point image and said pixel displaying the second observing point image are subpixels, and said apertures are enclosed by data lines, gate lines and charging capacitor electrodes;
said subpixels of said display panel are arranged in an array of adjoining pixel pairs each comprising two subpixels provided on either side of one of said data lines and adjacent to each other in said second direction as a basic unit;
a switcher of one of said two subpixels and a switcher of the other of said two subpixels are connected to said data line interposed between and shared by said two subpixels and controlled by different ones of said gate lines;
one electrode of said switchers forms a capacitor together with said charging capacitor electrode;
said charging capacitor electrode is provided at least in a boundary region between said subpixels of said adjoining pixel pair; and
N charging capacitor lines electrically connected to said charging capacitor electrode each crosses at least one of virtual lines parallel to said second direction and dividing a width of said subpixel into N+1 equal parts in said first direction at said aperture.

8. The image display device according to claim 1, wherein:
said display panel comprises a substrate at least provided with a pair of parallel electrodes and a liquid crystal layer interposed between said substrate and an opposite substrate; and
said pair of parallel electrodes is arranged in said second direction and liquid crystal molecules of said liquid crystal layer are driven by an electric field created between said pair of parallel electrodes.

9. The image display device according to claim 8, wherein:
said pair of parallel electrodes comprises transparent electrodes comprising at least two layers formed with an insulating film in-between; and
one layer of said transparent electrodes is provided with a slit electrode.

10. The image display device according to claim 9, wherein:
said slit electrode is a transparent electrode on a side to said liquid crystal layer.

11. A terminal device in which the image display device according to claim 1 is installed.

12. A display panel in which units of display including at least a pixel displaying a first observing point image and a pixel displaying a second observing point image are arranged in a matrix, wherein:
said units of display are arranged in rows extending in a first direction in which said pixel displaying the first observing point image and pixel displaying the second observing point image are adjacent to each other and in columns extending in a second direction perpendicular to said first direction;
a shielding unit is provided around an aperture of said pixel displaying the first observing point image and an aperture of said pixel displaying the second observing point image;
the aperture of said pixel displaying the first observing point image and aperture of said pixel displaying the second observing point image include a first region where the apertures overlap with each other in said second direction and a second region that is a remaining region;
a total aperture width in said second direction of the aperture of said pixel displaying the first observing point image and aperture of said pixel displaying the second observing point image in said first region is a first aperture width;
an aperture width in said second direction of the aperture of said pixel displaying the first observing point image and aperture of said pixel displaying the second observing point image in said second region is a second aperture width;
a third region where two of said units of display adjacent to each other in said first direction overlap with each other in said second direction is provided, and a total aperture width in said second direction of said two units of display in said third region is a third aperture width;
the aperture of said pixel displaying the first observing point image and aperture of said pixel displaying the second observing point image each comprises a shape that is at least point-symmetric and not line-symmetric;
centers of the apertures are shifted in said second direction with respect to a line parallel to said first direction and passing through a center of said units of display, and the aperture of said pixel displaying the first observing point image and aperture of said pixel displaying the second observing point image are point-symmetric about the center of said units of display; and
said third aperture width is different from said first aperture width.

* * * * *